US011584052B2

(12) United States Patent
Matsumura et al.

(10) Patent No.: US 11,584,052 B2
(45) Date of Patent: Feb. 21, 2023

(54) METHOD OF PRODUCING ASSEMBLED PRODUCT AND ASSEMBLING APPARATUS

(71) Applicant: CANON KABUSHIKI KAISHA, Tokyo (JP)

(72) Inventors: Junichi Matsumura, Numazu (JP); Akira Suzuki, Naka-gun (JP); Toshiteru Yamasaki, Yokohama (JP); Junji Yonemasu, Hitachinaka (JP); Nobuharu Hoshi, Yokohama (JP); Takashi Konishi, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 503 days.

(21) Appl. No.: 15/959,395

(22) Filed: Apr. 23, 2018

(65) Prior Publication Data

US 2018/0311871 A1 Nov. 1, 2018

(30) Foreign Application Priority Data

Apr. 26, 2017 (JP) .............................. JP2017-087679
Apr. 26, 2017 (JP) .............................. JP2017-087680

(51) Int. Cl.
 *B29C 45/06* (2006.01)
 *B29C 69/00* (2006.01)
 (Continued)

(52) U.S. Cl.
 CPC .......... *B29C 45/062* (2013.01); *B29C 45/006* (2013.01); *B29C 69/004* (2013.01);
 (Continued)

(58) Field of Classification Search
 CPC ... B29C 45/062; B29C 45/006; B29C 69/004; B29C 2045/0063; B29C 2045/0068; B29C 45/2681
 See application file for complete search history.

(56) References Cited

U.S. PATENT DOCUMENTS 5,915,760 A 6/1999 Kawase et al.
6,206,681 B1 * 3/2001 Kawase ................ B29C 45/006
 264/238
(Continued)

FOREIGN PATENT DOCUMENTS

CN 1134873 A 11/1996
CN 1630575 A 6/2005
(Continued)

OTHER PUBLICATIONS

First Office Action in Chinese Application No. 201810365462.1 (dated Aug. 2020).

(Continued)

*Primary Examiner* — Jerzi H Moreno Hernandez
(74) *Attorney, Agent, or Firm* — Venable LLP

(57) ABSTRACT

An assembling apparatus that has a mold in which a second unit opposes a first unit and that is configured to assemble an assembled product from a plurality of parts. The first unit includes first, second, and third movable portions, which comprise, respectively, a plurality of first forming portions, a plurality of second forming portions, and a plurality of third forming. The second unit comprises a fourth movable portion, a fourth forming portion, a fifth forming portion, a sixth forming portion, and a plurality of assembling portions. The fourth movable portion is configured to move so as to switch at least one assembling portion opposed to at least one first forming portion, at least one other assembling portion opposed to the at least one second forming portion, and at least one remaining assembling portion opposed to at least one third forming portion.

11 Claims, 37 Drawing Sheets

(51) Int. Cl.
  *B29C 45/67*    (2006.01)
  *B29C 45/00*    (2006.01)
  *B29L 15/00*    (2006.01)

(52) U.S. Cl.
  CPC .......... *B29C 45/0062* (2013.01); *B29C 45/67* (2013.01); *B29C 2045/0063* (2013.01); *B29L 2015/003* (2013.01)

(56) References Cited

U.S. PATENT DOCUMENTS

| | | | |
|---|---|---|---|
| 6,233,815 | B1 | 5/2001 | Miyake |
| 6,299,816 | B1 | 10/2001 | Takemoto et al. |
| 6,981,860 | B2 | 1/2006 | Takemoto et al. |
| 7,081,222 | B2 | 7/2006 | Gram |
| 7,300,614 | B2 | 11/2007 | Abe et al. |
| 7,467,938 | B2 | 1/2008 | Abe et al. |
| 7,452,202 | B2 | 11/2008 | Gram |
| 7,627,950 | B2 | 12/2009 | Derouet |
| 7,744,978 | B2 | 6/2010 | Abe et al. |
| 7,966,712 | B2 | 6/2011 | Derouet |
| 8,616,876 | B2 | 12/2013 | Moulin |
| 2002/0027099 | A1 | 3/2002 | Takemoto et al. |
| 2009/0295029 | A1* | 12/2009 | Derouet ................ B29C 45/006 264/296 |
| 2016/0096296 | A1* | 4/2016 | Raleigh ............... B29C 45/2681 425/588 |
| 2017/0095954 | A1* | 4/2017 | Gaudin ............. B29C 45/14008 |
| 2017/0095956 | A1* | 4/2017 | Grimm ................. B29C 45/162 |
| 2017/0095959 | A1* | 4/2017 | Gaudin ............... B29C 45/2681 |

FOREIGN PATENT DOCUMENTS

| | | |
|---|---|---|
| CN | 102950772 A | 3/2013 |
| CN | 104191555 A | 12/2014 |
| CN | 104608303 A | 5/2015 |
| CN | 105128257 A | 12/2015 |
| JP | 2-102012 A | 4/1990 |
| JP | 11-138584 A | 5/1999 |
| JP | 2000-238090 A | 9/2000 |
| JP | 2000-313030 A | 11/2000 |
| JP | 2001-260167 A | 9/2001 |
| JP | 2005-534526 A | 11/2005 |
| JP | 3781327 B2 | 5/2006 |
| JP | 2012-526677 A | 11/2012 |
| JP | 6097419 B1 | 3/2017 |

OTHER PUBLICATIONS

First Office Action in Chinese Application No. 202110764897.5 (dated Sep. 2022).

* cited by examiner

P64

P61

P62

P63

METHOD OF PRODUCING ASSEMBLED PRODUCT AND ASSEMBLING APPARATUS

BACKGROUND OF THE INVENTION

Field of the Invention

The present invention relates to a method of producing an assembled product including a plurality of parts and to an assembling apparatus that assembles an assembled product including a plurality of parts.

Description of the Related Art

Conventionally, a plurality of parts have been formed by molding, the formed parts have been supplied to an assembly line, and thus an assembled product has been assembled by a person or an assembling robot. In recent years, an assembling method of forming and assembling various parts by using a mold has been proposed in Japanese Patent No. 3781327. In this Japanese Patent No. 3781327, a forming operation of forming a plurality of parts by injecting molten resin into a plurality of cavities in a mold and an assembly operation of assembling an assembled product from the plurality of formed parts are alternately performed. More specifically, in the forming operation, a mold including a movable mold and a stationary mold is opened after the assembly operation, a plurality of forming portions of the stationary mold are moved to forming positions, and then the plurality of parts are formed by injecting molten resin into a plurality of cavities defined by the plurality of forming portions by clamping the mold. In the assembly operation, the mold is opened after the forming operation, the forming portions of the stationary mold holding the formed parts are moved to assembly positions opposing assembling portions of the movable mold, then the mold is clamped, and the assembled product is assembled by sticking out pins from the forming portions of the stationary mold in the clamped state.

However, in the conventional method, the forming operation and the assembly operation are alternately performed, requiring opening and clamping the mold at each operation.

Therefore, the production efficiency of the assembled product is low.

SUMMARY OF THE INVENTION

According to a first aspect of the present invention, a method of producing an assembled product including a plurality of parts, the method includes a first step of clamping a mold including a first unit and a second unit, the first unit including a plurality of first forming portions, the second unit opposing the first unit and including a plurality of second forming portions and a plurality of assembling portions, a second step of forming the plurality of parts by injecting molten resin into each of a plurality of cavities defined in the mold clamped in the first step, a third step of opening the mold in a state in which the plurality of parts formed in the second step are held by the first unit, and a fourth step of respectively opposing the plurality of parts held by the first unit in the third step to corresponding assembling portions of the second unit. The first step, the second step, the third step, and the fourth step are repetitively performed, and in the first step, by clamping the mold, the plurality of parts held by the first unit are supplied to the corresponding assembling portions of the second unit, thus assembly of the assembled product is performed, and the plurality of cavities are defined by the first forming portions of the first unit and the second forming portions of the second unit.

According to a second aspect of the present invention, an assembling apparatus configured to assemble an assembled product from a plurality of parts, the assembling apparatus includes a mold including a first unit and a second unit opposing the first unit. The first unit includes a first movable portion that is movable and includes a plurality of groups of forming portions, the plurality of groups of forming portions each including two or more first forming portions having the same shape. The second unit includes a plurality of second forming portions and a plurality of assembling portions. The first movable portion moves to such a position that the first forming portions holding the parts among the groups of forming portions are opposed to the assembling portions, and other first forming portions that do not hold the parts among the groups of forming portions are opposed to the second forming portions. By clamping the mold, the parts held by the first forming portions are supplied to the assembling portions, thus assembly of the assembled product is performed, and cavities for forming the parts are defined by the second forming portions and the other first forming portions that do not hold the parts among the groups of forming portions.

According to a third aspect of the present invention, an assembling apparatus configured to assemble an assembled product from a plurality of parts, the assembling apparatus includes a mold including a first member and a second member opposing the first member. The first member includes a plurality of first forming portions capable of holding the parts at have been formed. The second member includes a plurality of second forming portions and an assembling portion. The first member and/or the second member is rotatable. The first member and/or the second member is rotated such that the plurality of first forming portions are opposed to the plurality of second forming portions, and a plurality of cavities for forming the plurality of parts are defined by the plurality of first forming portions and the plurality of second forming portions by clamping the mold. The first member and/or the second member is rotated such that one of the first forming portions is opposed to the assembling portion, and, by clamping the mold, a part held by the one of the first forming portion is supplied to the assembling portion and thus the assembled product is assembled.

According to a third aspect of the present invention, a method of producing an assembled product in which the assembled product is assembled from a plurality of parts by using a mold including a first member and a second member opposing the first member, the method includes a first step of clamping the mold after rotating the first member, including a plurality of first forming portions capable of holding the parts that have been formed, and/or the second member, including a plurality of second forming portions and an assembling portion, such that the plurality of first forming portions are opposed to the plurality of second forming portions, a second step of forming the plurality of parts by injecting molten resin into each of a plurality of cavities defined by the plurality of first forming portions and the plurality of second forming portions by clamping the mold in the first step, a third step of opening the mold after the second step, a fourth step of rotating the first member and/or the second member such that one of the plurality of first forming portions holding a part is opposed to the assembling portion, a fifth step of clamping the mold to supply the part held by the first forming portion to the assembling portion, and a sixth step of opening the mold after the fifth step.

Further features of the present invention will become apparent from the following description of exemplary embodiments with reference to the attached drawings.

DESCRIPTION OF THE EMBODIMENTS

Exemplary embodiments of the present invention will be described below in detail with reference to drawings.

First Exemplary Embodiment

Figure 1A:
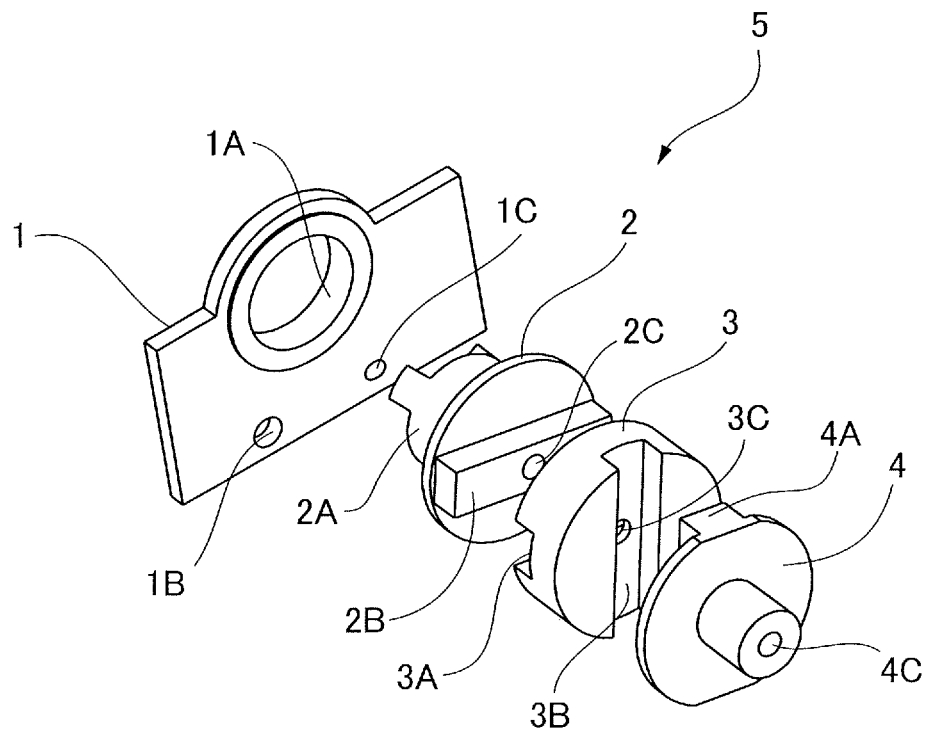
FIG. 1A is a perspective view of a plurality of parts of an assembled product according to a first exemplary embodiment in a separated state.
Figure 1B:
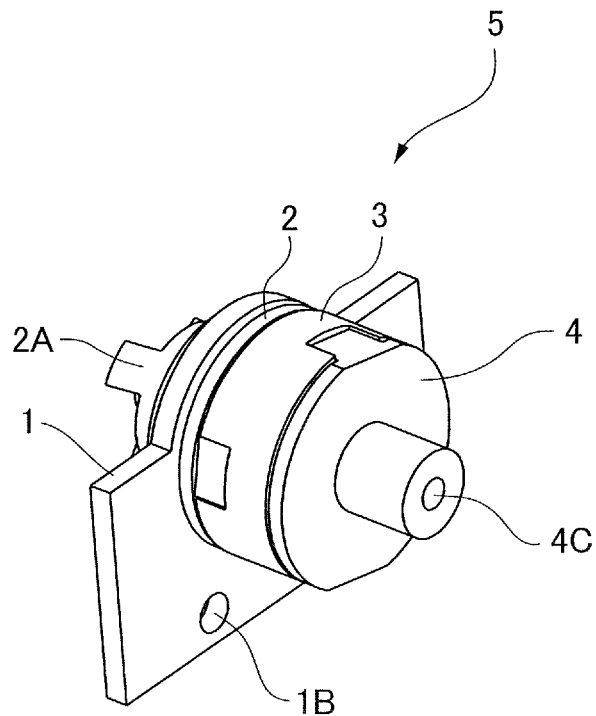
FIG. 1B is the assembled product according to the first exemplary embodiment in an assembled state.

FIG. 1A is a perspective view of a plurality of parts of an assembled product according to a first exemplary embodiment in a separated state. FIG. 1B is a perspective view of the assembled product in an assembled state. An assembled product 5 is incorporated in, for example, an electronic device such as an image forming apparatus. The assembled product 5 is, for example, a member for transmitting rotational driving force, and is required to be highly precisely assembled. The assembled product 5 is constituted by a plurality of parts, for example, four kinds of parts 1, 2, 3, and 4. The parts 1 to 4 are each a resin part formed by injection molding. The assembled product 5 is constituted by fitting the parts 1 to 4 of a plurality of kinds together. More specifically, a cylindrical portion 2A of the part 2 is fitted in a through hole 1A of the part 1, a projection portion 2B of the part 2 is fitted in a recess portion 3A of the part 3, a projection portion 4A of the part 4 is fitted in a recess portion 3B of the part 3, and thus the assembled product 5 is assembled. To be noted, the parts 1 to 4 are respectively provided with engagement holes 1B, 1C, 2C, 3C, and 4C with which engagement pins that will be described later engage at the time of an assembly operation.

Figure 2:
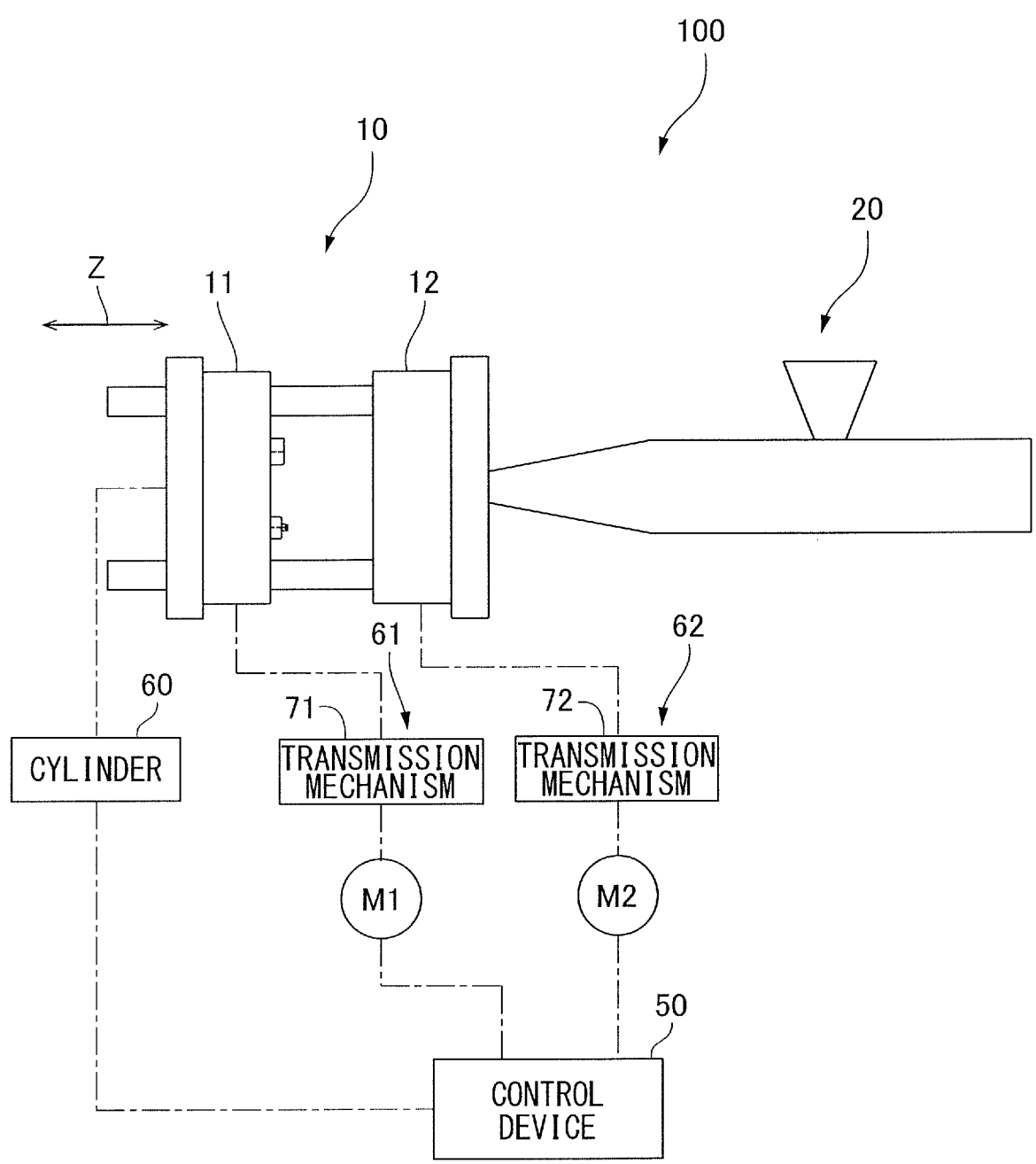
FIG. 2 is a schematic diagram illustrating an assembling apparatus used for producing the assembled product according to the first exemplary embodiment.

FIG. 2 is a schematic diagram illustrating an assembling apparatus 100 used for producing the assembled product 5 in the first exemplary embodiment. The assembling apparatus 100 is an injection molding machine including a mold 10 and an injection portion 20. The mold 10 serves as an example of a forming mold. The injection portion 20 plasticizes a thermoplastic resin and injects molten resin into the mold 10. In the first exemplary embodiment, the parts 1 to 4 of the plurality of kinds illustrated in FIG. 1A are formed by the mold 10, and the parts 1 to 4 are assembled into the assembled product 5 illustrated in FIG. 1B. In the first exemplary embodiment, the parts 1 to 4 are assembled in the order of the part 1, the part 2, the part 3, and the part 4. To be noted, an unillustrated robot is disposed adjacent to the mold 10. The assembled product 5 after completion of the assembly is taken out by the unillustrated robot from the mold 10 that has been opened.

A specific configuration of the mold 10 will be described below. The mold 10 includes a mold 11 serving as a first unit (a first mold) and a mold 12 serving as a second unit (a second mold) opposing the mold 11. The mold 10 can be opened and clamped by driving either one of the molds 11 and 12 in an arrow Z direction. In the first exemplary embodiment, the mold 11 is a movable mold, and the mold 12 is a stationary mold. The mold 11 that is a movable mold is opened and closed in the arrow Z direction by a cylinder 60 serving as a driving portion with respect to the mold 12 that is a stationary mold. To be noted, a configuration in which the mold 11 is a stationary mold and the mold 12 is a movable mold may be also employed.

Figure 3A:
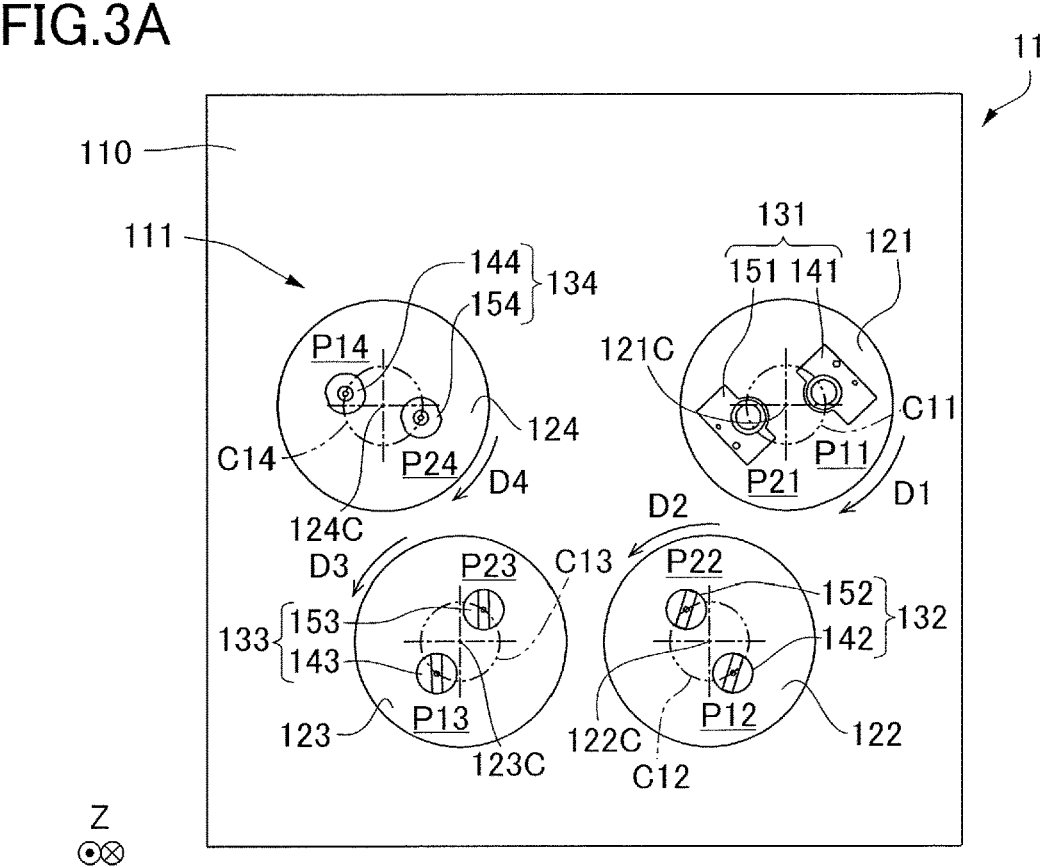
FIG. 3A is a plan view of a first unit according to the first exemplary embodiment.
Figure 3B:
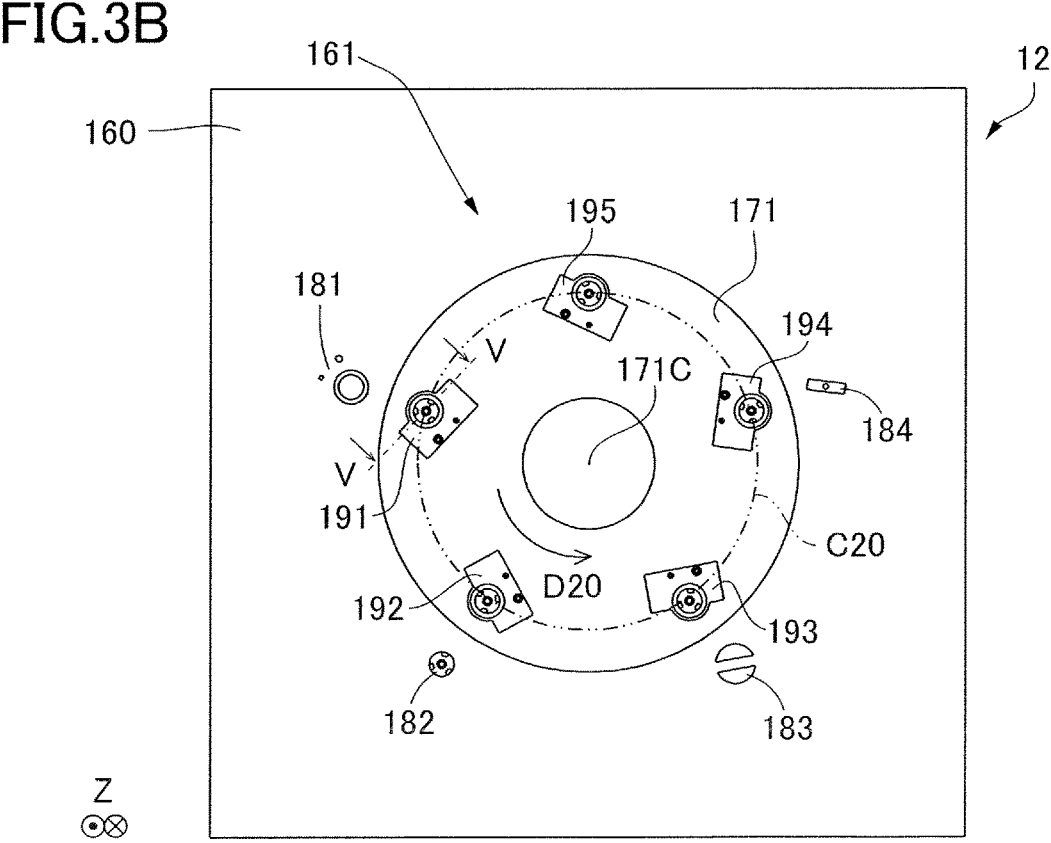
FIG. 3B is a plan view of a second unit according to the first exemplary embodiment.

FIG. 3A is a plan view of the mold 11 serving as a first unit, and FIG. 3B is a plan view of the mold 12 serving as a second unit. The mold 11 includes a mold body 110 and a movable portion 111 serving as a first movable portion movable with respect to the mold body 110. The movable portion 111 includes a plurality of groups of forming portions. More specifically, the movable portion 111 includes the same number of groups of forming portions as the number of the parts 1 to 4 to be formed, that is, four groups of forming portions 131, 132, 133, and 134. The movable portion 111 includes a plurality of disc-like rotatable boards 121, 122, 123, and 124. The rotatable boards 121 to 124 respectively rotate about rotation axes 121C, 122C, 123C, and 124C. The rotation axes 121C to 124C are virtual axes extending in the arrow Z direction and respectively passing through the centers of the rotatable boards 121 to 124.

The number of the rotatable boards 121 to 124 is equal to the number of the groups of forming portions 131 to 134, in other words, equal to the number of the parts 1 to 4 to be formed, that is, four. The rotatable boards 121 to 124 are each rotationally driven by a driving portion 61 illustrated in FIG. 2. The rotatable boards 121 to 124 rotate in synchronization by being driven by the driving portion 61 illustrated in FIG. 2. As illustrated in FIG. 2, the driving portion 61 includes a motor M1 and a transmission mechanism 71. The transmission mechanism 71 includes, for example, a gear, and transmits the driving force of the motor M1 to the rotatable boards 121 to 124 illustrated in FIG. 3A.

As illustrated in FIG. 3A, the groups of forming portions 131 to 134 are each constituted by a plurality of forming portions serving as a portion of cavities for forming parts or holding portions that will hold formed parts. The rotatable boards 121 to 124 respectively include the groups of forming portions 131 to 134, and are capable of independently rotate the respective groups of forming portions 131 to 134. That is, the rotatable board 121 includes one group of forming portions 131, the rotatable board 122 includes one group of forming portions 132, the rotatable board 123 includes one group of forming portions 133, and the rotatable board 124 includes one group of forming portions 134.

The group of forming portions 131 of the rotatable board 121 includes two or more first forming portions of the same shape. In the first exemplary embodiment, the group of forming portions 131 includes two forming portions 141 and 151. The forming portions 141 and 151 are arranged on a virtual circle centered on the rotation axis 121C of the rotatable board 121, that is, on a circle C11 in FIG. 3A. The forming portions 141 and 151 are disposed to have a two-fold rotational symmetry about the rotation axis 121C. The forming portions 141 and 151 are alternately switched between positions P11 and P21 by rotating the rotatable board 121 by 180° in an arrow D1 direction by the drive of the driving portion 61 illustrated in FIG. 2. The position P11 is a position for performing molding, and the position P21 is a position for performing assembly. That is, when the forming portion 141 moves to the position P11, the forming portion 151 moves to the position P21, and when the forming portion 141 moves to the position P21, the forming portion 151 moves to the position P11.

The group of forming portions 132 of the rotatable board 122 includes two or more first forming portions of the same shape. In the first exemplary embodiment, the group of forming portions 132 includes two forming portions 142 and 152. The forming portions 142 and 152 are arranged on a virtual circle centered on the rotation axis 122C of the rotatable board 122, that is, on a circle C12 in FIG. 3A. The forming portions 142 and 152 are disposed to have a two-fold rotational symmetry about the rotation axis 122C. The forming portions 142 and 152 are alternately switched between positions P12 and P22 by rotating the rotatable board 122 by 180° in an arrow D2 direction by the drive of the driving portion 61. The position P12 is a position for performing molding, and the position P22 is a position for performing assembly. That is, when the forming portion 142 moves to the position P12, the forming portion 152 moves to the position P22, and when the forming portion 142 moves to the position P22, the forming portion 152 moves to the position P12.

The group of forming portions 133 of the rotatable board 123 includes two or more first forming portions of the same shape. In the first exemplary embodiment, the group of forming portions 133 includes two forming portions 143 and 153. The forming portions 143 and 153 are arranged on a virtual circle centered on the rotation axis 123C of the rotatable board 123, that is, on a circle C13 in FIG. 3A. The forming portions 143 and 153 are disposed to have a two-fold rotational symmetry about the rotation axis 123C. The forming portions 143 and 153 are alternately switched between positions P13 and P23 by rotating the rotatable board 123 by 180° in an arrow D3 direction by the drive of the driving portion 61. The position P13 is a position for performing molding, and the position P23 is a position for performing assembly. That is, when the forming portion 143 moves to the position P13, the forming portion 153 moves to the position P23, and when the forming portion 143 moves to the position P23, the forming portion 153 moves to the position P13.

The group of forming portions 134 of the rotatable board 124 includes two or more first forming portions of the same shape. In the first exemplary embodiment, the group of forming portions 134 includes two forming portions 144 and 154. The forming portions 144 and 154 are arranged on a virtual circle centered on the rotation axis 124C of the rotatable board 124, that is, on a circle C14 in FIG. 3A. The forming portions 144 and 154 are disposed to have a two-fold rotational symmetry about the rotation axis 124C. The forming portions 144 and 154 are alternately switched between positions P14 and P24 by rotating the rotatable board 124 by 180° in an arrow D4 direction by the drive of the driving portion 61. The position P14 is a position for performing molding, and the position P24 is a position for performing assembly. That is, when the forming portion 144 moves to the position P14, the forming portion 154 moves to the position P24, and when the forming portion 144 moves to the position P24, the forming portion 154 moves to the position P14. As illustrated in FIG. 3B, the mold 12 includes a mold body 160 and a movable portion 161 serving as a second movable portion movable with respect to the mold body 160. The movable portion 161 includes a disc-like rotatable board 171 rotationally movable with respect to the mold body 160. The rotatable board 171 rotates about a rotation axis 171C. The rotation axis 171C is a virtual axis extending in the arrow Z direction and passing through the center of the rotatable board 171. The rotatable board 171 is rotationally driven by a driving portion 62 illustrated in FIG. 2. The driving portion 62 illustrated in FIG. 2 includes a motor M2 and a transmission mechanism 72. The transmission mechanism 72 includes, for example, a gear, and transmits the driving force of the motor M2 to the rotatable board 171 illustrated in FIG. 3B.

As illustrated in FIG. 3B, the mold body 160 includes four forming portions 181, 182, 183, and 184 serving as a plurality of second forming portions that will serve as other portions of the cavities for forming the parts. The number of the forming portions 181 to 184 is equal to the number of the parts 1 to 4 to be formed, in other words, equal to the number of the groups of forming portions 131 to 134, that is, four.

Figure 4A:
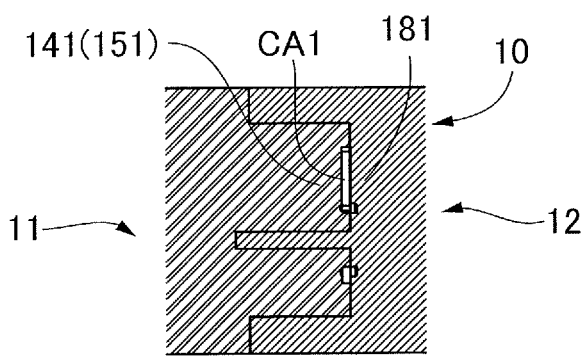
FIG. 4A is an explanatory diagram illustrating a cavity according to the first exemplary embodiment.
Figure 4B:
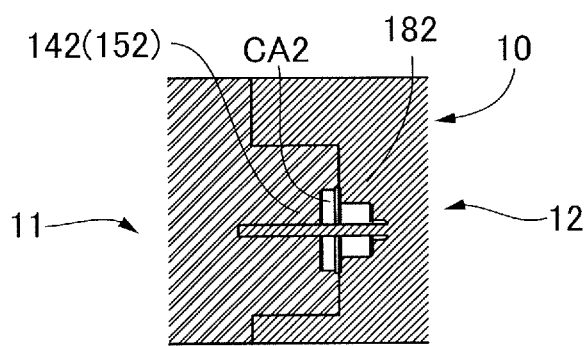
FIG. 4B is an explanatory diagram illustrating a cavity according to the first exemplary embodiment.
Figure 4C:
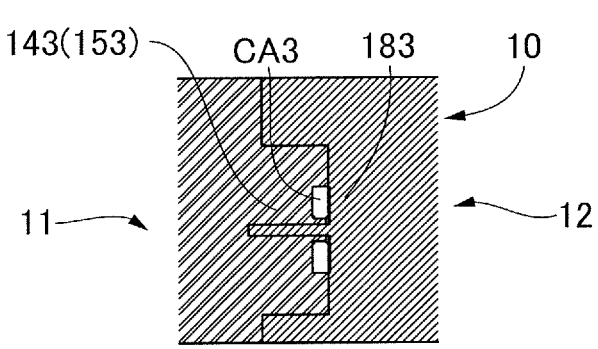
FIG. 4C is an explanatory diagram illustrating a cavity according to the first exemplary embodiment.
Figure 4D:
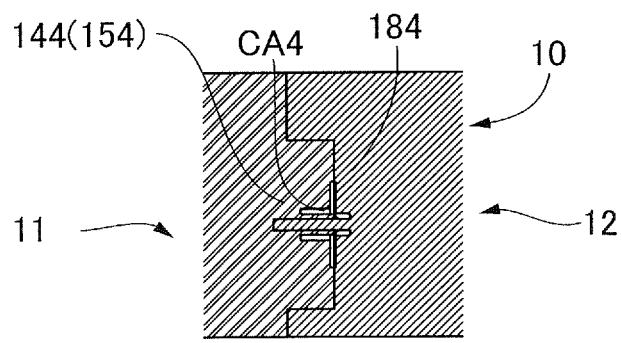
FIG. 4D is an explanatory diagram illustrating a cavity according to the first exemplary embodiment.

FIGS. 4A, 4B, 4C, and 4D are explanatory diagrams illustrating cavities defined when the mold 10 is clamped. As illustrated in FIG. 4A, when the mold 10 is clamped, the forming portion 181 abuts one of the plurality of forming portions 141 and 151 that has moved to the position P11 illustrated in FIG. 3A, and thus a cavity CA1 for forming the part 1 illustrated in FIG. 1A is defined. As illustrated in FIG. 4B, when the mold 10 is clamped, the forming portion 182 abuts one of the plurality of forming portions 142 and 152 that has moved to the position P12 illustrated in FIG. 3A, and thus a cavity CA2 for forming the part 2 illustrated in FIG. 1A is defined. As illustrated in FIG. 4C, when the mold 10 is clamped, the forming portion 183 abuts one of the plurality of forming portions 143 and 153 that has moved to the position P13 illustrated in FIG. 3A, and thus a cavity CA3 for forming the part 3 illustrated in FIG. 1A is defined. As illustrated in FIG. 4D, when the mold 10 is clamped, the forming portion 184 abuts one of the plurality of forming portions 144 and 154 that has moved to the position P14 illustrated in FIG. 3A, and thus a cavity CA4 for forming the part 4 illustrated in FIG. 1A is defined. The cavities CA1 to CA4 are spaces having shapes respectively corresponding to the parts 1 to 4 to be formed.

In the first exemplary embodiment, the forming portions 141 to 144 and the forming portions 151 to 154 of the mold 11 have shapes with which the parts 1 to 4 formed by injection molding can be held. In contrast, the forming portions 181 to 184 have such shapes that the parts 1 to 4 formed by injection molding are easily detached. Therefore, when the mold 10 is opened after injection molding, the parts 1 to 4 that have been formed are held by the forming portions 141 to 144 or 151 to 154 that have defined cavities before opening the mold 10.

As illustrated in FIG. 3B, the rotatable board 171 includes a plurality of assembling portions 191, 192, 193, 194, and 195. The assembling portions 191 to 195 are portions at which assembly of the assembled product 5 illustrated in FIG. 1B is performed, that is, portions at which the plurality of parts 1 to 4 are assembled, and respectively hold the parts 1 to 4 supplied from the forming portion 141 to 144 or 151 to 154. The number of the assembling portions 191 to 195 is equal to or greater than the number of the parts 1 to 4 to be formed, in other words, equal to or greater than the number of the groups of forming portions 131 to 134 or the number of the forming portions 181 to 184, and is five in the first exemplary embodiment. That is, in the first exemplary embodiment, the number of the assembling portions 191 to 195 is greater than the number of the groups of forming portions 131 to 134. The assembling portions 191 to 195 each have the same configuration.

The assembling portions 191 to 195 are arranged on a virtual circle centered on the rotation axis 171C of the rotatable board 171, that is, on a circle C20 in FIG. 3B. The assembling portions 191 to 195 are disposed to have a five-fold rotational symmetry about the rotation axis 171C. By sequentially rotating the rotatable board 171 by 72° in an arrow D20 direction, the assembling portions 191 to 195 to be opposed to the forming portions 141 to 144 or 151 to 154 that have respectively moved to the positions P21 to P24 in FIG. 3A can be sequentially switched. When the mold 10 is clamped after moving forming portions holding the parts 1 to 4 illustrated in FIG. 1A have been moved to the positions P21 to P24 illustrated in FIG. 3A, the parts 1 to 4 held by the forming portions are supplied to four opposing assembling portions among the plurality of assembling portions 191 to 195 illustrated in FIG. 3B, and thus assembly is performed. In the remaining one assembling portion, the assembled product 5 illustrated in FIG. 1B that has been assembled is disposed, or nothing is disposed after the assembled product 5 has been taken out by the unillustrated robot.

Figure 5:
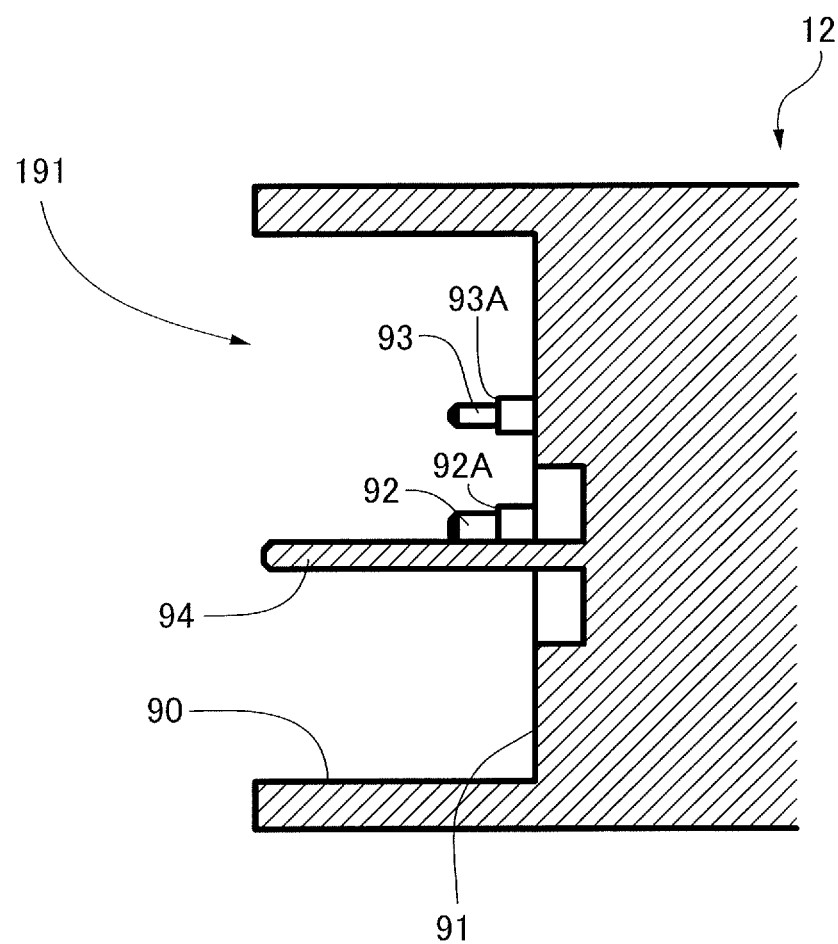
FIG. 5 is a section view of an assembling portion of a second unit taken along a line V-V shown in FIG. 3B.

FIG. 5 is a section view of the assembling portion 191 of the mold 12 taken along a line V illustrated in FIG. 3B. To be noted, the description will be given for the assembling portion 191, and descriptions for the other assembling portions 192 to 195 will be omitted because these have the same configuration as the assembling portion 191. The assembling portion 191 includes a recess portion 90 and a plurality of engagement pins 92, 93, and 94 provided to stand on a bottom surface 91 of the recess portion 90. The recess portion 90 defines a space in which the plurality of parts 1 to 4 illustrated in FIG. 1A, that is, the assembled product 5 illustrated in FIG. 1B is to be accommodated. The engagement pins 92 and 93 respectively engage with the engagement holes 1B and 1C of the part 1 illustrated in FIG. 1A at the time of assembly operation by clamping the mold 10. The engagement pins 92 and 93 are respectively provided with step portions 92A and 93A, and the part 1 illustrated in FIG. 1A engaged with the engagement pins 92 and 93 abut the step portions 92A and 93A. The engagement pin 94 engages with the engagement holes 2C, 3C, and 4C of the parts 2, 3, and 4 illustrated in FIG. 1A at the time of assembly operation by clamping the mold 10 illustrated in FIG. 2. At the time of this assembly operation, the engagement pins 92 to 94 engage with and thus position the parts 1 to 4 illustrated in FIG. 1A. The assembled product 5 illustrated in FIG. 1B can be assembled by fitting each of the parts 1 to 4 with the engagement pins 92 and 93 or a parts already disposed in the recess portion 90.

Opening and closing of the mold 10 illustrated in FIG. 2 is controlled by a control device 50. Rotation of the rotatable boards 121 to 124 illustrated in FIG. 3A and the rotatable board 171 illustrated in FIG. 3B is controlled by the control device 50 illustrated in FIG. 2. That is, the control device 50 illustrated in FIG. 2 performs opening and clamping of the mold 10 by controlling the cylinder 60. The control device 50 illustrated in FIG. 2 adjusts the rotational positions or phases of the rotatable boards 121 to 124 illustrated in FIG. 3A by controlling the motor M1, and adjusts the rotational position or phase of the rotatable board 171 illustrated in FIG. 3B by controlling the motor M2 illustrated in FIG. 2. More specifically, the control device 50 illustrated in FIG. 2 rotates the rotatable boards 121 to 124 illustrated in FIG. 3A in the directions of the arrows D1 to D4 by 180° each time, and rotates the rotatable board 171 illustrated in FIG. 3B in the direction of the arrow D20 by 72° each time. The injection portion 20 illustrated in FIG. 2 injects molten resin into the plurality of cavities CA1 to CA4 illustrated in FIG. 4A to 4D defined in the clamped mold 10.

Figure 6:
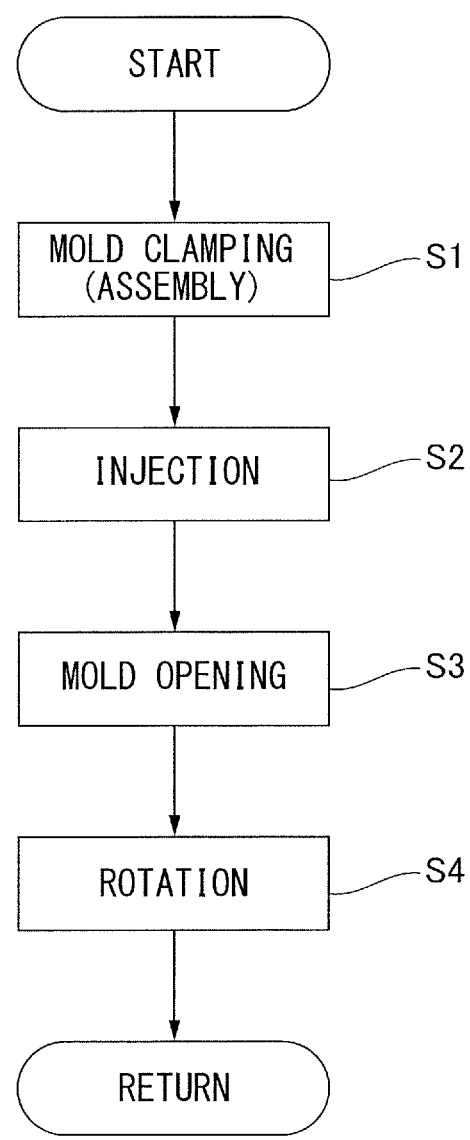
FIG. 6 is a flowchart illustrating a method of producing the assembled product according to the first exemplary embodiment.

A method of forming the parts 1 to 4 by using the mold 10 and assembling the assembled product 5 from the parts 1 to 4, that is, a method of producing the assembled product 5 will be described. FIG. 6 is a flowchart illustrating a method of producing the assembled product according to the first exemplary embodiment. To be noted, steps that will be described below are performed under the control of the control device 50 illustrated in FIG. 2. The process of producing the assembled product 5 can be roughly divided into four steps, that is, steps S1 to S4. By repetitively performing a cycle of these four steps S1 to S4, assembly operation of the parts 1 to 4 is sequentially performed at the assembling portions 191 to 195, and thus the assembled product 5 is produced.

Here, it is assumed that the first cycle of steps S1 to S4 is started in a state illustrated in FIG. 3A. The fourth and later cycles of steps S1 to S4 will be described below by taking the sixth cycle and the seventh cycle as examples.

First, in the sixth cycle, the mold 10 is clamped in step S1 serving as a first step. At this time, the phases of the rotatable boards 121 to 124 of the movable portion 111 are reversed from the state of FIG. 3A, and the phase of the rotatable board 171 is in a state illustrated in FIG. 3B. That is, the forming portions 141 to 144 have moved to the positions P21 to P24, and the forming portions 151 to 154 have moved to the positions P11 to P14. Therefore, the cavities CA1 to CA4 are defined by the forming portions 151 to 154 that have moved to the positions P11 to P14 and the forming portions 181 to 184. To be noted, the parts 1 to 4 formed in the fifth cycle are held by the forming portions 141 to 144 that have moved to the positions P21 to P24, and thus the parts 1 to 4 respectively corresponding to the assembling portions 191 to 194 are supplied to the assembling portions 191 to 194 to perform assembly. That is, in a successive operation of repeating steps S1 to S4, assembly of the parts 1 to 4 is performed by using four of the assembling portions 191 to 195 in step S1.

Figure 7A:
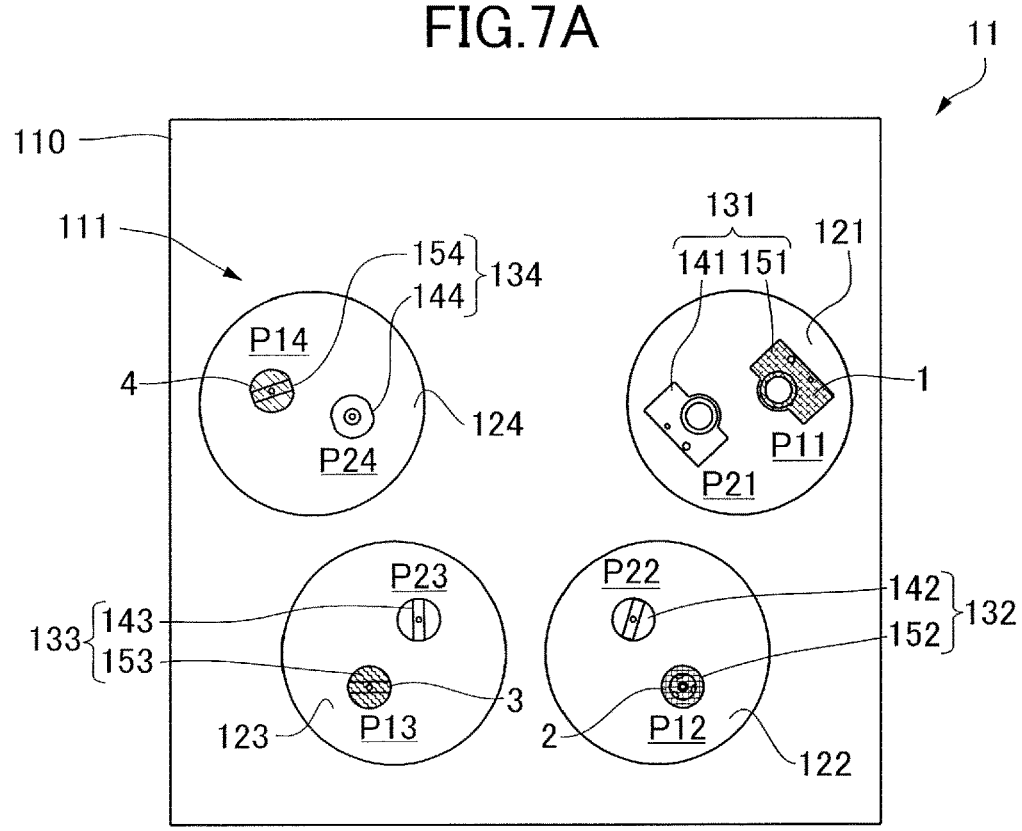
FIG. 7A is a schematic diagram of the first unit according to the first exemplary embodiment.
Figure 7B:
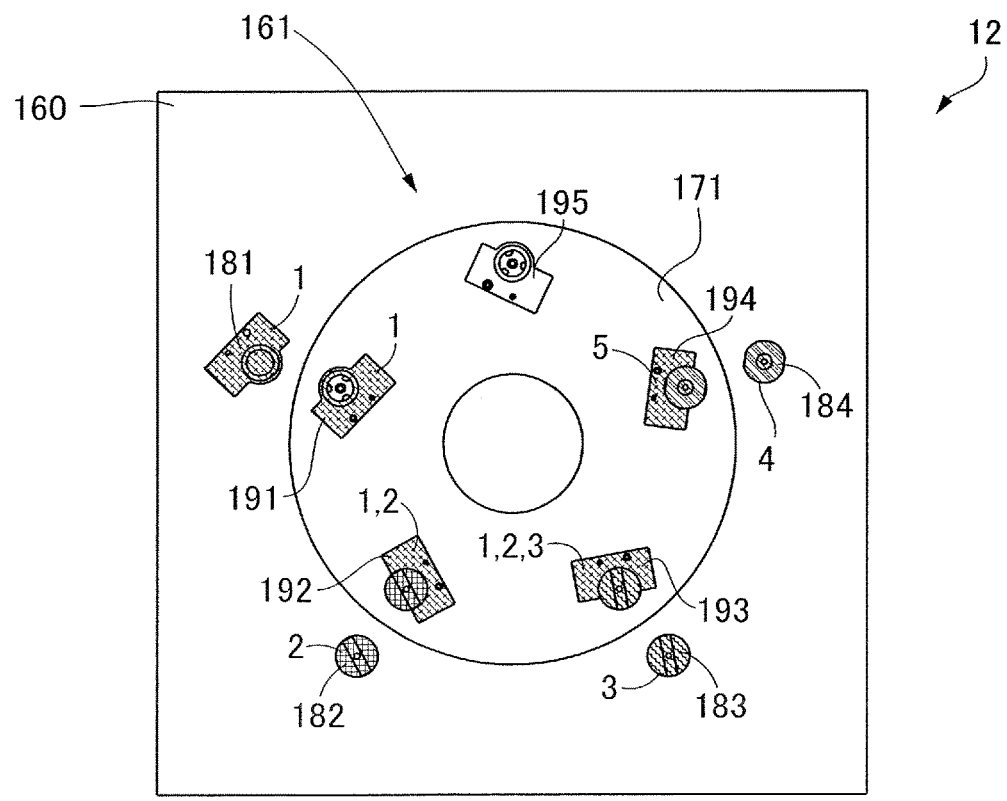
FIG. 7B is a schematic diagram of the second unit according to the first exemplary embodiment.

FIG. 7A is a schematic diagram of the mold 11 for describing a second step, and FIG. 7B is a schematic diagram of the mold 12 for describing the second step. Molten resin is injected into the mold 10 by the injection portion 20 illustrated in FIG. 2 in step S2 serving as the second step. That is, in step S2 serving as the second step, molten resin is injected into each of the plurality of cavities CA1 to CA4 defined in the mold 10 clamped in step S1, the molten resin is cooled to solidify, and thus the plurality of parts 1 to 4 are formed as illustrated in FIGS. 7A and 7B. Since this is the sixth cycle, the part 1 is disposed in the assembling portion 191, the parts 1 and 2 are disposed in the assembling portion 192, the parts 1 to 3 are disposed in the assembling portion 193, and the assembled product 5 constituted by the parts 1 to 4 are disposed in the assembling portion 194. No part is disposed in the assembling portion 195.

Next, the mold 10 is opened in step S3 serving as a third step in a state in which the parts 1 to 4 are held by the mold 11. That is, by opening the mold 10 in step S3, the parts 1 to 4 are respectively separated from the forming portions 181 to 184 of the mold 12 in a state of being respectively held by the forming portions 151 to 154 of the rotatable boards 121 to 124.

Figure 8A:
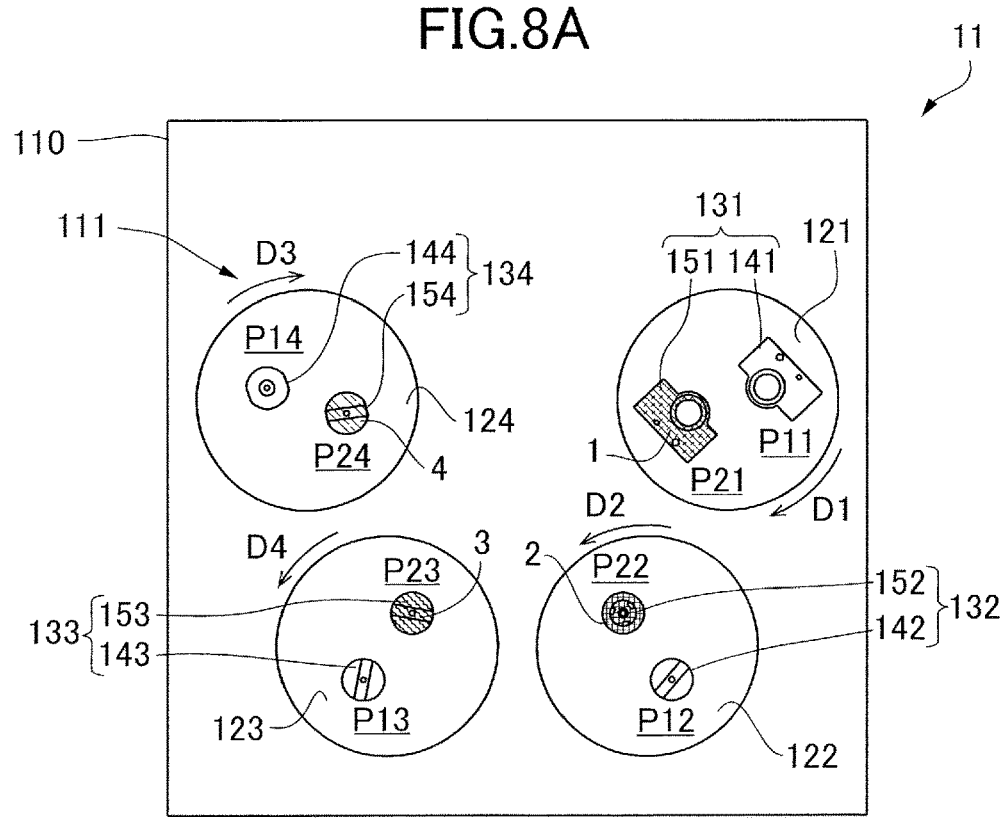
FIG. 8A is a schematic diagram of the first unit according to the first exemplary embodiment.
Figure 8B:
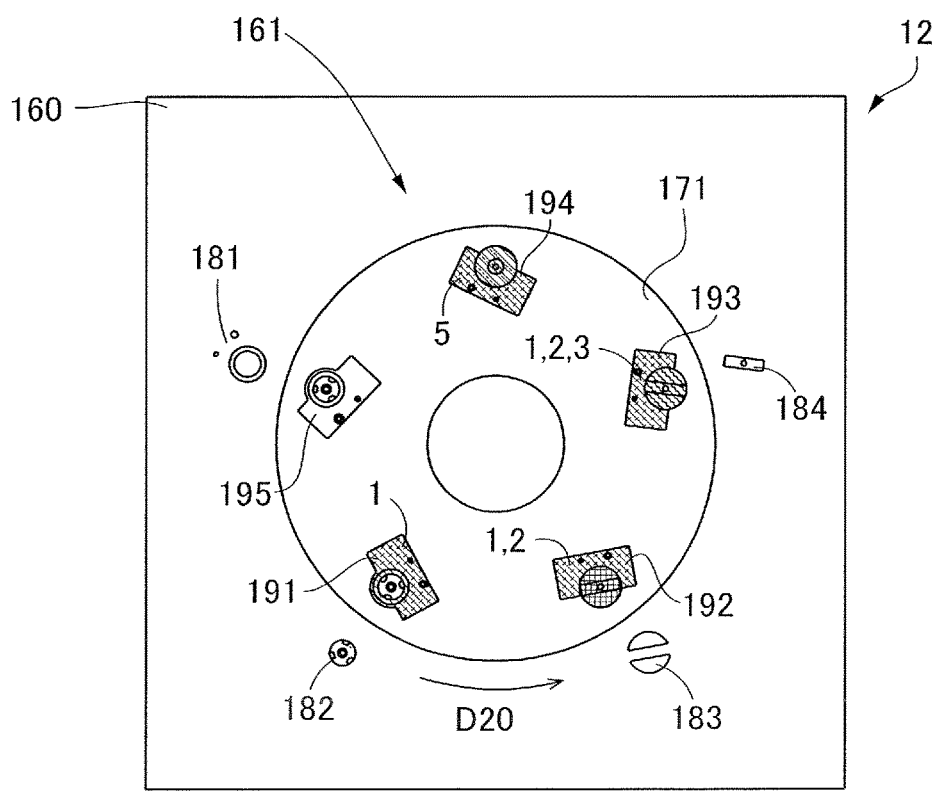
FIG. 8B is a schematic diagram of the second unit according to the first exemplary embodiment.

FIG. 8A is a schematic diagram of the mold 11 for describing a fourth step, and FIG. 8B is a schematic diagram of the mold 12 for describing the fourth step. After the mold 10 is opened in step S3, the rotatable boards 121 to 124 of the mold 11 are respectively rotated in the directions of the arrows D1 to D4 by 180°, and the rotatable board 171 of the mold 12 is rotated in the direction of the arrow D20 by 72° in step S4 serving as the fourth step. FIGS. 8A and 8B illustrate a state in which the rotatable board 121 to 124 and 171 have been rotated. To be noted, the directions of rotation of the rotatable boards 121 to 124 may be respectively opposite to the directions of the arrows D1 to D4.

FIGS. 9A to 9D are schematic section views of the molds 11 and 12 illustrating a state in which first forming portions and assembling portions have been opposed to each other in step S4. In step S4, the forming portions 151 to 154 respectively holding the parts 1 to 4 are moved to the positions P21 to P24 illustrated in FIG. 8A to oppose assembling portions by rotating the rotatable boards 121 to 124 by 180°. Further, assembling portions to be opposed to the parts 1 to 4 held by the mold 11 are switched by rotating the rotatable board 171 by 72°.

Figure 9A:
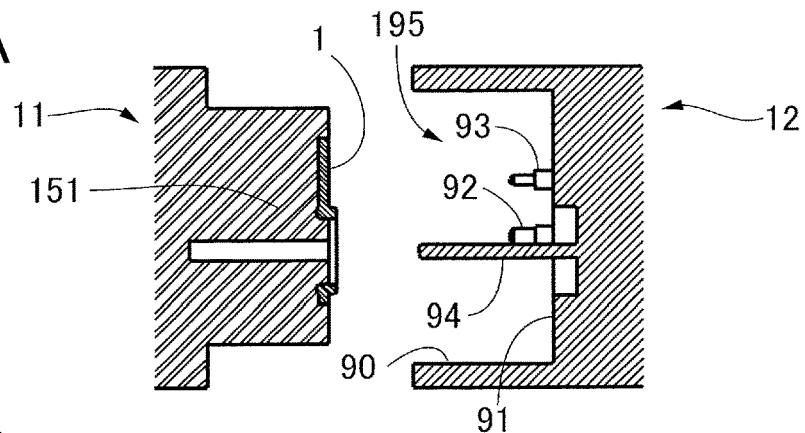
FIG. 9A is a schematic section view of the first unit and the second unit according to the first exemplary embodiment.
Figure 9B:
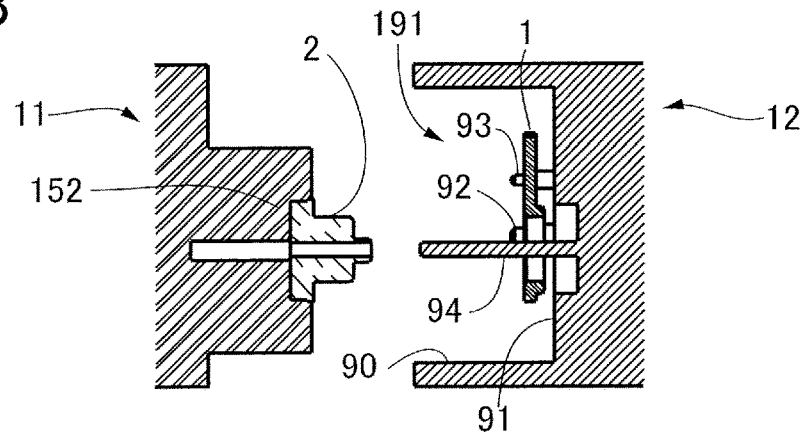
FIG. 9B is a schematic section view of the first unit and the second unit according to the first exemplary embodiment.
Figure 9C:
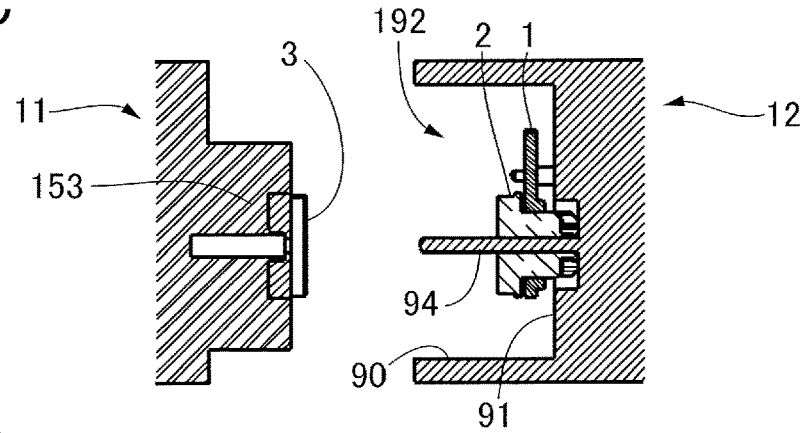
FIG. 9C is a schematic section view of the first unit and the second unit according to the first exemplary embodiment.
Figure 9D:
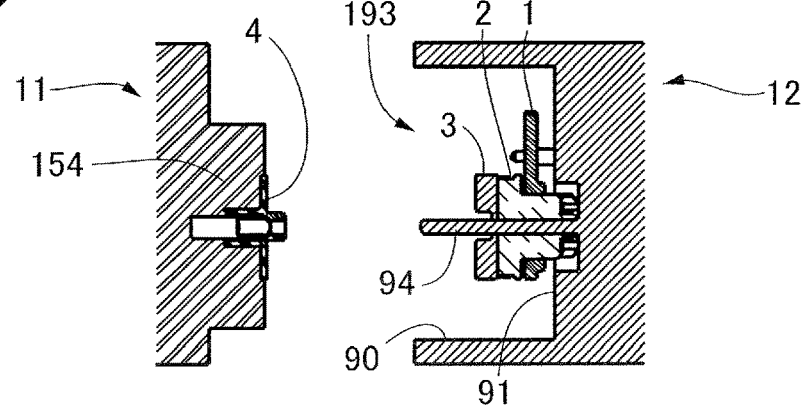
FIG. 9D is a schematic section view of the first unit and the second unit according to the first exemplary embodiment.

More specifically, the assembling portion 195 in which no part is disposed is moved to a position opposing the forming portion 151 from a position not opposing any of the forming portions 151 to 154 as illustrated in FIG. 9A. The assembling portion 191 in which the part 1 is disposed is moved to a position opposing the forming portion 152 from the position opposing the forming portion 151 as illustrated in FIG. 9B. The assembling portion 192 in which the parts 1 and 2 are disposed is moved to a position opposing the forming portion 153 from the position opposing the forming portion 152 as illustrated in FIG. 9C. The assembling portion 193 in which the parts 1 to 3 are disposed is moved to a position opposing the forming portion 154 from the position opposing the forming portion 153 as illustrated in FIG. 9D. To be noted, in FIG. 8B, the assembling portion 194 in which the assembled product 5 formed of the parts 1 to 4 is moved to the position not opposing any of the forming portions 151 to 154.

As described above, in step S4, assembling portions to be opposed to the forming portions 151 to 154 are switched by rotating the rotatable board 171. Further, by rotating the rotatable boards 121 to 124, the forming portions 151 to 154 holding parts among the groups of forming portions 131 to 134 are respectively opposed to the assembling portions 195, 191, 192, and 193. At the same time, other forming portions 141 to 144 not holding parts among the groups of forming portions 131 to 134 are respectively opposed to the forming portions 181 to 184. To be noted, since the assembled product 5 is disposed in the assembling portion 194 as described above, the assembled product 5 is taken out from the assembling portion 194 by the unillustrated robot. To be noted, the timing of taking out the assembled product 5 from the mold 10 is preferably between a time point in which the mold opening of step S3 is completed and a time point in which the mold clamping of step S1 of the next cycle is started. The assembled product 5 may be taken out from the mold 10 during the mold opening operation of step S3 or during the mold clamping operation of step S1 as long as the unillustrated robot or the assembled product 5 does not collide with the mold 10.

After finishing step S4 of the sixth cycle, the process returns to step S1, and steps S1 to S4 are repetitively performed in the seventh and later cycles. FIGS. 10A to 10D are respectively schematic section views of the forming portions 151 to 154 of the mold 11 and the assembling portions 195, 191, 192, and 193 of the mold 12 illustrating a state in which the mold 10 is clamped in the seventh cycle. In step S1 of the seventh cycle, the mold 10, that is, the molds 11 and 12 are clamped as illustrated in FIGS. 10A to 10D. As a result of this, the parts 1 to 4 held in the mold 11 are respectively supplied to the four assembling portions 195, 191, 192, and 193 among the assembling portions 191 to 195 of the mold 12 and assembled, and thus assembly of the assembled product 5 is performed.

Figure 10A:
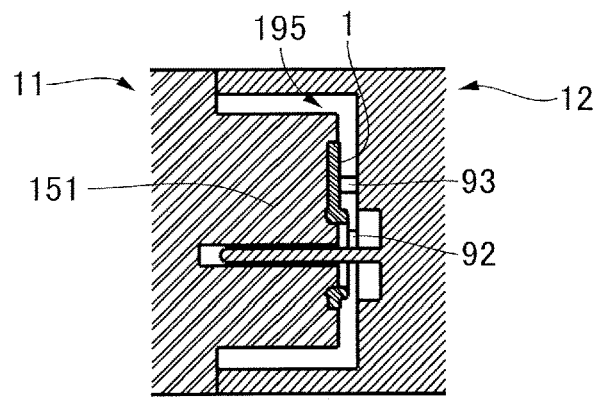
FIG. 10A is a schematic section view of the first unit and the second unit according to the first exemplary embodiment.
Figure 10B:
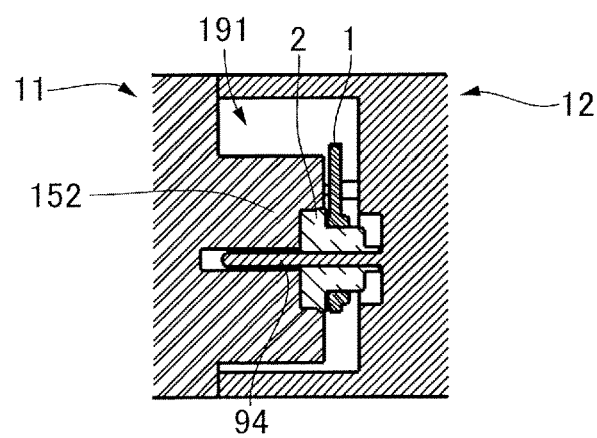
FIG. 10B is a schematic section view of the first unit and the second unit according to the first exemplary embodiment.
Figure 10C:
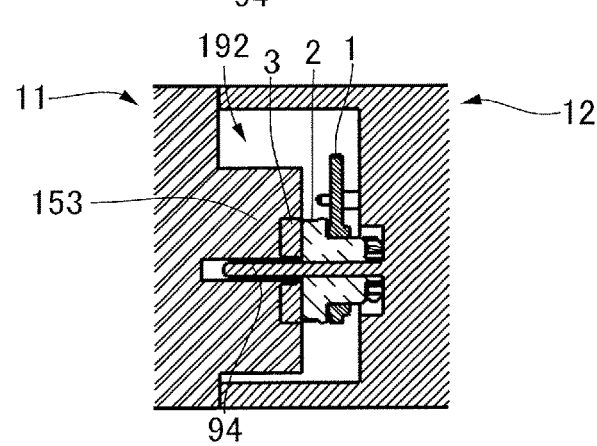
FIG. 10C is a schematic section view of the first unit and the second unit according to the first exemplary embodiment.
Figure 10D:
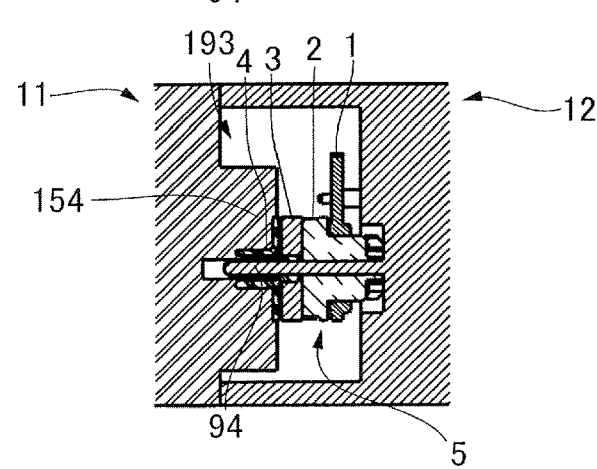
FIG. 10D is a schematic section view of the first unit and the second unit according to the first exemplary embodiment.
Figure 11A:
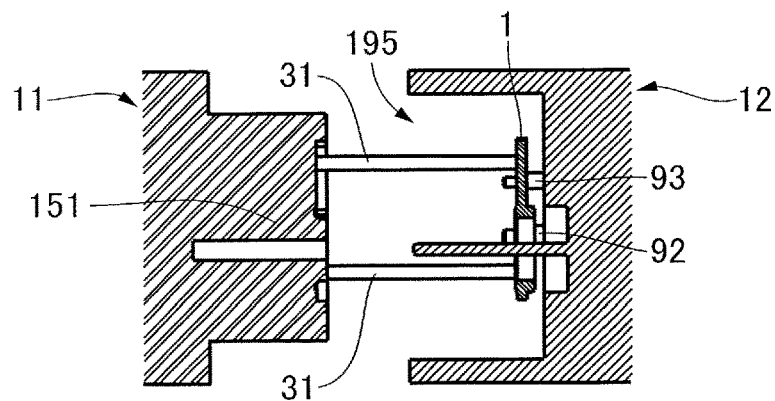
FIG. 11A is a schematic section view of the first unit and the second unit according to the first exemplary embodiment.
Figure 11B:
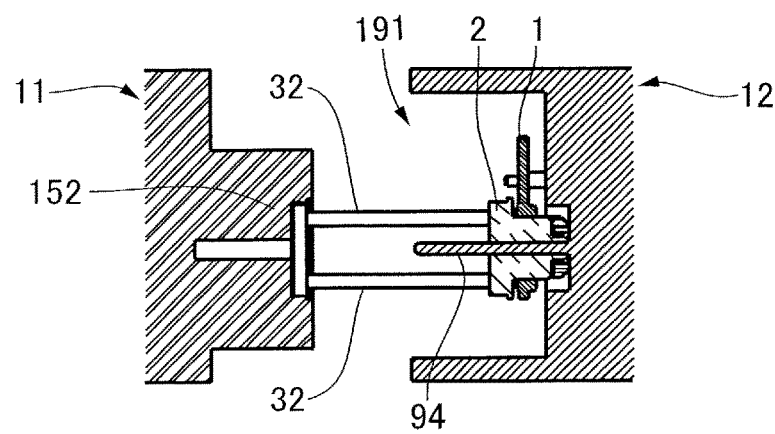
FIG. 11B is a schematic section view of the first unit and the second unit according to the first exemplary embodiment.
Figure 11C:
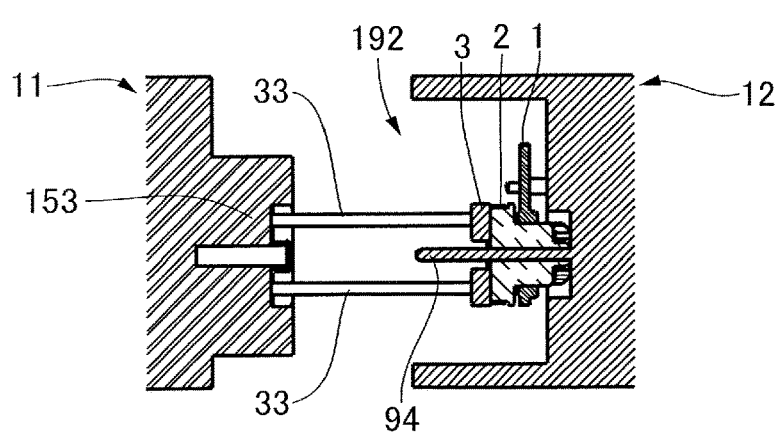
FIG. 11C is a schematic section view of the first unit and the second unit according to the first exemplary embodiment.
Figure 11D:
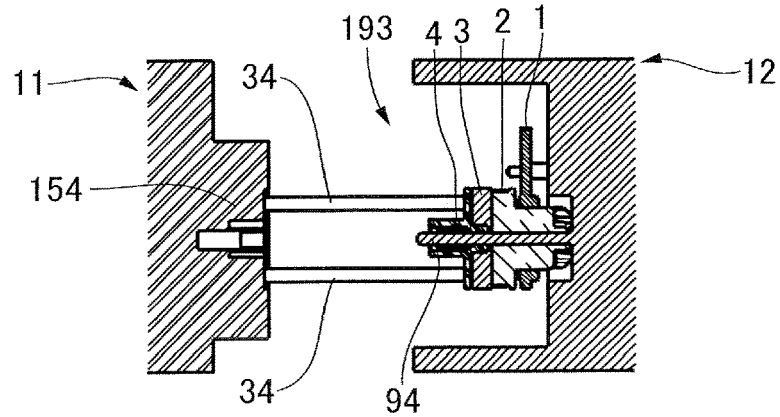
FIG. 11D is a schematic section view of the first unit and the second unit according to the first exemplary embodiment.

More specifically, the part 1 held by the forming portion 151 is supplied to the assembling portion 195 as illustrated in FIG. 10A. That is, the part 1 is mounted on the engagement pins 92 and 93 in a state in which the engagement pins 92 and 93 of the assembling portion 195 are positioned by engaging with the engagement holes 1B and 1C of the part 1 illustrated in FIG. 1A. The part 2 held by the forming portion 152 is supplied to the assembling portion 191 as illustrated in FIG. 10B. The part 2 is mounted on the part 1 in a state in which the engagement pin 94 of the assembling portion 191 is positioned by engaging with the engagement hole 2C of the part 2 illustrated in FIG. 1A, and thus the part 1 is fitted in the part 2. The part 3 held by the forming portion 153 is supplied to the assembling portion 192 as illustrated in FIG. 10C. The part 3 is mounted on the part 2 in a state in which the engagement pin 94 of the assembling portion 192 is positioned by engaging with the engagement hole 3C of the part 3 illustrated in FIG. 1A, and thus the part 3 is fitted in the part 2. The part 4 held by the forming portion 154 is supplied to the assembling portion 193 as illustrated in FIG. 10D. The part 4 is mounted on the part 3 in a state in which the engagement pin 94 of the assembling portion 193 is positioned by engaging with the engagement hole 4C of the part 4 illustrated in FIG. 1A, and thus the part 4 is fitted in the part 3. As described above, assembly of the parts 1 to 4 is performed simultaneously in four of the plurality of assembling portion 191 to 195 in step S1.

The plurality of cavities CA1 to CA4 illustrated in FIGS. 4A to 4D are defined by the clamped mold 10 in step S1 of the seventh cycle while assembly of the assembled product 5 is performed. That is, by clamping the mold 10 in step S1, the cavities CA1 to CA4 are defined by the forming portions 141 to 144 and the forming portions 181 to 184 as illustrated in FIGS. 4A to 4D while the parts 1 to 4 held by the forming portions 151 to 154 are supplied to assembling portions and assembly of the assembled product 5 is performed as illustrated in FIGS. 10A to 10D.

Therefore, in the first exemplary embodiment, there is no need to open and clamp the mold 10 at each of the assembly operation of S1 and the forming operation of S2. That is, since the cavities CA1 to CA4 are defined while the assembly of the assembled product 5 is performed, the steps of opening and clamping the mold can be omitted, and thus the production efficiency of the assembled product 5 is improved.

Here, the forming portions 141 to 144 and the forming portions 151 to 154 respectively have such shapes as to hold the parts 1 to 4. Therefore, at the time of opening the mold 10 in step S3, the parts 1 to 4 need to be separated from the forming portions 151 to 154 opposing the assembling portions 195, 191, 192, and 193. That is, at the time of opening the mold 10 in step S3 of the seventh cycle, parts formed in step S2 of the seventh cycle that is the same cycle need to be held by the forming portions 141 to 144. In contrast, parts formed in step S2 of the sixth cycle that is the previous cycle need to be separated from the forming portions 151 to 154 because assembly thereof has been already completed.

FIGS. 11A to 11D are respectively schematic section views of the forming portions 151 to 154 of the mold 11 and the assembling portions 195, 191, 192, and 193 of the mold 12 illustrating a state in which the mold 10 is opened in the seventh cycle. In step S3, the mold 10 is opened by sticking out pins 31, 32, 33, and 34 respectively toward the assembling portions 195, 191, 192, and 193 from the forming portions 151 to 154 opposing the assembling portions 195, 191, 192, and 193. The pins 31 to 34 are ejector pins. By sticking out the pins 31 to 34 respectively from the forming portions 151 to 154 as opening the mold 10, the parts 1 to 4 respectively held by the forming portions 151 to 154 are separated from the forming portions 151 to 154. By sticking out the pins 31 to 34 at the time of mold opening, the parts 1 to 4 are held at the positions of the assembling portions. As a result of this, mold opening is performed in a state in which the parts 1 to 4 are mounted on the engagement pins 92 and 93 of the assembling portion 195 or on other parts of the parts 1 to 3 already disposed in the assembling portion 191 to 193. As described above, the mold 10 is opened in a state in which each part is held at each position of the assembling portions, and thus parts falling off the assembling portions can be suppressed. After completing opening the mold 10, the pins 31 to 34 are drawn into the mold 11.

To be noted, in the case where the forming portions 141 to 144 are opposed to assembling portions in step S3, the pins 31 to 34 may be stuck out from the forming portions 141 to 144. As described above, the mold 10 is provided with the pins 31 to 34, and the pins 31 to 34 are disposed in the mold 11 so as to be capable of advancing and retracting from forming portions that have moved to the positions P21 to P24 illustrated in FIG. 3A.

After opening the mold 10 in step S3 of the seventh cycle, the assembled product 5 disposed in the assembling portion 193 is taken out by the unillustrated robot. By repeating steps S1 to S4 in this way, assembly of the parts 1 to 4 is sequentially performed at the assembling portions 191 to 195, and assembly of one assembled product 5 is completed at one assembling portion in each cycle.

Figure 12:
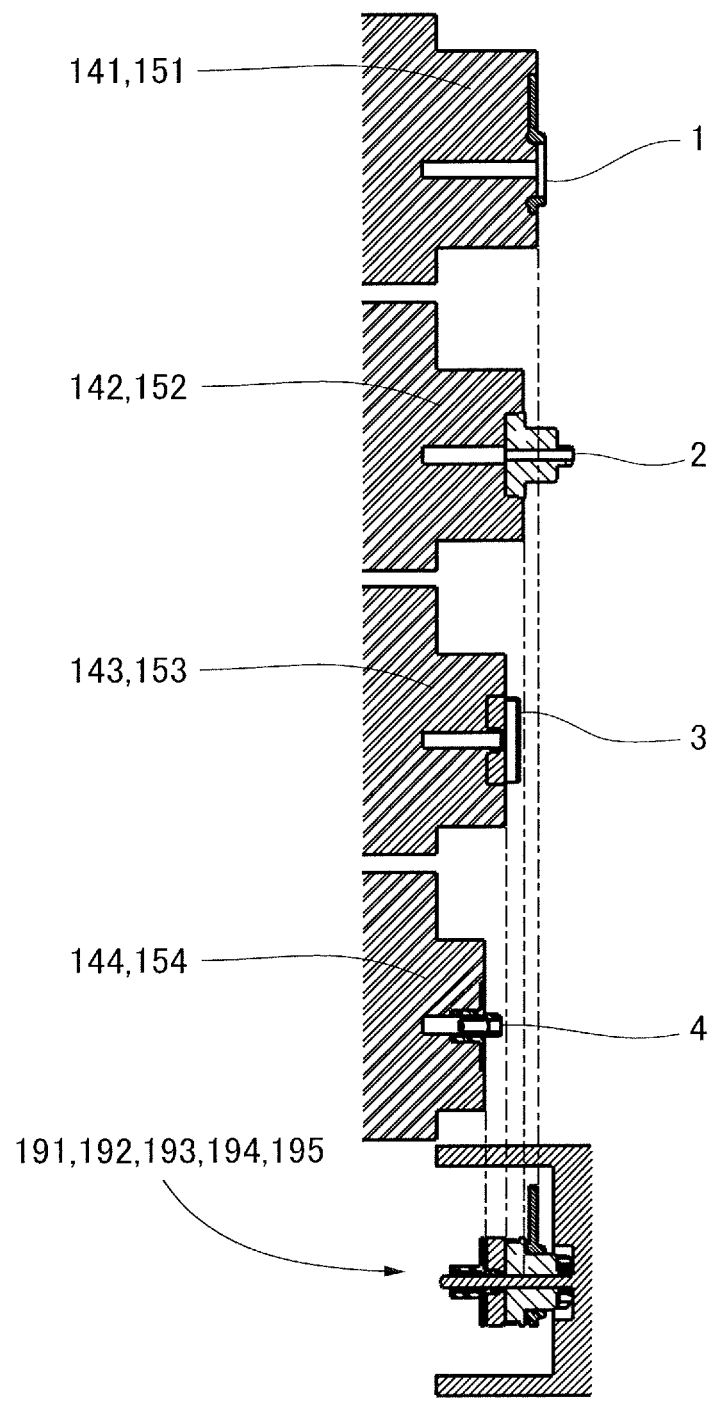
FIG. 12 is an explanatory diagram illustrating a positional relationship between first forming portions and assembling portions.

Here, the positions of the forming portions 141 to 144 and the forming portions 151 to 154 in the opening/closing direction of the mold 10, that is, in the arrow Z direction in FIG. 2, are set such that assembly of the parts 1 to 4 that are held is completed when clamping of the mold 10 is completed in step S1. FIG. 12 is an explanatory diagram illustrating a positional relationship of the forming portions 141 to 144 or 151 to 154 with the assembling portions 191 to 195 in the opening/closing direction of the mold 10 in a state in which the mold 10 is clamped. The forming portions 141 to 144 and the forming portions 151 to 154 are disposed so as to be displaced from one another in the arrow Z direction that is the opening/closing direction of the mold 10 as illustrated in FIG. 12. That is, the positions of the forming portions 141 to 144 and the forming portions 151 to 154 in the Z direction are determined such that assembly of the parts 1 to 4 is completed at the assembling portions 191 to 195 when the mold 10 is clamped.

Fitting tolerances between the through hole 1A of the part 1 and the cylindrical portion 2A of the part 2, between the projection portion 2B of the part 2 and the recess portion 3A of the part 3, and between the recess portion 3B of the part 3 and the projection portion 4A of the part 4 are set with a high precision such that minute gaps are provided therebetween. The parts 1 to 4 can be assembled by clamping the mold 10 in a state of being highly precisely held by the mold 11, and thus the assembled product 5 can be assembled with a high precision.

Figure 13A:
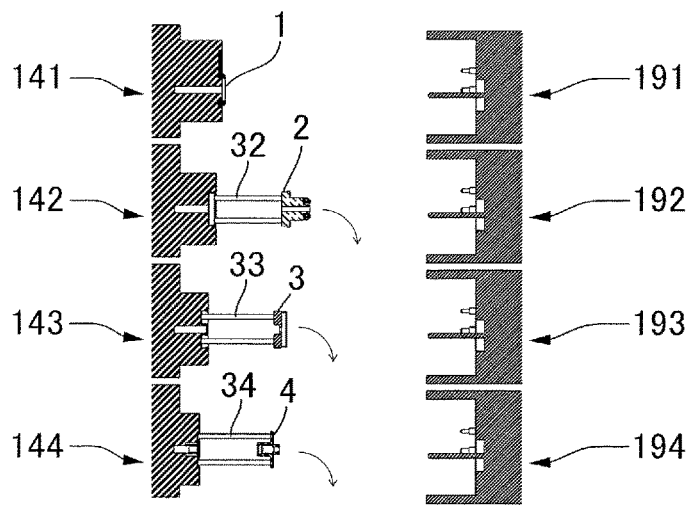
FIG. 13A is a diagram for describing an operation in an initial stage according to the first exemplary embodiment.
Figure 13B:
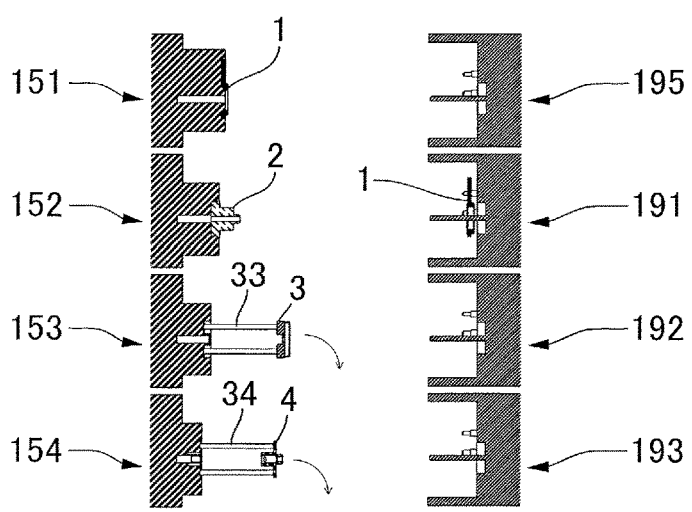
FIG. 13B is a diagram for describing the operation in the initial stage according to the first exemplary embodiment.
Figure 13C:
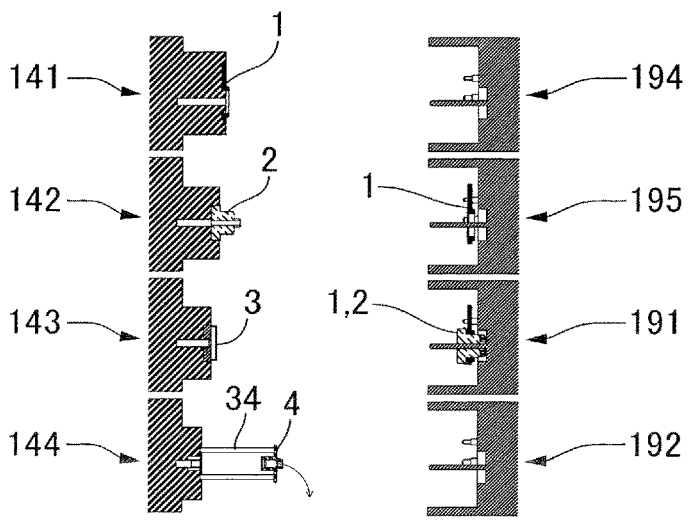
FIG. 13C is a diagram for describing the operation in the initial stage according to the first exemplary embodiment.

In the first exemplary embodiment, the assembled product 5 is constituted by the four parts 1 to 4, and these parts are sequentially assembled. Therefore, the first cycle, the second cycle, and the third cycle after start of production are different from the fourth and later cycles. Specific description will be given below. FIG. 13A is a diagram for describing the operation of step S4 in the first cycle. FIG. 13B is a diagram for describing the operation of step S4 in the second cycle. FIG. 13C is a diagram for describing the operation of step S4 in the third cycle.

First, in the first cycle, in step S4, the parts 1 to 4 of the forming portions 141 to 144 are respectively opposed to the assembling portions 191 to 194 as illustrated in FIG. 13A. At this time, the part 1 is not disposed in the assembling portion 192, the parts 1 and 2 are not disposed in the assembling portion 193, and the parts 1 to 3 are not disposed in the assembling portion 194. Therefore, the assembled product 5 cannot be produced even if the parts 2 to 4 are respectively supplied to the assembling portions 192 to 194, and thus the parts 2 to 4 are removed from the forming portions 142 to 144 by the pins 32 to 34 after opening the mold 10. Then, the part 1 is disposed in the assembling portion 191 in step S1 of the second cycle that is the next cycle.

Next, in step S4 of the second cycle, the parts 1 to 4 of the forming portions 151 to 154 are respectively opposed to the assembling portions 195, 191, 192, and 193 as illustrated in FIG. 13B. At this time, the parts 1 and 2 are not disposed in the assembling portion 192, and the parts 1 to 3 are not disposed in the assembling portion 193. Therefore, the assembled product 5 cannot be produced even if the parts 3 and 4 are respectively supplied to the assembling portions 192 and 193, and thus the parts 3 and 4 are removed from the forming portions 153 and 154 by the pins 33 and 34 after opening the mold 10. Then, the parts 1 and 2 are respectively disposed in the assembling portions 195 and 191 in step S1 of the third cycle that is the next cycle.

Next, in step S4 of the third cycle, the parts 1 to 4 of the forming portions 141 to 144 are respectively opposed to the assembling portions 194, 195, 191, and 192 as illustrated in FIG. 13C. At this time, the parts 1 to 3 are not disposed in the assembling portion 192. Therefore, the assembled product 5 cannot be produced even if the part 4 is supplied to the assembling portion 192, and thus the part 4 is removed from the forming portion 144 by the pin 34 after opening the mold 10. Then, the parts 1 to 3 are respectively disposed in the assembling portions 194, 195, and 191 in step S1 of the fourth cycle that is the next cycle.

To be noted, although a part is removed in step S4 in the first exemplary embodiment, the part may be removed after disposing a part in an assembling portion.

As described above, according to the first exemplary embodiment, assembly of the assembled product 5 is completed as a unit at one of the plurality of assembling portions 191 to 195 in each of the fourth and later cycles. That is, since one assembled product 5 is produced in each cycle, the production efficiency of the assembled product 5 is improved. In addition, since definition of the cavities CA1 to CA4 illustrated in FIGS. 4A to 4D and assembly of the parts 1 to 4 illustrated in FIGS. 10A to 10D can be performed in the same mold clamping operation, the number of steps in each cycle can be reduced, thus time for each cycle can be shortened, and the production efficiency of the assembled product 5 can be improved.

Figure 14A:
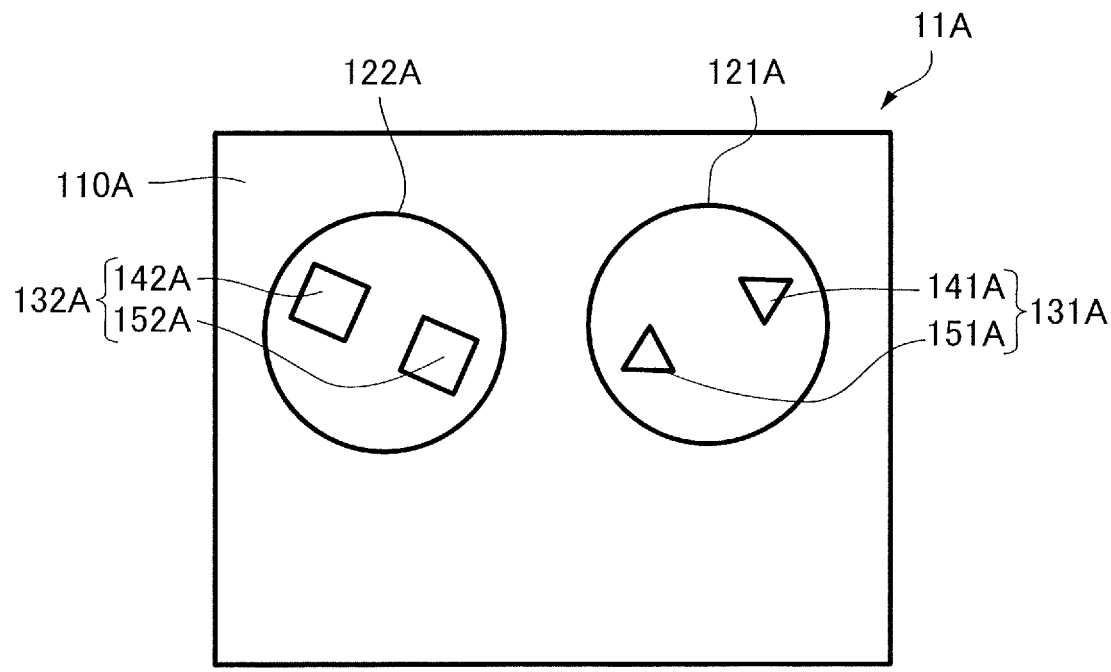
FIG. 14A is a plan view of a first unit of a mold of a modification embodiment.
Figure 14B:
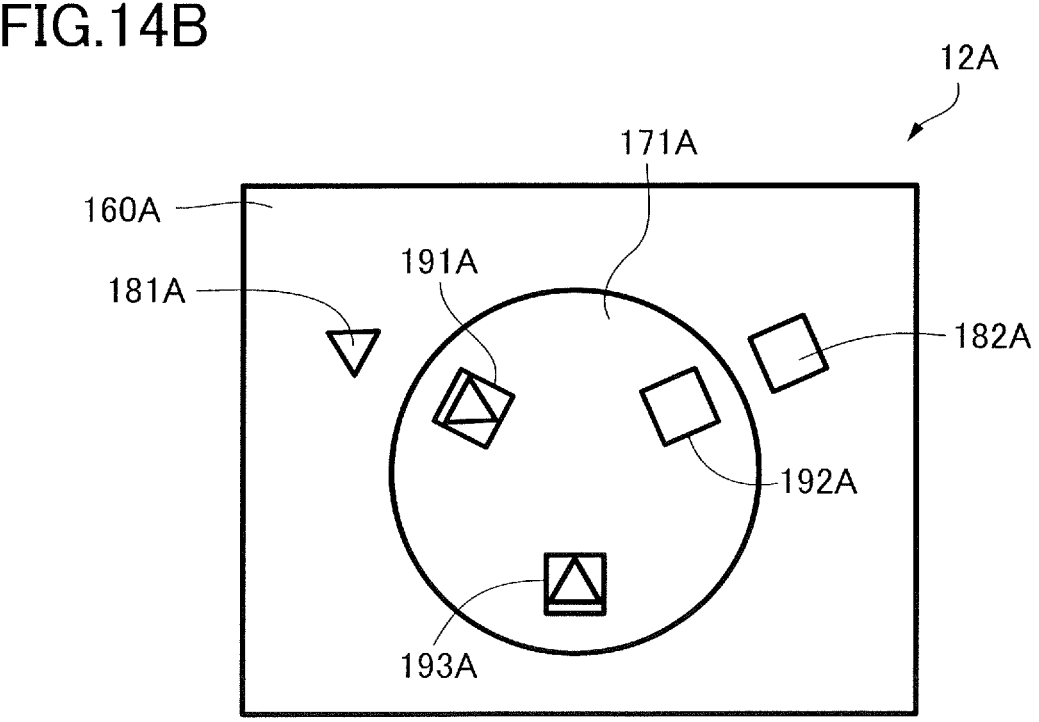
FIG. 14B is a plan view of a second unit of the mold of the modification embodiment.

To be noted, although a case where an assembled product constituted by four parts is assembled has been described above, the number is not limited to four, and the present invention can be applied as long as the assembled product is constituted by two or more parts. FIG. 14A is a plan view of a first unit of a mold of a modification embodiment, and FIG. 14B is a plan view of a second unit of the mold of the modification embodiment. A case where the assembled product is constituted by two parts will be described below.

As illustrated in FIG. 14A, a mold 11A serving as a first unit includes a mold body 110A and two rotatable boards 121A and 122A that rotate with respect to the mold body 110A. The rotatable boards 121A and 122A respectively include groups of forming portions 131A and 132A. The group of forming portions 131A includes forming portions 141A and 151A serving as a plurality of first forming portions, and the group of forming portions 132A includes forming portions 142A and 152A serving as a plurality of first forming portions. As illustrated in FIG. 14B, a mold 12A serving as a second unit includes a mold body 160A and a rotatable board 171A that rotates with respect to the mold body 160A. The mold body 160A includes two forming portions 181A and 182A serving as a plurality of second forming portions. The rotatable board 171A includes three assembling portions 191A, 192A, and 193A serving as a plurality of assembling portions. Definition of cavities and assembly of the assembled product can be performed in the same mold clamping operation in step S1 also in such a configuration, and thus the production efficiency of the assembled product can be improved.

Second Exemplary Embodiment

Figure 15A:
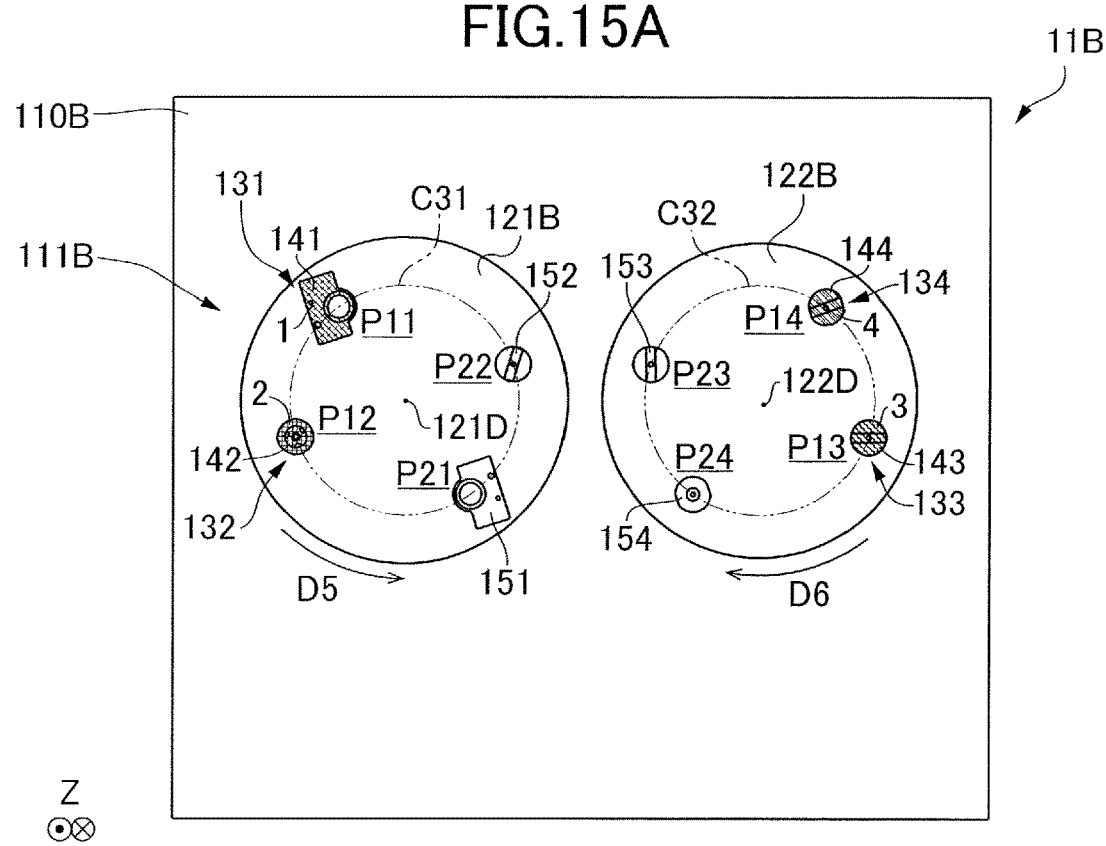
FIG. 15A is a plan view of a first unit of a mold according to a second exemplary embodiment.
Figure 15B:
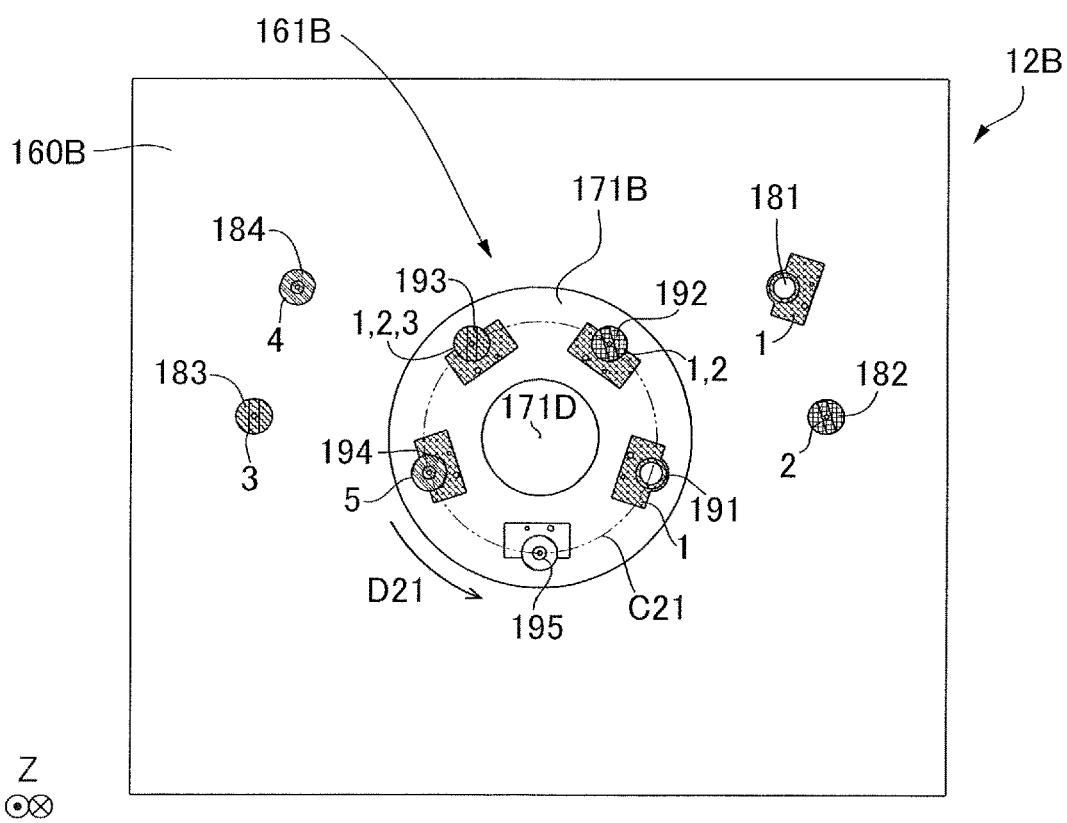
FIG. 15B is a plan view of a second unit of the mold according to the second exemplary embodiment.

Next, an assembling apparatus and a method of producing an assembled product using the assembling apparatus according to a second exemplary embodiment will be described. FIG. 15A is a plan view of a first unit of a mold according to the second exemplary embodiment, and FIG. 15B is a plan view of a second unit of the mold according to the second exemplary embodiment. To be noted, the configuration of the assembling apparatus, the configuration of the assembled product, and steps for producing the assembled product are substantially the same as in the first exemplary embodiment except for a mold 11B serving as a first unit and a mold 12B serving as a second unit, and description of the same elements will be omitted.

The mold 11B of the second exemplary embodiment includes a mold body 110B and a movable portion 111B serving as a first movable portion movable with respect to the mold body 110B. Similarly to the first exemplary embodiment, the movable portion 111B includes the plurality of groups of forming portions 131 to 134 of the same number as the parts 1 to 4 to be formed illustrated in FIG. 1A. The movable portion 111B includes disc-like rotatable boards 121B and 122B rotatable with respect to the mold body 110B. The rotatable boards 121B and 122B respectively rotate about rotation axes 121D and 122D. The rotation axes 121D and 122D are virtual axes extending in the arrow Z direction and respectively passing through the centers of the rotatable boards 121B and 122B. The number of the rotatable boards 121B and 122B is smaller than the number of the groups of forming portions 131 to 134, in other words, smaller than the number of the parts 1 to 4 to be formed, and is two in the second exemplary embodiment. That is, at least one, all in the second exemplary embodiment, of the plurality of rotatable boards 121B and 122B includes two or more groups of forming portions.

The rotatable boards 121B and 122B are each rotationally driven by the driving portion 61 illustrated in FIG. 2. The rotatable boards 121B and 122B rotate in synchronization by being driven by the driving portion 61. The driving portion 61 includes the motor M1 and the transmission mechanism 71 that transmits the driving force of the motor M1 to the rotatable boards 121B and 122B. In the second exemplary embodiment, since the movable portion 111B is constituted by the two rotatable boards 121B and 122B, which are fewer than in the first exemplary embodiment, the configuration of the transmission mechanism 71 of the driving portion 61 for driving the rotatable boards 121B and 122B is simpler than in the first exemplary embodiment.

The rotatable board 121B includes one or more groups of forming portions, which are the two groups of forming portions 131 and 132 in the second exemplary embodiment, and the rotatable board 122B includes one or more groups of forming portions, which are the two groups of forming portions 133 and 134 in the second exemplary embodiment.

The group of forming portions 131 of the rotatable board 121B is constituted by the two forming portions 141 and 151 having the same shape similarly to the first exemplary embodiment. The group of forming portions 132 of the rotatable board 121B is constituted by the two forming portions 142 and 152 having the same shape similarly to the first exemplary embodiment. The forming portions 141, 151, 142, and 152 are arranged on a virtual circle centered on the rotation axis 121D of the rotatable board 121B, that is, on a circle C31 in FIG. 15A. Specifically, the forming portions 141, 142, 151, and 152 are arranged in this order in the circumferential direction about the rotation axis 121D.

The forming portions 141 and 151 are disposed to have a two-fold rotational symmetry about the rotation axis 121D, and the forming portions 142 and 152 are disposed to have a two-fold rotational symmetry about the rotation axis 121D. The forming portions 141, 151, 142, and 152 are alternately switched between the positions P11 and P12 for molding and the positions P21 and P22 for assembly by rotating the rotatable board 121B by 180° in an arrow D5 direction. That is, when the forming portions 141 and 142 move to the positions P11 and P12, the forming portions 151 and 152 move to the positions P21 and P22, and when the forming portions 141 and 142 move to the positions P21 and P22, the forming portions 151 and 152 move to the positions P11 and P12.

The group of forming portions 133 of the rotatable board 122B is constituted by the two forming portions 143 and 153 having the same shape similarly to the first exemplary embodiment. The group of forming portions 134 of the rotatable board 122B is constituted by the two forming portions 144 and 154 having the same shape similarly to the first exemplary embodiment. The forming portions 143, 153, 144, and 154 are arranged on a virtual circle centered on the rotation axis 122D of the rotatable board 122B, that is, on a circle C32 in FIG. 15A. Specifically, the forming portions 143, 144, 153, and 154 are arranged in this order in the circumferential direction about the rotation axis 122D.

The forming portions 143 and 153 are disposed to have a two-fold rotational symmetry about the rotation axis 122D, and the forming portions 144 and 154 are disposed to have a two-fold rotational symmetry about the rotation axis 122D. The forming portions 143, 153, 144, and 154 are alternately switched between the positions P13 and P14 for molding and the positions P23 and P24 for assembly by rotating the rotatable board 122B by 180° in an arrow D6 direction. That is, when the forming portions 143 and 144 move to the positions P13 and P14, the forming portions 153 and 154 move to the positions P23 and P24, and when the forming portions 143 and 144 move to the positions P23 and P24, the forming portions 153 and 154 move to the positions P13 and P14.

The mold 12B includes a mold body 160B and a movable portion 161B serving as a second movable portion movable with respect to the mold body 160B as illustrated in FIG. 15B. The movable portion 161B includes a ring-like rotatable board 171B rotatable with respect to the mold body 160B. The rotatable board 171B rotates about a rotation axis 171D. The rotation axis 171D is a virtual axis extending in the arrow Z direction and passing through the center of the rotatable board 171B. The rotatable board 171B is rotationally driven by the driving portion 62 illustrated in FIG. 2.

The mold body 160B includes the four forming portions 181 to 184 serving as a plurality of second forming portions similarly to the first exemplary embodiment. The number of the forming portions 181 to 184 is equal to the number of the parts 1 to 4 to be formed, that is, four.

The rotatable board 171B includes the plurality of assembling portions 191 to 195 similarly to the first exemplary embodiment. The number of the assembling portions 191 to 195 is the same or greater than the number of the parts 1 to 4 to be formed, and is five in the second exemplary embodiment.

The method of producing the assembled product 5 in the second exemplary embodiment follows the flowchart of FIG. 6 described in the first exemplary embodiment. To be noted, although the four rotatable boards 121 to 124 are rotated by 180° in the directions of the arrows D1 to D4 in step S4 of FIG. 6 in the first exemplary embodiment, in the second exemplary embodiment, the two rotatable boards 121B and 122B may be rotated by 180° in the directions of the arrows D5 and D6. In step S4, the rotatable board 171B may be rotated by 72° in the direction of the arrow D21.

According to the second exemplary embodiment, the production efficiency of the assembled product 5 is improved similarly to the first exemplary embodiment. The configuration of the driving portion 61 that drives the rotatable boards 121B and 122B is simplified, and thus the assembling apparatus can be miniaturized.

Third Exemplary Embodiment

Figure 16A:
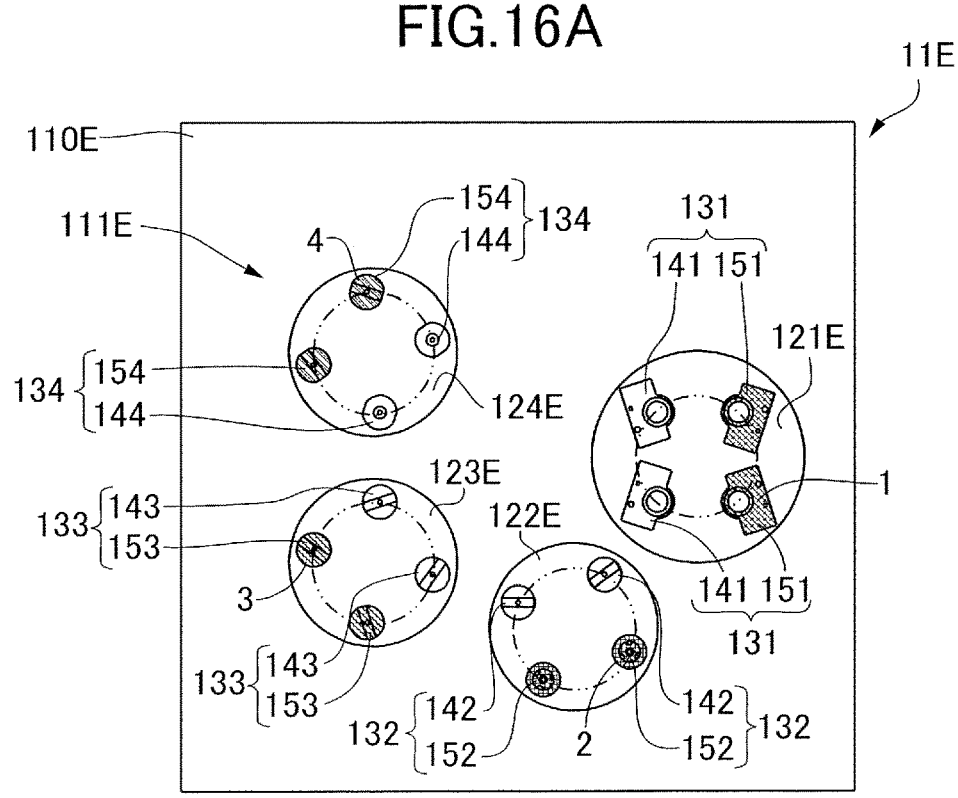
FIG. 16A is a plan view of a first unit of a mold according to a third exemplary embodiment
Figure 16B:
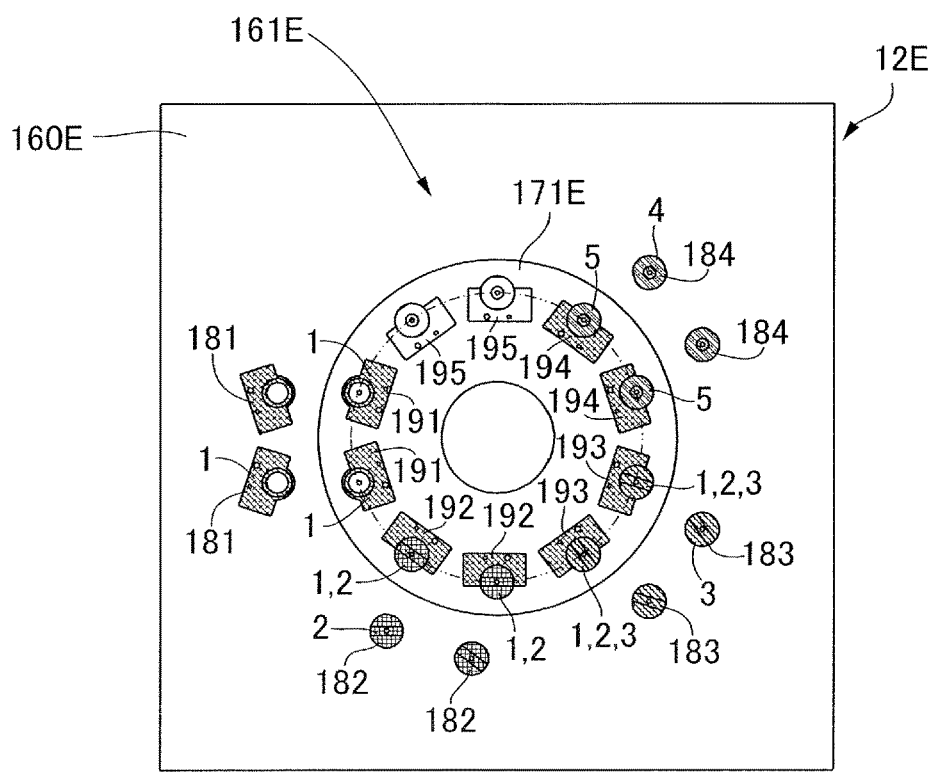
FIG. 16B is a plan view of a second unit of the mold according to the third exemplary embodiment.

Next, an assembling apparatus and a method of producing an assembled product using the assembling apparatus according to a third exemplary embodiment will be described. FIG. 16A is a plan view of a first unit of a mold according to the third exemplary embodiment, and FIG. 16B is a plan view of a second unit of the mold according to the third exemplary embodiment. To be noted, the configuration of the assembling apparatus, the configuration of the assembled product, and steps for producing the assembled product are substantially the same as in the first exemplary embodiment except for a mold 11E serving as a first unit and a mold 12E serving as a second unit, and description of the same elements will be omitted.

In the first exemplary embodiment, a case where one assembled product 5 is produced in one cycle by using the mold 10 has been described. In the third exemplary embodiment, a plurality of assembled products 5, for example, two assembled products 5, are produced in one cycle by using a mold serving as an example of a forming mold and including the molds 11E and 12E.

Accordingly, the mold 11E of the third exemplary embodiment includes a plurality of sets of the plurality of groups of forming portions 131 to 134. That is, the mold 11E includes two sets of the plurality groups of the forming portions 131 to 134. The mold 12E includes a plurality of sets of, that is, two sets of the plurality of forming portions 181 to 184, and, similarly, includes a plurality of sets of, that is, two sets of the assembling portions 191 to 195.

Specifically, the mold 11E includes a mold body 110E and a movable portion 111E serving as a first movable portion movable with respect to the mold body 110E. The movable portion 111E includes four rotatable boards 121E, 122E, 123E, and 124E similarly to the first exemplary embodiment. The rotatable boards 121E to 124E each include two sets of corresponding one of the groups of forming portions 131 to 134.

The mold 12E includes a mold body 160E and a movable portion 161E serving as a first movable portion movable with respect to the mold body 160E. The movable portion 161E includes one rotatable board 171E similarly to the first exemplary embodiment. The mold body 160E includes the two sets of the forming portions 181 to 184, and the rotatable board 171E includes the two sets of the assembling portions 191 to 195. In the mold body 160E, the forming portions are arranged in the order of the forming portions 181, 181, 182, 182, 183, 183, 184, and 184 in the circumferential direction. In the rotatable board 171E, the assembling portions are arranged in the order of the assembling portions 191, 191, 192, 192, 193, 193, 194, 194, 195, and 195 in the circumferential direction.

According to the configuration of the molds 11E and 12E described above, two sets of the cavities CA1 to CA4 illustrated in FIGS. 4A to 4D are defined, and, at the same time, assembly of two sets of the plurality of parts 1 to 4 is performed at the two sets of four of the plurality of assembling portions 191 to 195 in step S1 of FIG. 6. Then, in step S2 of FIG. 6, a plurality of sets of the plurality of parts 1 to 4 are formed. According to the third exemplary embodiment, a plurality of assembled products 5 are produced from one mold in each cycle, and thus the production efficiency of the assembled product 5 is further improved.

To be noted, a case where the rotatable boards 121E to 124E each include the same kinds of groups of forming portions among the groups of forming portions 131 to 134 has been described above. For example, in the description above, the rotatable board 121E includes two sets of the same group of forming portions 131. However, the combination of groups of forming portions included in the rotatable boards 121E to 124E is not limited to this. That is, the rotatable boards 121E to 124E each may include different kinds of groups of forming portions. For example, in the case where two sets of the forming portions 131 to 134 are provided, the rotatable board 121E may include the group of forming portions 131 and a group of forming portions different from the group of forming portions 131, for example, the group of forming portions 134. In this case, the placement of the two sets of the forming portions 181 to 184 and the two sets of the assembling portions 191 to 195 in the mold 12E may be determined in accordance with the arrangement of the two sets of the groups of forming portions 131 to 134 in the mold 11E.

Fourth Exemplary Embodiment

Figure 17:
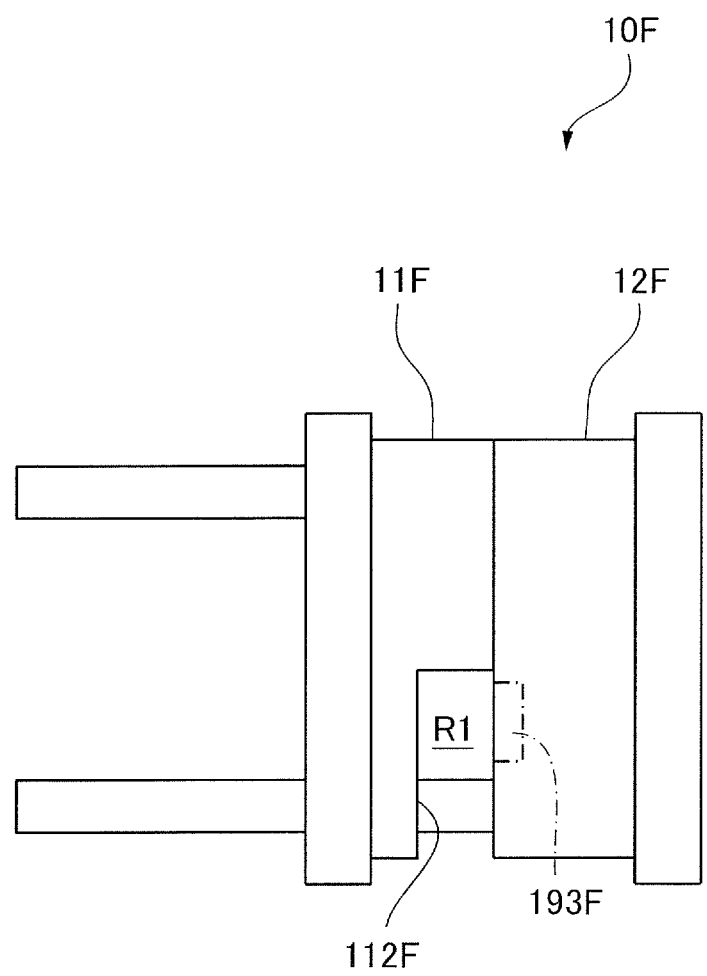
FIG. 17 is a schematic diagram illustrating a mold of an assembling apparatus according to a fourth exemplary embodiment.
Figure 18A:
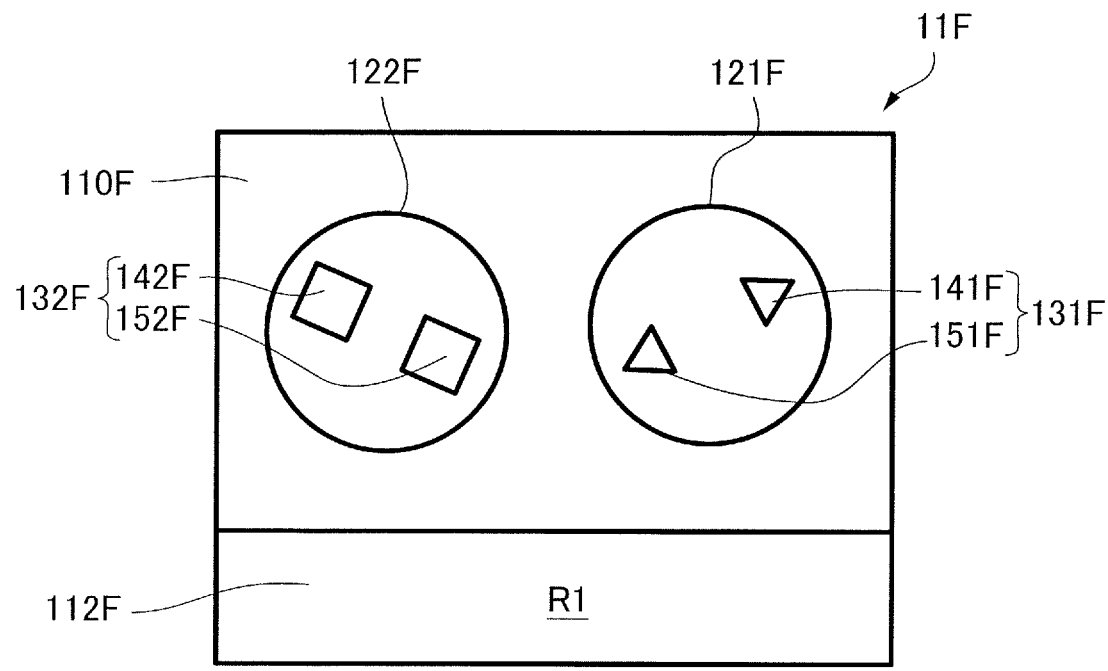
FIG. 18A is a plan view of a first unit of a mold according to a fourth exemplary embodiment.
Figure 18B:
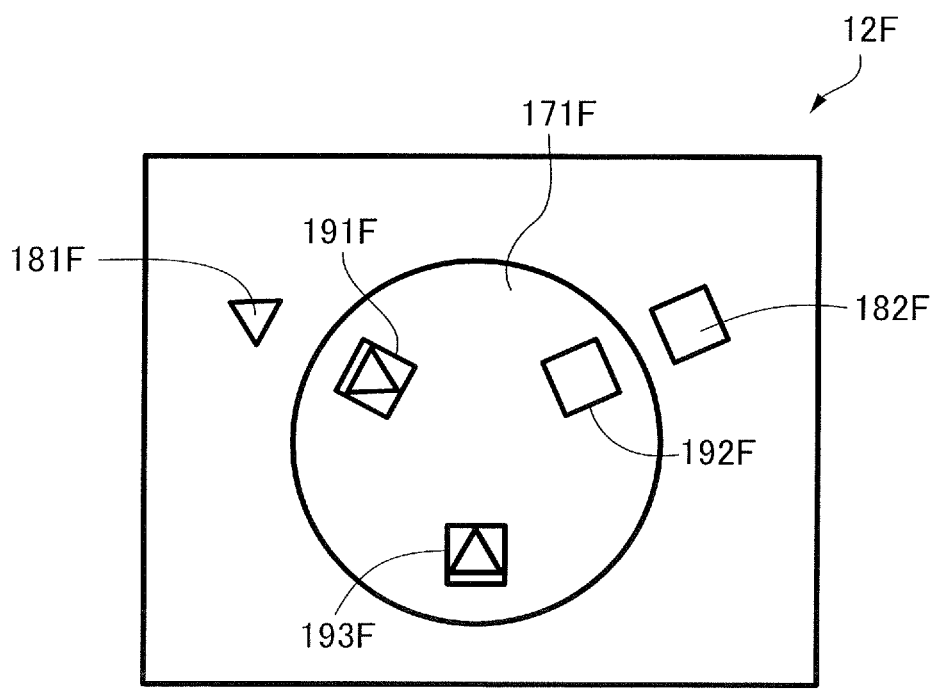
FIG. 18B is a plan view of a second unit of the mold according to the fourth exemplary embodiment.

Next, an assembling apparatus and a method of producing an assembled product using the assembling apparatus according to a fourth exemplary embodiment will be described. FIG. 17 is a schematic diagram illustrating a mold of the assembling apparatus according to the fourth exemplary embodiment. FIG. 18A is a plan view of a first unit of the mold according to the fourth exemplary embodiment, and FIG. 18B is a plan view of a second unit of the mold according to the fourth exemplary embodiment. A mold 10F serving as an example of the mold includes a mold 11F serving as a first unit and a mold 12F serving as a second unit, and can be opened and clamped by driving either one of the molds 11F and 12F. In the fourth exemplary embodiment, the mold 11F is a movable mold, and the mold 12F is a stationary mold. To be noted, the configuration of the assembling apparatus, the configuration of the assembled product, and steps for producing the assembled product are substantially the same as in the first exemplary embodiment except for the mold 11F serving as a first unit and the mold 12F serving as a second unit, and description of the same elements will be omitted.

The mold 11F serving as a first unit includes a mold body 110F and two rotatable boards 121F and 122F rotatable with respect to the movable body 110F. The rotatable boards 121F and 122F respectively include groups of forming portions 131F and 132F. The group of forming portions 131F includes forming portions 141F and 151F serving as two or more first forming portions, and the group of forming portions 132F includes forming portions 142F and 152F serving as two or more first forming portions.

The mold 12F serving as a second unit includes a mold body 160F and a rotatable board 171F rotatable with respect to the mold body 160F. The mold body 160F includes two forming portions 181F and 182F serving as a plurality of second forming portions. The rotatable board 171F includes a plurality of assembling portions 191F, 192F, and 193F. The number of the assembling portions 191F to 193F is greater than the number of the groups of forming portions 131F and 132F, in other words, greater than the number of the forming portions 181F and 182F, and is three in the fourth exemplary embodiment.

In the fourth exemplary embodiment, an assembling portion not opposing either of the forming portions 141F and 142F or the forming portions 151F and 152F among the plurality of assembling portions 191F to 193F is exposed in a state in which the molds 11F and 12F are clamped. The assembling portion is exposed such that an assembled product can be taken out. In the phase of the rotatable board 171F of FIG. 18B, the assembling portion 193F is exposed such that the assembled product can be taken out.

More specifically, the mold 11F is provided with a cutout portion 112F defining a space R1 at a position opposing an assembling portion not opposing either of the forming portions 141F and 142F or the forming portions 151F and 152F among the plurality of assembling portions 191F to 193F. Further, by repeating the cycle of steps S1 to S4 illustrated in FIG. 6 and described in the first exemplary embodiment, the assembling portion in which the assembled product whose assembly has been completed sequentially communicates with the space R1. The unillustrated robot can access the assembling portion in which the assembled product is disposed through the space R1 and take out the assembled product even in a state in which the molds 11F and 12F are clamped, thus the time for one cycle of steps S1 to S4 can be shortened, and the production efficiency of the assembled product is further improved.

Fifth Exemplary Embodiment

Figure 19A:
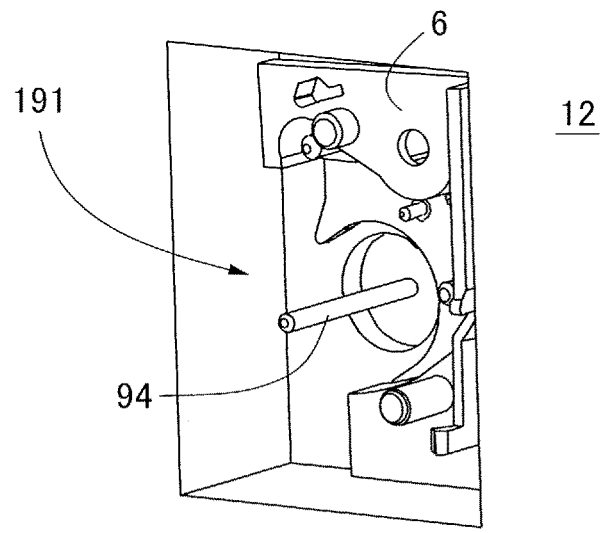
FIG. 19A is a diagram for describing an operation of covering an assembled product according to a fifth exemplary embodiment with cases.
Figure 19B:
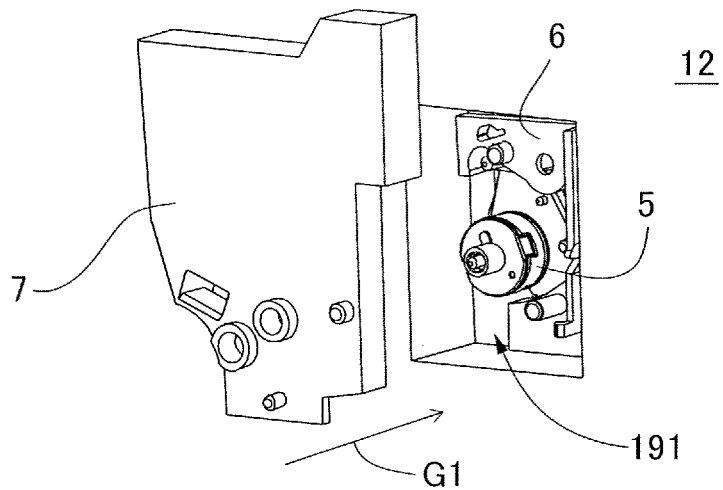
FIG. 19B is a diagram for describing the operation of covering the assembled product according to the fifth exemplary embodiment with the cases.
Figure 19C:
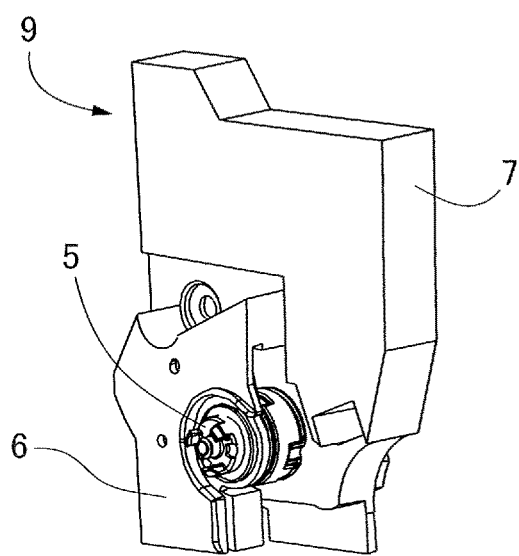
FIG. 19C is a diagram for describing the operation of covering the assembled product according to the fifth exemplary embodiment with the cases.

Next, an assembling apparatus and a method of producing an assembled product using the assembling apparatus according to a fifth exemplary embodiment will be described. FIGS. 19A to 19C are diagrams for describing an operation of covering an assembled product according to the fifth exemplary embodiment with cases. In the fifth exemplary embodiment, a drive transmission unit 9 is produced by covering the assembled product 5 described in the first exemplary embodiment with cases 6 and 7 as illustrated in FIG. 19C. To be noted, in the fifth exemplary embodiment, the drive transmission unit 9 is produced by using the assembling apparatus 100 described in the first exemplary embodiment. To be noted, in the fifth exemplary embodiment, description will be given by focusing on the assembling portion 191 among the plurality of assembling portions 191 to 195.

In the fifth exemplary embodiment, after the mold 10 illustrated in FIG. 2 is opened in step S3 of FIG. 6, the case 6 is set in the assembling portion 191 that is empty as illustrated in FIG. 19A. Then, by repetitively performing the cycle of steps S1 to S4 as described in the first exemplary embodiment, the parts 1 to 4 illustrated in FIGS. 1A and 1B are sequentially mounted on the case 6 as illustrated in FIG. 19B, and thus the assembled product 5 is produced. Thereafter, the case 7 is attached to the case 6 in a direction of an arrow G1 by the unillustrated robot, and thus the drive transmission unit 9 illustrated in FIG. 19C is produced. The drive transmission unit 9 that has been produced is taken out from the assembling portion 191 by the unillustrated robot. To be noted, the same operation is also performed for the assembling portions 192 to 195. As described above, the assembling portions 191 to 195 can be used for other purposes than the assembly of the assembled product 5 by the mold 10.

Sixth Exemplary Embodiment

Figure 20A:
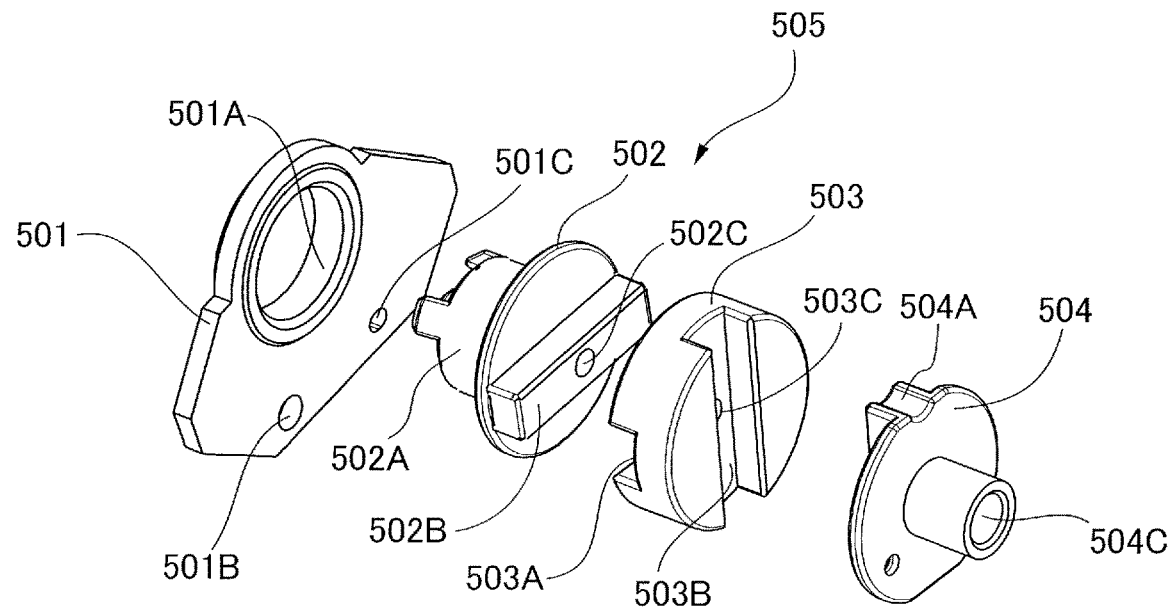
FIG. 20A is a perspective view of a plurality of parts of an assembled product according to a sixth exemplary embodiment in a separated state.
Figure 20B:
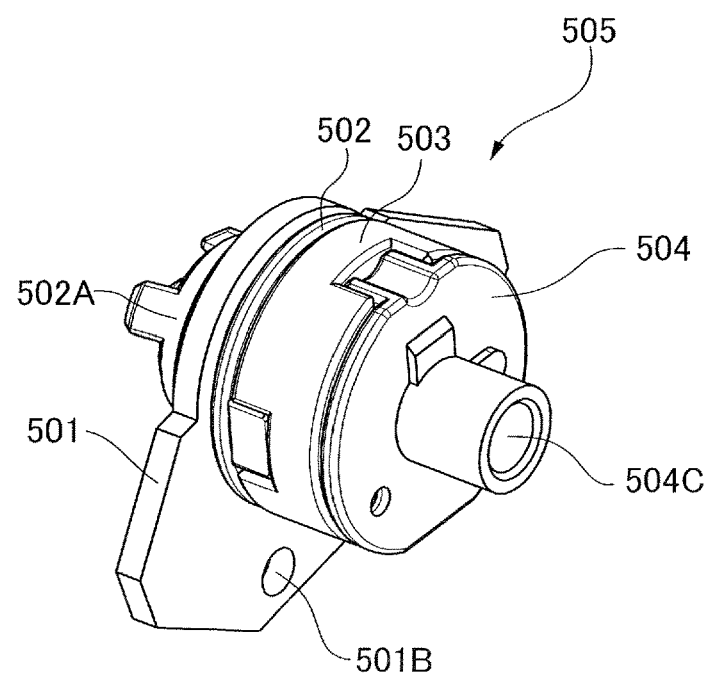
FIG. 20B is the assembled product according to the sixth exemplary embodiment in an assembled state.

FIG. 20A is a perspective view of a plurality of parts constituting an assembled product according to a sixth exemplary embodiment in a separate state. FIG. 20B is a perspective view of the assembled product in an assembled state. An assembled product 505 is incorporated in, for example, an electronic device such as an image forming apparatus. The assembled product 505 is, for example, a member for transmitting rotational driving force, and needs to be assembled with a high precision. The assembled product 505 is constituted by a plurality of parts, for example, four parts 501, 502, 503, and 504. The parts 501 to 504 are each a resin part formed by injection molding. The assembled product 505 is constituted by fitting the parts 501 to 504 of a plurality of kinds together. More specifically, a cylindrical portion 502A of the part 502 is fitted in a through hole 501A of the part 501, a projection portion 502B of the part 502 is fitted in a recess portion 503A of the part 503, a projection portion 504A of the part 504 is fitted in a recess portion 503B of the part 503, and thus the assembled product 505 is assembled. To be noted, the parts 501 to 504 are respectively provided with engagement holes 501B, 501C, 502C, 503C, and 504C with which engagement pins that will be described later engage at the time of an assembly operation.

Figure 21:
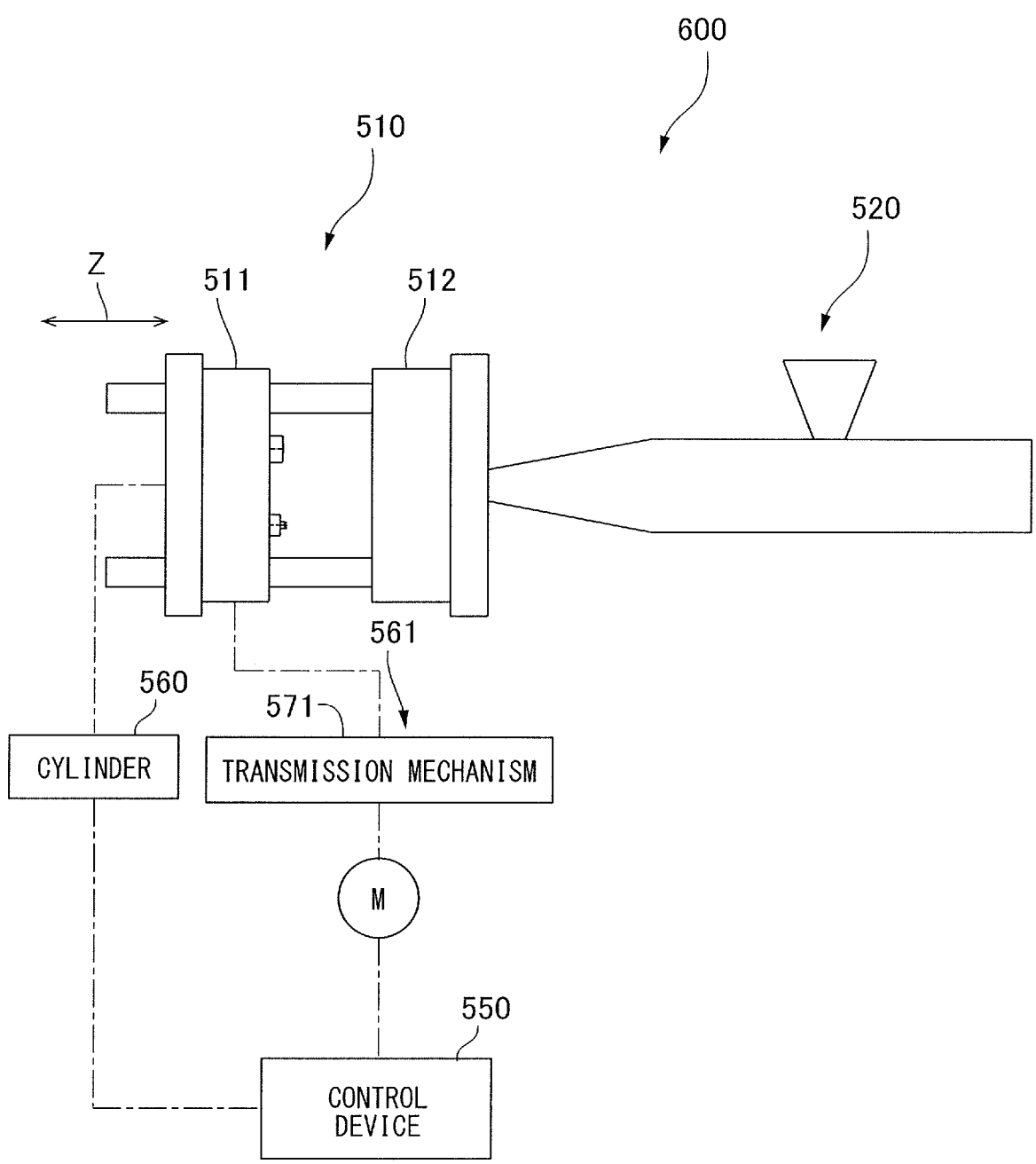
FIG. 21 is a schematic diagram illustrating an assembling apparatus used for producing the assembled product according to the sixth exemplary embodiment.

FIG. 21 is a schematic diagram illustrating an assembling apparatus 600 used for producing the assembled product 505 in the sixth exemplary embodiment. The assembling apparatus 600 is an injection molding machine including a mold 510 and an injection portion 520. The mold 510 serves as an example of a forming mold. The injection portion 520 plasticizes a thermoplastic resin and injects molten resin into the mold 510. In the sixth exemplary embodiment, the parts 501 to 504 of the plurality of kinds illustrated in FIG. 20A are formed by the mold 510, and the parts 501 to 504 are assembled into the assembled product 505 illustrated in FIG. 20B. In the sixth exemplary embodiment, the parts 501 to 504 are assembled in the order of the part 501, the part 502, the part 503, and the part 504. To be noted, an unillustrated robot is disposed adjacent to the mold 510. The assembled product 505 after completion of the assembly is taken out by the unillustrated robot from the mold 510 that has been opened.

A specific configuration of the mold 510 will be described below. The mold 510 includes a mold 511 serving as a first unit and a mold 512 serving as a second unit opposing the mold 511. The mold 510 can be opened and clamped by driving either one of the molds 511 and 512 in an arrow Z direction. In the sixth exemplary embodiment, the mold 511 is a movable mold, and the mold 512 is a stationary mold. The mold 511 that is a movable mold is opened and closed in the arrow Z direction by a cylinder 560 serving as a driving portion with respect to the mold 512 that is a stationary mold. To be noted, a configuration in which the mold 511 is a stationary mold and the mold 512 is a movable mold may be also employed.

Figure 22A:
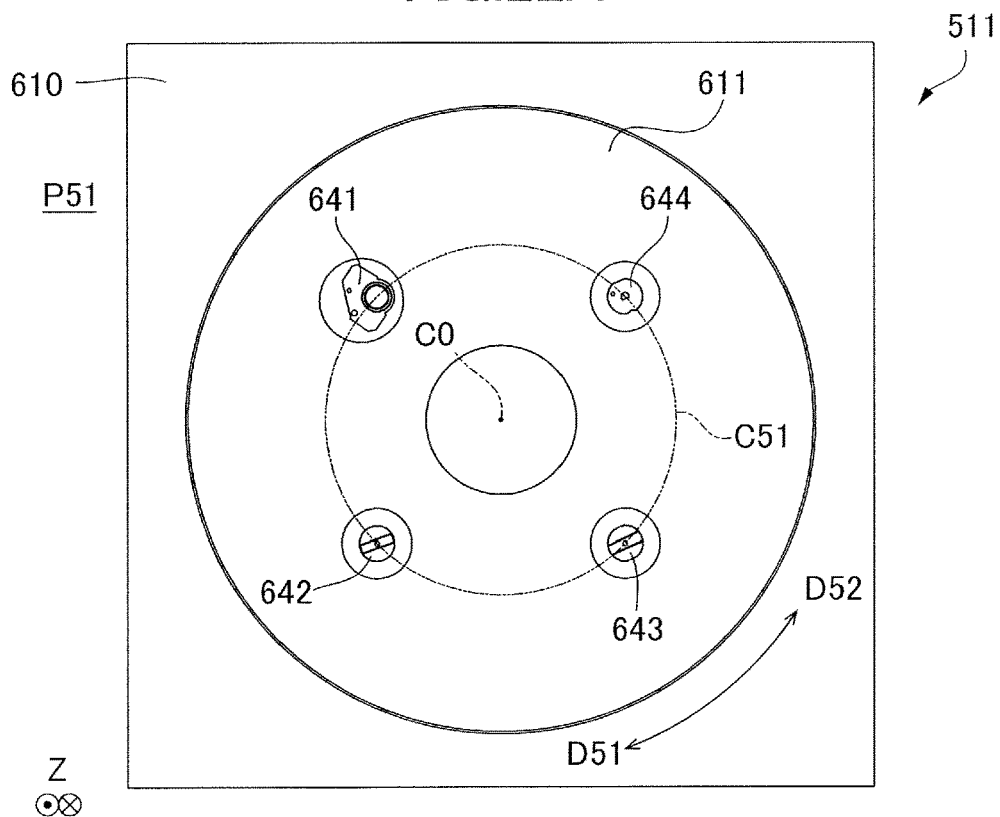
FIG. 22A is a plan view of a first unit according to the sixth exemplary embodiment.
Figure 22B:
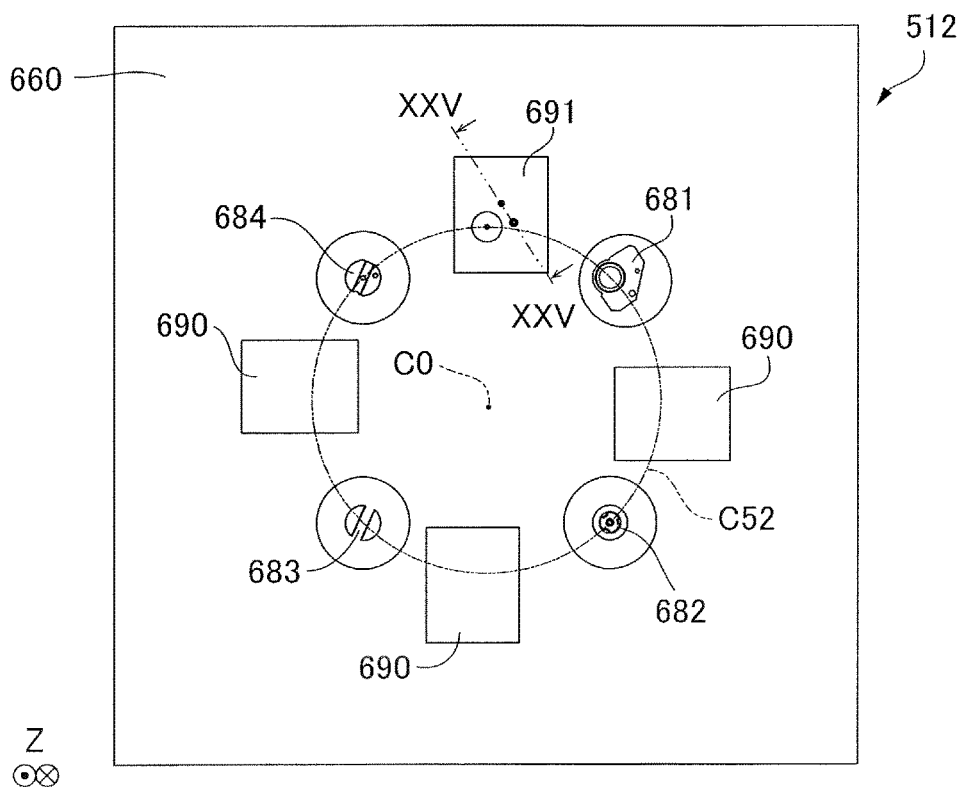
FIG. 22B is a plan view of a second unit according to the sixth exemplary embodiment.
Figure 23A:
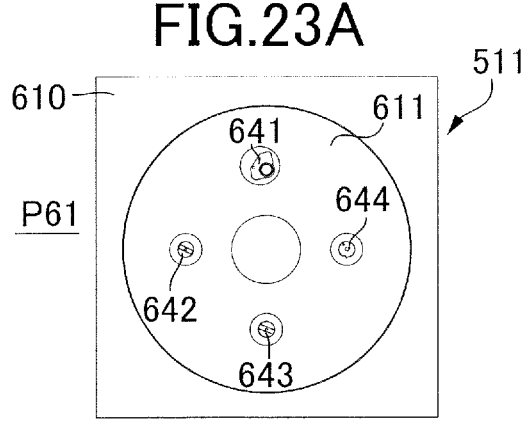
FIG. 23A is an explanatory diagram illustrating a state in which first forming portions according to the sixth exemplary embodiment are respectively opposed to assembling portions.
Figure 23B:
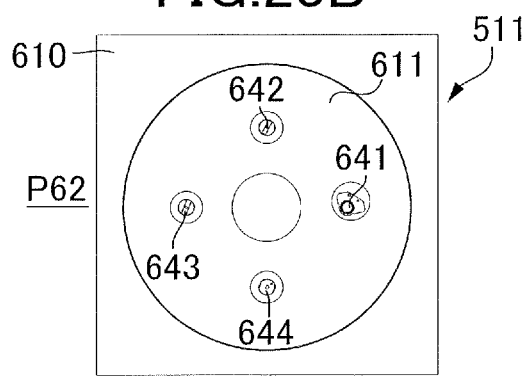
FIG. 23B is an explanatory diagram illustrating a state in which first forming portions according the sixth exemplary embodiment are respectively opposed to the assembling portions.
Figure 23C:
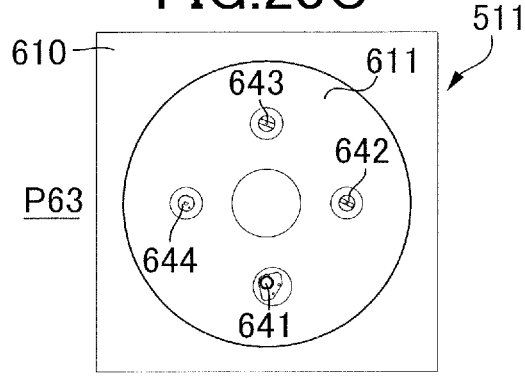
FIG. 23C is an explanatory diagram illustrating a state in which first forming portions according the sixth exemplary embodiment are respectively opposed to the assembling portions.
Figure 23D:
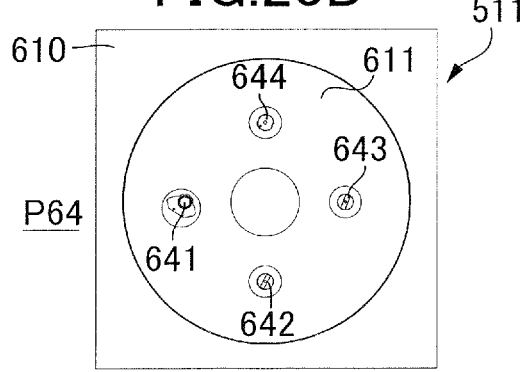
FIG. 23D is an explanatory diagram illustrating a state in which first forming portions according the sixth exemplary embodiment are respectively opposed to the assembling portions.
Figure 24A:
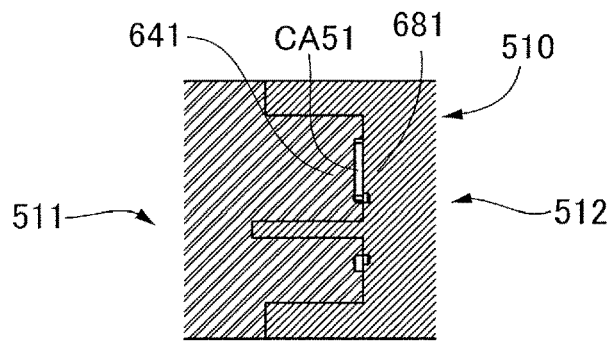
FIG. 24A is an explanatory diagram illustrating a cavity according to the sixth exemplary embodiment.
Figure 24B:
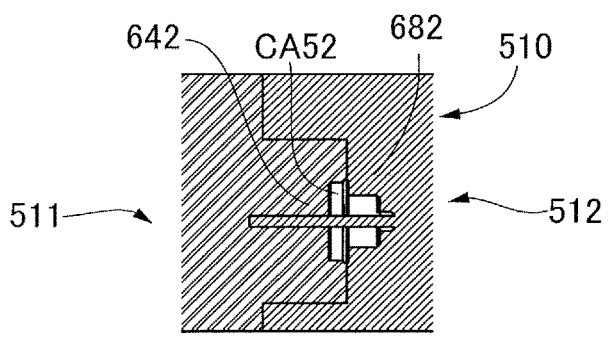
FIG. 24B is an explanatory diagram illustrating a cavity according to the sixth exemplary embodiment.
Figure 24C:
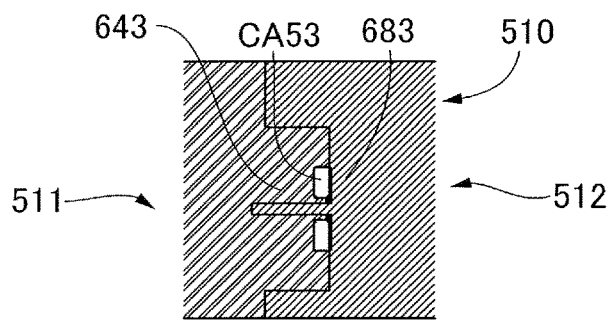
FIG. 24C is an explanatory diagram illustrating a cavity according to the sixth exemplary embodiment.
Figure 24D:
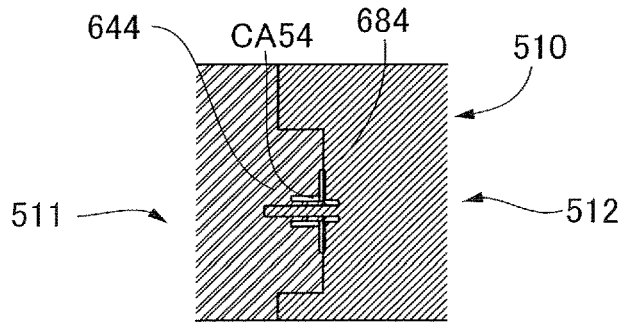
FIG. 24D is an explanatory diagram illustrating a cavity according to the sixth exemplary embodiment.

FIG. 22A is a plan view of the mold 511 serving as a first unit, and FIG. 22B is a plan view of the mold 512 serving as a second unit. The mold 511 includes a mold body 610 and a ring-like rotatable board 611 serving as a first member rotatable about an axis C0 with respect to the mold body 610. The axis C0 is a virtual axis extending in the arrow Z direction and passing through the center of the rotatable board 611. The rotatable board 611 is rotationally driven in a first direction D51 or a second direction D52 opposite to the first direction by a driving portion 561 illustrated in FIG. 21. The first direction D51 is a rotational direction about the axis C0 illustrated in FIG. 22A. In FIG. 22A, the first direction D51 is clockwise, and the second direction D52 is counterclockwise. The driving portion 561 illustrated in FIG. 21 includes a motor M and a transmission mechanism 571 that includes, for example, a gear, and transmits the driving force of the motor M to the rotatable board 611 illustrated in FIG. 22A.

The rotatable board 611 illustrated in FIG. 22A includes forming portions 641, 642, 643, and 644 serving as a plurality of first forming portions of the same number as the parts 501 to 504 to be formed. The forming portions 641 to 644 serve as a portion of cavities for forming parts, or serve as holding portions that hold the parts that have been formed. The forming portions 641 to 644 are arranged on a virtual first circle centered on the axis C0 of the rotatable board 611, that is, on a circle C51 in FIG. 22A. In FIG. 22A, the forming portion 641, the forming portion 642, the forming portion 643, and the forming portion 644 are arranged counterclockwise in this order along the circle C51.

The mold 512 illustrated in FIG. 22B includes a mold body 660 serving as a second member opposing the mold 511 illustrated in FIG. 22A, that is, opposing the rotatable board 611. The mold body 660 is provided to be fixed so as to be unrotatable. The mold body 660 includes four forming portions 681, 682, 683, and 684 serving as a plurality of second forming portions that serve as another portion of the cavities for forming the parts. The number of the forming portions 681 to 684 is equal to the number of the parts 501 to 504 to be formed illustrated in FIG. 20A, in other words, equal to the number of the forming portions 641 to 644, that is, four.

The mold body 660 includes one assembling portion 691. The forming portions 681 to 684 and the assembling portion 691 are arranged on a virtual second circle centered on the axis C0, that is, on a circle C52 in FIG. 22B. In FIG. 22B, the forming portion 681, the forming portion 682, the forming portion 683, and the forming portion 684 are arranged clockwise in this order along the circle C52. Further, the assembling portion 691 is disposed between the forming portions 681 and 684. The radius of the circle C51 and the radius of the circle C52 are the same.

The rotatable board 611 of the mold 511 is capable of rotating to a position P51, or a phase, in which the plurality of forming portions 641 to 644 are respectively opposed to the plurality of forming portions 681 to 684 as illustrated in FIG. 22A. The rotatable board 611 of the mold 511 is capable of rotating to a position, or a phase, in which one of the plurality of forming portions 641 to 644 is opposed to the assembling portion 691. FIGS. 23A to 23D are explanatory diagrams illustrating respective states in which the forming portions 641 to 644 are opposed to the assembling portion 691. The rotatable board 611 is capable of rotating to positions P61 to P64, or phases, in which the forming portions 641 to 644 are respectively opposed to the assembling portion 691 as illustrated in FIGS. 23A to 23D.

When the mold 510 is clamped in a state in which the plurality of forming portions 641 to 644 are respectively opposed to the plurality of forming portions 681 to 684 illustrated in FIG. 22B, a plurality of cavities for respectively forming the parts 501 to 504 are defined. FIGS. 24A to 24D are explanatory diagrams illustrating cavities defined when the mold 510 is clamped. As illustrated in FIGS. 24A to 24D, cavities CA51 to CA54 illustrated in FIG. 20A for respectively forming the parts 501 to 504 are respectively defined as a result of the forming portions 641 to 644 abutting the forming portions 681 to 684 when the mold 510 is clamped as illustrated in FIGS. 24A to 24D. The cavities CA51 to CA54 are spaces respectively having shapes corresponding to the parts 501 to 504 to be formed illustrated in FIG. 20A.

In the sixth exemplary embodiment, the forming portions 641 to 644 of the mold 511 have such shapes as to be capable of holding the parts 501 to 504 formed by injection molding. In contrast, the forming portions 681 to 684 have such shapes that the parts 501 to 504 formed by injection molding are easily detached. Therefore, when the mold 510 is opened after injection molding, the parts 501 to 504 that have formed are held by the forming portions 641 to 644.

Figure 25:
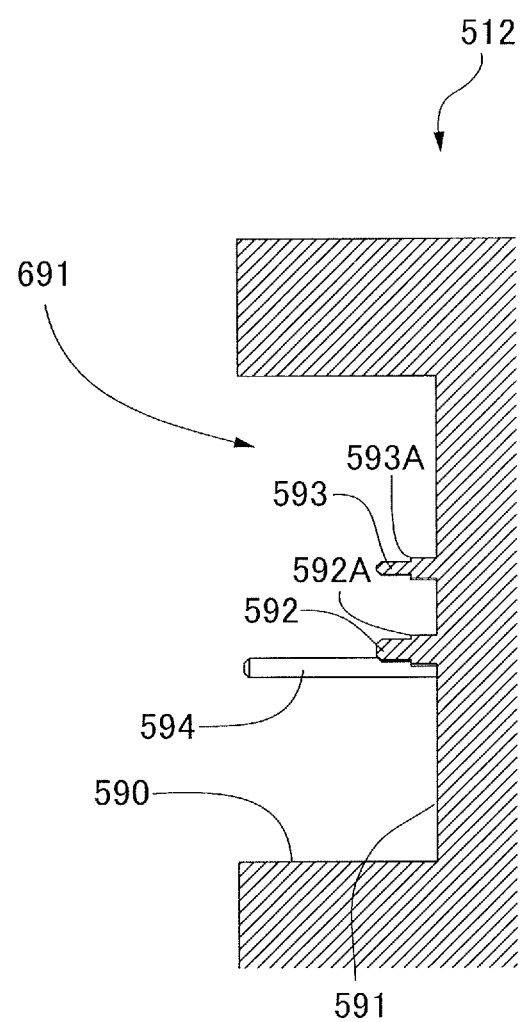
FIG. 25 is a section view of an assembling portion of the second unit taken along a line XXV-XXV illustrated in FIG. 22B.

The assembling portion 691 is a portion at which assembly of the assembled product 505 is performed, that is, a portion at which the parts 501 to 504 are mounted on one another, and is configured to support the parts 501 to 504 respectively supplied from the forming portions 641 to 644. FIG. 25 is a section view of the assembling portion 691 of the mold 512 taken along a line XXV illustrated in FIG. 22B. The assembling portion 691 includes a recess portion 590 and a plurality of engagement pins 592, 593, and 594 provided to stand on a bottom surface 591 of the recess portion 590. The recess portion 590 defines a space in which the plurality of parts 501 to 504 illustrated in FIG. 20A, that is, the assembled product 505 is accommodated. The engagement pins 592 and 593 respectively engage with the engagement holes 501B and 501C of the part 501 illustrated in FIG. 20A at the time of an assembly operation by clamping the mold 510. The engagement pins 592 and 593 are respectively provided with step portions 592A and 593A, and the part 501 engaged with the engagement pins 592 and 593 abuts the step portions 592A and 593A. The engagement pin 594 engages with the engagement hole 502C, 503C, or 504C of the part 502, 503, or 504 illustrated in FIG. 20A at the time of the assembly operation by clamping the mold 510. At the time of this assembly operation, the engagement pins 592 to 594 engage with the part 501, 502, 503, or 504 illustrated in FIG. 20A, and thus position the part. The assembled product 505 can be assembled by fitting the parts 501 to 504 disposed on the engagement pins 592 and 593 or already disposed in the recess portion 590 with one another.

Opening and closing of the mold 510 illustrated in FIG. 21 is controlled by a control device 550. Rotation of the rotatable board 611 illustrated in FIG. 22A is controlled by the control device 550 illustrated in FIG. 21. That is, the control device 550 performs opening and clamping of the mold 510 by controlling the cylinder 560. The control device 550 adjusts the rotational position or phase of the rotatable board 611 illustrated in FIG. 22A by controlling the motor M. In the sixth exemplary embodiment, no driving target such as a rotatable board is provided in the mold 512. Therefore, a driving portion for driving the mold 512 is not needed. The injection portion 520 injects molten resin into the plurality of cavities CA51 to CA54 illustrated in FIG. 24 defined in the clamped mold 510.

Figure 26:
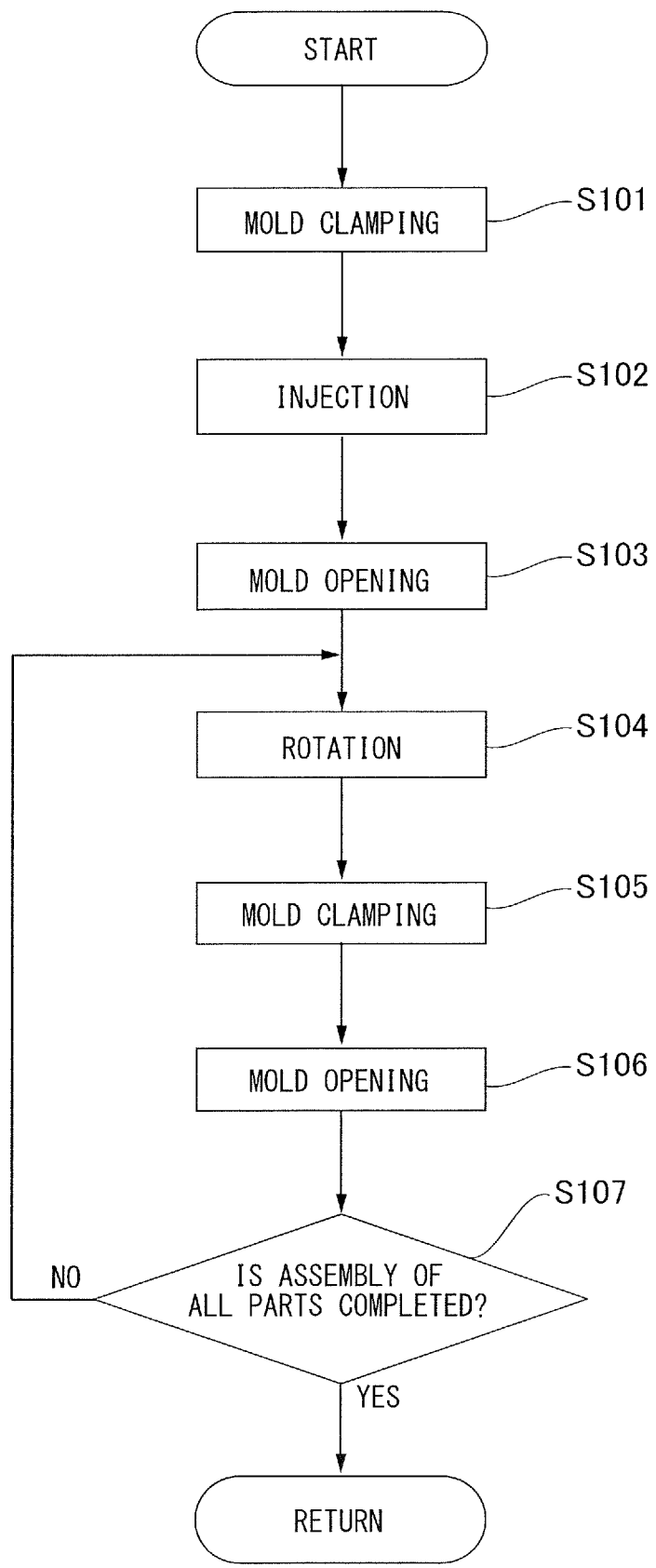
FIG. 26 is a flowchart illustrating a method of producing the assembled product according to the sixth exemplary embodiment.

A method of forming the parts 501 to 504 by using the mold 510 and assembling the assembled product 505 from the parts 501 to 504, that is, a method of producing the assembled product 505 will be described. FIG. 26 is a flowchart illustrating a method of producing the assembled product 505 according to the sixth exemplary embodiment. To be noted, the steps that will be described below are performed under the control of the control device 550 illustrated in FIG. 21.

First, the mold 510 is clamped in step S101 serving as a first step. At this time, the rotatable board 611 is moved to the position P51 as illustrated in FIG. 22A. That is, the rotatable board 611 is rotated such that the forming portions 641 to 644 are respectively opposed to the forming portions 681 to 684, and the mold 510 is clamped. As a result of this, the cavities CA51 to CA54 are respectively defined by the forming portions 641 to 644 and the forming portions 681 to 684.

Next, molten resin is injected into the mold 510 by the injection portion 520 illustrated in FIG. 21 in step S102 serving as a second step. That is, molten resin is injected into each of the plurality of cavities CA51 to CA54 defined in the mold 510 clamped in step S101, the molten resin is cooled to solidify, and thus the plurality of parts 501 to 504 are formed.

Next, after the parts 501 to 504 are formed in step S102, the mold 510 is opened in step S103 serving as a third step in a state in which the parts 501 to 504 are respectively held by the forming portions 641 to 644 of the mold 511. That is, by opening the mold 510 in step S103, the parts 501 to 504 are separated from the forming portions 681 to 684 of the mold 512 in a state of being respectively held by the forming portions 641 to 644.

Figure 27A:
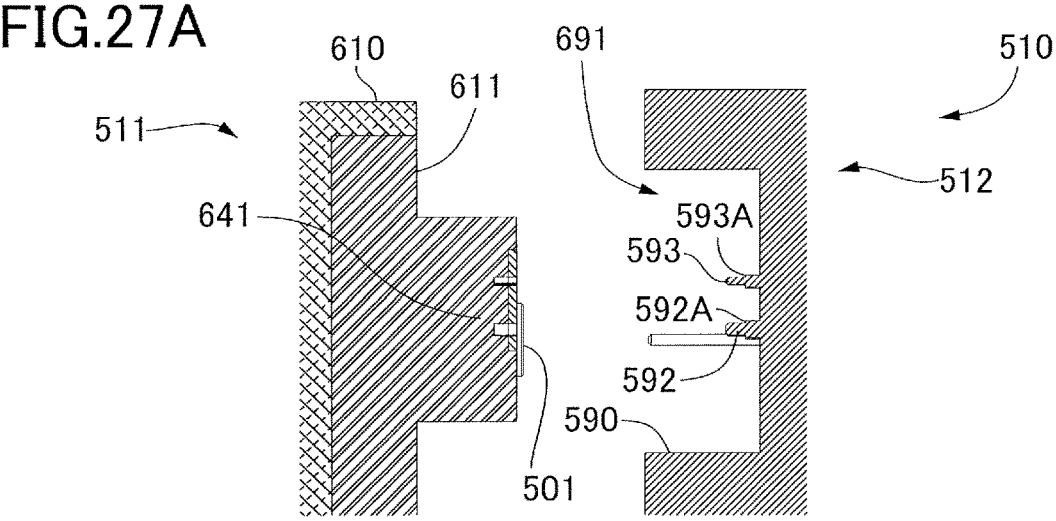
FIG. 27A is a schematic section view of the first unit and the second unit according to the sixth exemplary embodiment.

Next, after the mold 510 is opened in step S103, the rotatable board 611 of the mold 511 is rotated such that the forming portion 641 which holds the part 501 that is the first in the order of assembly, among the plurality of forming portions 641 to 644, is opposed to the assembling portion 691 in step S104 serving as a fourth step. That is, the rotatable board 611 is moved to the position P61 illustrated in FIG. 23A. FIG. 27A is a schematic section view of the molds 511 and 512 illustrating a state in which the forming portion 641 is opposed to the assembling portion 691 in step S104. By performing step S104, the forming portion 641 is opposed to the assembling portion 691 as illustrated in FIG. 27A. To be noted, although the rotatable board 611 may be rotated in either of the directions D51 and D52 when rotating the rotatable board 611 to the position P61 in which the forming portion 641 is opposed to the assembling portion 691 in step S104, it is preferable that a direction in which the amount of required rotation is smaller is selected for shortening the time.

Figure 27B:
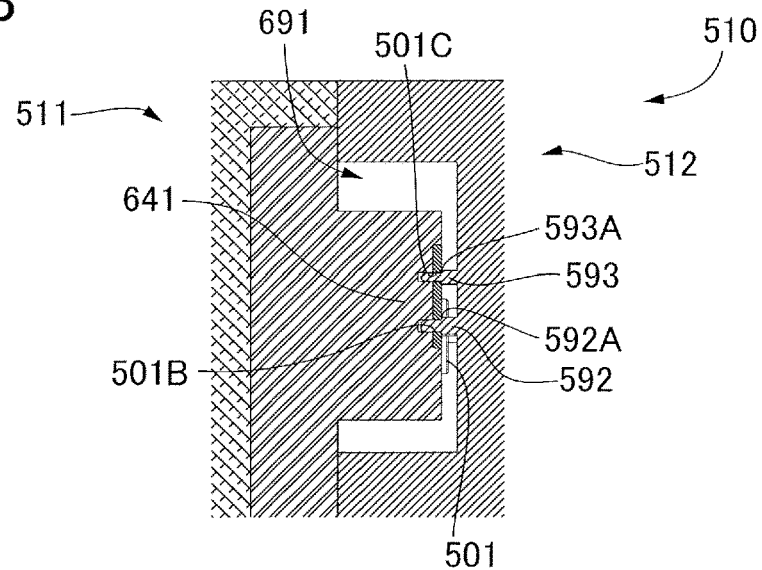
FIG. 27B is a schematic section view of the first unit and the second unit according to the sixth exemplary embodiment.

After step S104 is finished, the mold 510 is clamped in step S105 serving as a fifth step. As a result of this, the part 501 held by the forming portion 641 of the mold 511 is supplied to the assembling portion 691 of the mold 512 and disposed in the assembling portion 691. FIG. 27B is a schematic section view of the molds 511 and 512 illustrating a state in which the forming portion 641 is opposed to the assembling portion 691 and the mold 510 is clamped in step S105. The part 501 held by the forming portion 641 is supplied to the assembling portion 691 and pressed against the step portions 592A and 593A in a state in which the engagement pins 592 and 593 of the assembling portion 691 are engaged with the engagement holes 501B and 501C of the part 501 and thus positioned as illustrated in FIG. 27B.

To be noted, the mold 512 is provided with recess portions 690 as illustrated in FIG. 22B such that, when the mold 510 is clamped in a state in which one of the plurality of forming portions 641 to 644 is opposed to the assembling portion 691, the other three forming portions or parts do not collide with the mold 512. More specifically, the recess portions 690 are defined on the circle C52 and are respectively defined between the forming portions 681 and 682, between the forming portions 682 and 683, and between the forming portions 683 and 684.

Figure 27C:
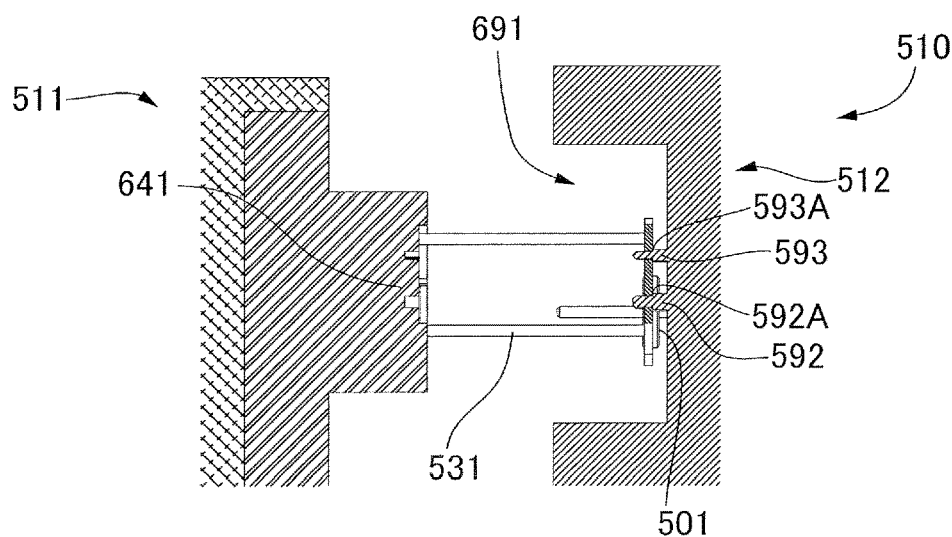
FIG. 27C is a schematic section view of the first unit and the second unit according to the sixth exemplary embodiment.

Next, the mold 510 is opened in step S106 serving as a sixth step. FIG. 27C is a schematic section view of the molds 511 and 512 illustrating a state in which the mold 510 is opened in step S106. Here, the forming portions 641 to 644 respectively have such shapes as to hold the parts 501 to 504. Therefore, when the mold 510 is opened in step S106, the part 501 needs to be separated from the forming portion 641 opposing the assembling portion 691.

In step S106, the mold 510 is opened while sticking out the pin 531 from the forming portion 641 opposing the assembling portion 691 toward the assembling portion 691. The pin 531 is an ejector pin. That is, by sticking out the pin 531 from the forming portion 641 while the mold 510 is opened, the part 501 held by the forming portion 641 is separated from the forming portion 641. By sticking out the pin 531 while opening the mold 510, the part 501 is held at a position of the assembling portion 691. As described above, since the mold 510 is opened in a state in which the part 501 is held at a position of the assembling portion 691, the part 501 falling off from the assembling portion 691 can be suppressed. After completion of opening of the mold 510, the pin 531 is drawn into the mold 511. As described above, the mold 510 includes a pin 531, and the pin 531 is disposed in the mold 511 so as to be capable of advancing and retracting from the forming portion 641. To be noted, although the illustration is omitted, unillustrated pins that are ejector pins are also provided at positions corresponding to the forming portion 642 to 644 so as to be capable of advancing and retracting.

Figure 28A:
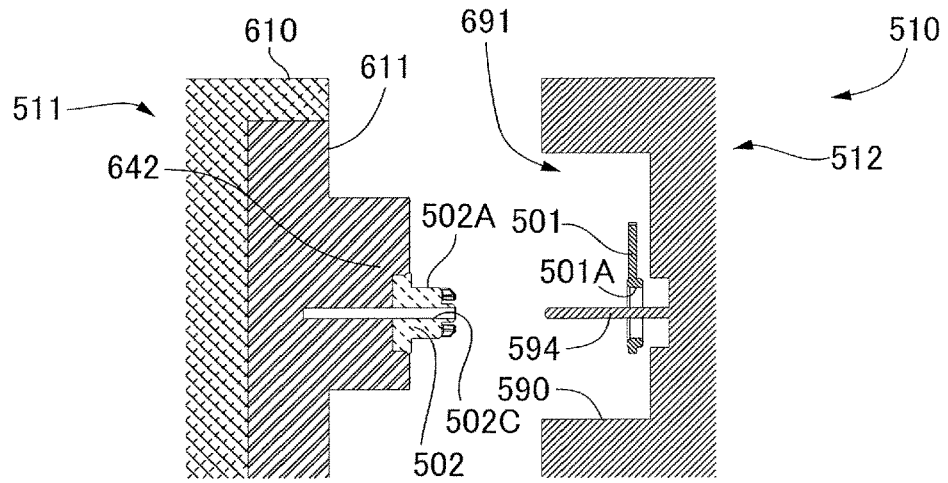
FIG. 28A is a schematic section view of the first unit and the second unit according to the sixth exemplary embodiment.

Next, in step S107, the control device 550 determines whether assembly of all the parts has been completed, that is, whether assembly of the assembled product 505 has been completed. In the case where it is determined that the assembly is not completed, that is, the result of S107 is No, the process returns to step S104. In step S104, the rotatable board 611 of the mold 511 is moved to the position P62 illustrated in FIG. 23B such that the forming portion 642 holding the part 502 that is the second in the order of assembly, among the plurality of forming portions 641 to 644, is opposed to the assembling portion 691. FIG. 28A is a schematic section view of the molds 511 and 512 illustrating a state in which the forming portion 642 is opposed to the assembling portion 691. By performing step S104, the forming portion 642 is opposed to the assembling portion 691 as illustrated in FIG. 28A.

Figure 28B:
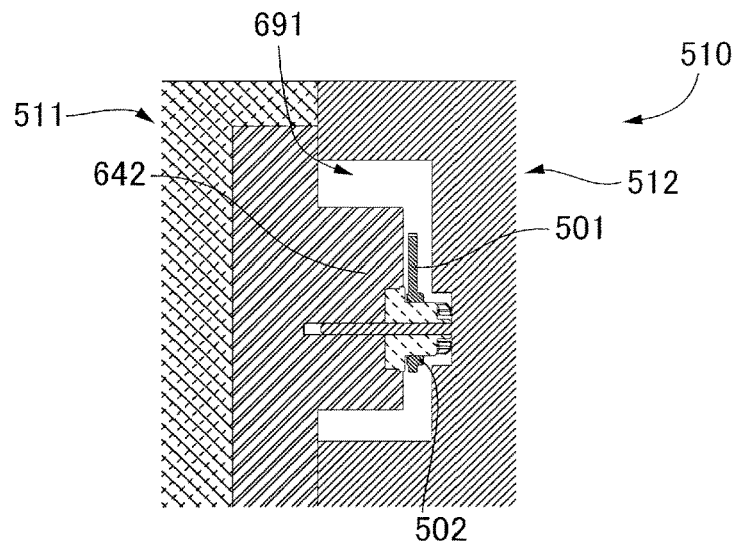
FIG. 28B is a schematic section view of the first unit and the second unit according to the sixth exemplary embodiment.

After step S104 is finished, the mold 510 is clamped in step S105. FIG. 28B is a schematic section view of the molds 511 and 512 illustrating a state in which the forming portion 642 is opposed to the assembling portion 691 and the mold 510 is clamped. As a result of this, the part 502 held by the forming portion 642 of the mold 511 is supplied to the assembling portion 691 of the mold 512 and mounted on the part 501 disposed in the assembling portion 691. Then, the mold 510 is opened in step S106.

Figure 28C:
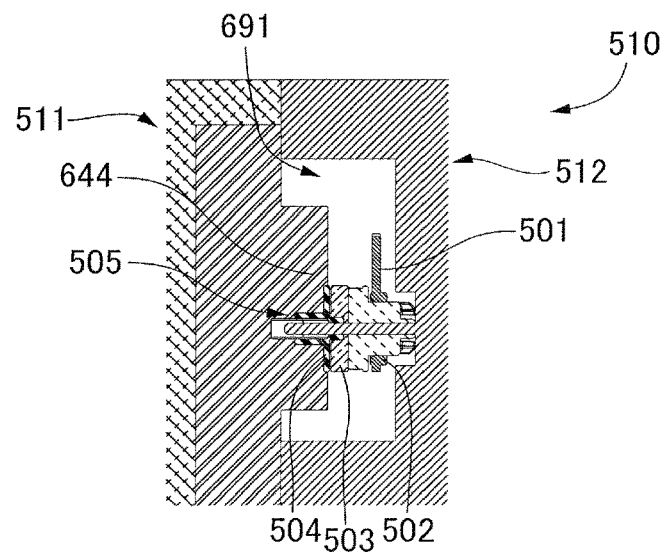
FIG. 28C is a schematic section view of the first unit and the second unit according to the sixth exemplary embodiment.

Steps S104 to S106 described above are repeated as many times as the number of the parts to be assembled. In the sixth exemplary embodiment, steps S104 to S106 are repeated until assembly of the parts 501 to 504 in this order is completed. That is, in step S104 of the first cycle of the repetition of steps S104 to S106, the rotatable board 611 is moved to the position P61, in step S104 of the second cycle, the rotatable board 611 is moved to the position P62, in step S104 of the third cycle, the rotatable board 611 is moved to the position P63, and, in step S104 of the fourth cycle, the rotatable board 611 is moved to the position P64. FIG. 28C is a schematic section view of the molds 511 and 512 illustrating a state in which the forming portion 644 is opposed to the assembling portion 691 and the mold 510 is clamped. By repeating steps S104 to S106 as many times as the number of the parts to be assembled, the parts 501 to 504 are sequentially supplied to the assembling portion 691, and the assembled product 505 constituted by the parts 501 to 504 is assembled as illustrated in FIG. 28C. Then, the assembled product 505 is taken out from the assembling portion 691.

Figure 29:
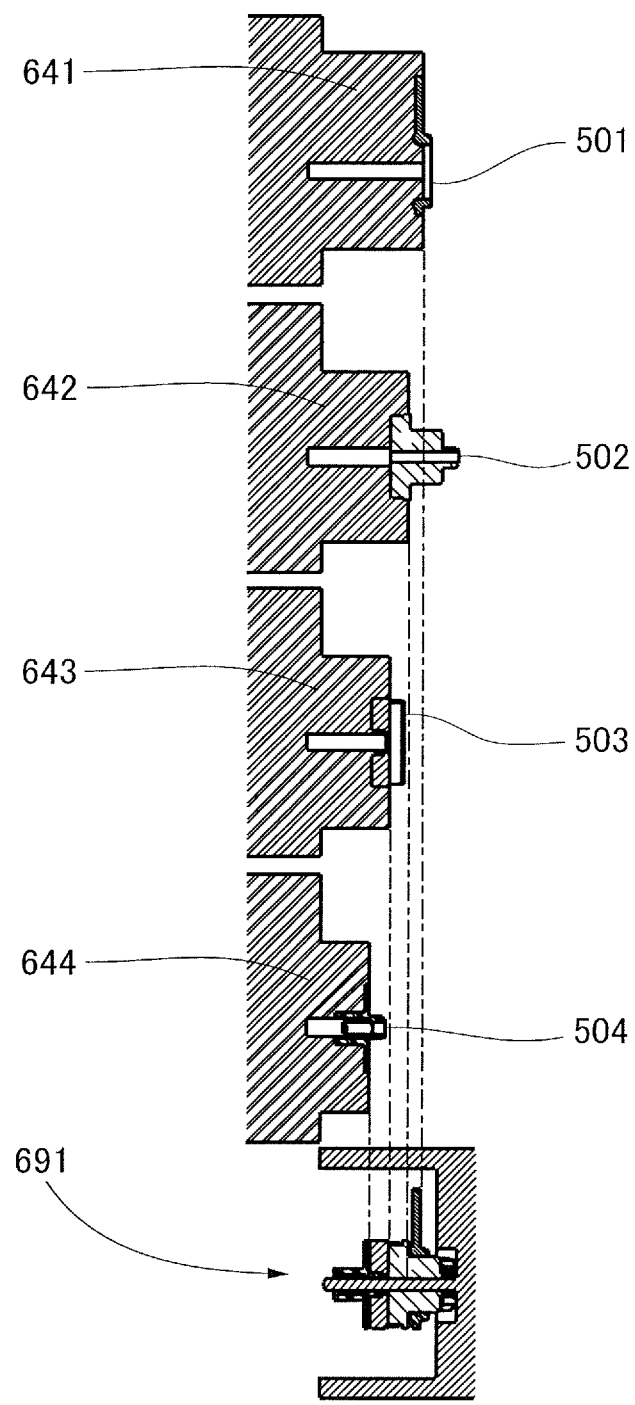
FIG. 29 is an explanatory diagram illustrating a positional relationship between first forming portions and an assembling portion in a state in which a mold is clamped.

Here, the positions of the forming portions 641 to 644 in the opening/closing direction of the mold 510, that is, in the arrow Z direction in FIG. 21, are set such that assembly of the parts 501 to 504 that are held is completed when clamping of the mold 510 is completed in step S105. FIG. 29 is an explanatory diagram illustrating a positional relationship of the forming portions 641 to 644 with the assembling portion 691 in the opening/closing direction of the mold 510 in a state in which the mold 510 is clamped. The forming portions 641 to 644 are disposed so as to be displaced from one another in the arrow Z direction that is the opening/closing direction of the mold 510 as illustrated in FIG. 29. That is, the positions of the forming portions 641 to 644 in the Z direction are determined such that assembly of the parts 501 to 504 is completed at the assembling portion 691 when the mold 510 is clamped.

Fitting tolerances between the through hole 501A of the part 501 and the cylindrical portion 502A of the part 502, between the projection portion 502B of the part 502 and the recess portion 503A of the part 503, and between the recess portion 503B of the part 503 and the projection portion 504A of the part 504 are set with a high precision such that minute gaps are provided therebetween. The parts 501 to 504 can be assembled by clamping the mold 510 in a state of being highly precisely held by the mold 511, and thus the assembled product 505 can be assembled with a high precision.

As described above, according to the sixth exemplary embodiment, the rotatable board 611 including the forming portion 641 to 644 can be moved from the position P51 to the positions P61 to P64 or from the positions P61 to P64 to the position P51 by just rotating the rotatable board 611. That is, the relative positional relationship of the forming portions 641 to 644 of the mold 511 with the forming portions 681 to 684 and the assembling portion 691 of the mold 512 can be switched by just rotating the rotatable board 611 of the mold 511. Therefore, a driving portion for driving the mold 510 can be omitted, thus the configuration of the assembling apparatus 600 can be simplified, and the assembling apparatus 600 can be miniaturized. The assembled product 505 can be assembled by using the assembling apparatus 600 with a simplified configuration to form the parts 501 to 504 and sequentially supply the parts 501 to 504 to the assembling portion 691.

Seventh Exemplary Embodiment

Figure 30A:
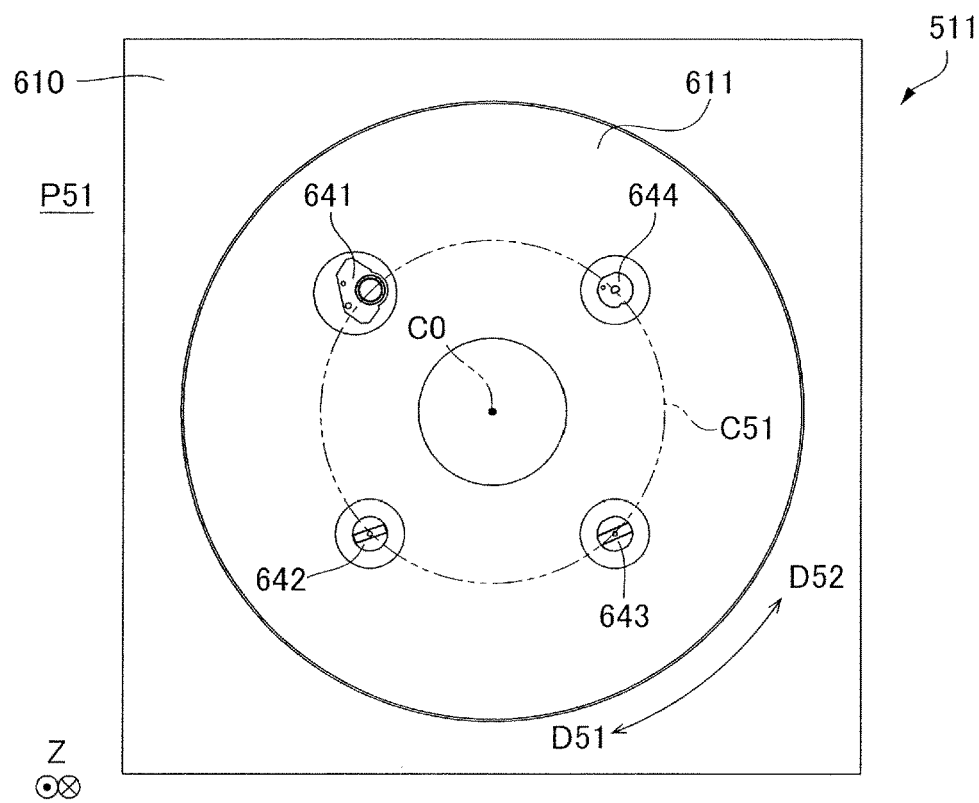
FIG. 30A is a plan view of a first unit of a mold according to a seventh exemplary embodiment.
Figure 30B:
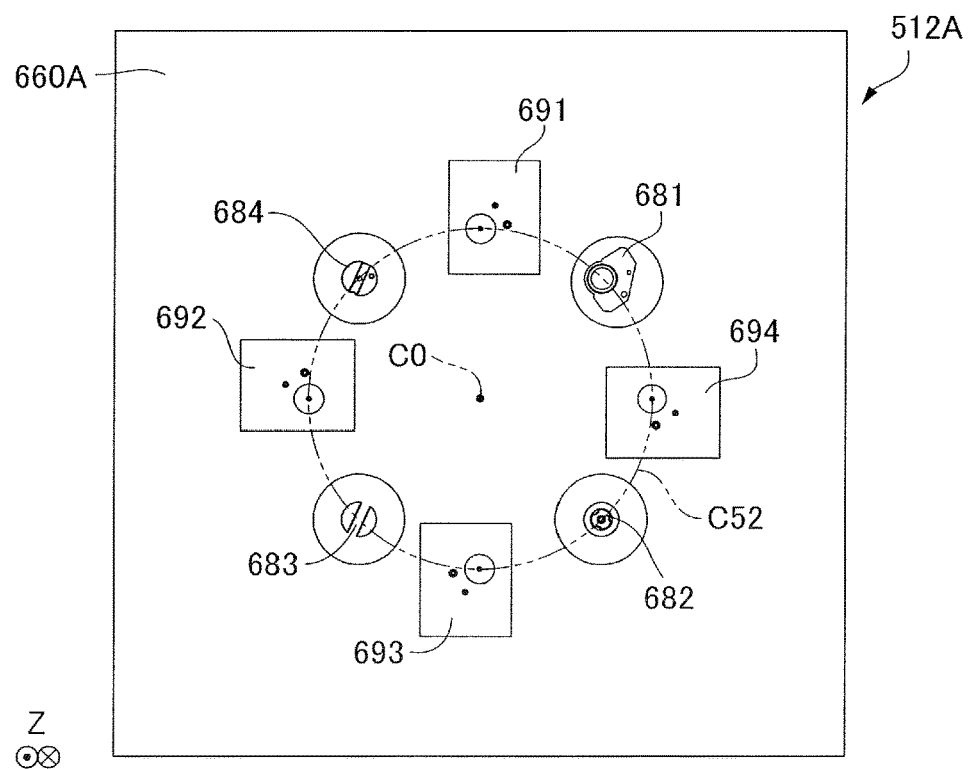
FIG. 30B is a plan view of a second unit of the mold according to the seventh exemplary embodiment.

Next, an assembling apparatus and a method of producing an assembled product using the assembling apparatus according to a seventh exemplary embodiment will be described. FIG. 30A is a plan view of a first unit of a mold according to the seventh exemplary embodiment, and FIG. 30B is a plan view of a second unit of the mold according to the seventh exemplary embodiment. As illustrated in FIG. 30A, the mold 511 serving as a first unit has the same configuration as in the sixth exemplary embodiment, thus the same reference signs are given thereto and the description thereof will be omitted. In the seventh exemplary embodiment, the configuration of a mold 512A serving as a second unit is different from the configuration of the mold 512 of the sixth exemplary embodiment as illustrated in FIG. 30B.

The mold 512A is a second member opposing the mold 511, that is, opposing the rotatable board 611, and includes a mold body 660A. The mold body 660A is provided to be fixed so as to be unrotatable. The mold body 660A includes the four forming portions 681 to 684 serving as a plurality of second forming portions that serve as another portion of the cavities for forming the parts similarly to the sixth exemplary embodiment. The number of the forming portions 681 to 684 is equal to the number of the parts 501 to 504 to be formed, in other words, equal to the number of the forming portions 641 to 644, that is, four. In FIG. 30B, the forming portion 681, the forming portion 682, the forming portion 683, and the forming portion 684 are arranged clockwise in this order along the circle C52.

The mold body 660A includes a plurality of assembling portions. More specifically, the mold body 660A includes assembling portions of the same number as the number of the forming portions 641 to 644, in other words, the same number as the number of forming portions 681 to 684, that is, includes four assembling portions 691, 692, 693, and 694. The forming portions 681 to 684 and the assembling portions 691 to 694 are arranged on a virtual second circle centered on the axis C0, that is, on the circle C52 in FIG. 30B. More specifically, in FIG. 30B, the assembling portion 691, the forming portion 681, the assembling portion 694, the forming portion 682, the assembling portion 693, the forming portion 683, the assembling portion 692, and the forming portion 684 are arranged clockwise in this order along the circle C52 such that units of one second forming portion and units of one assembling portion are alternately arranged.

Figure 31:
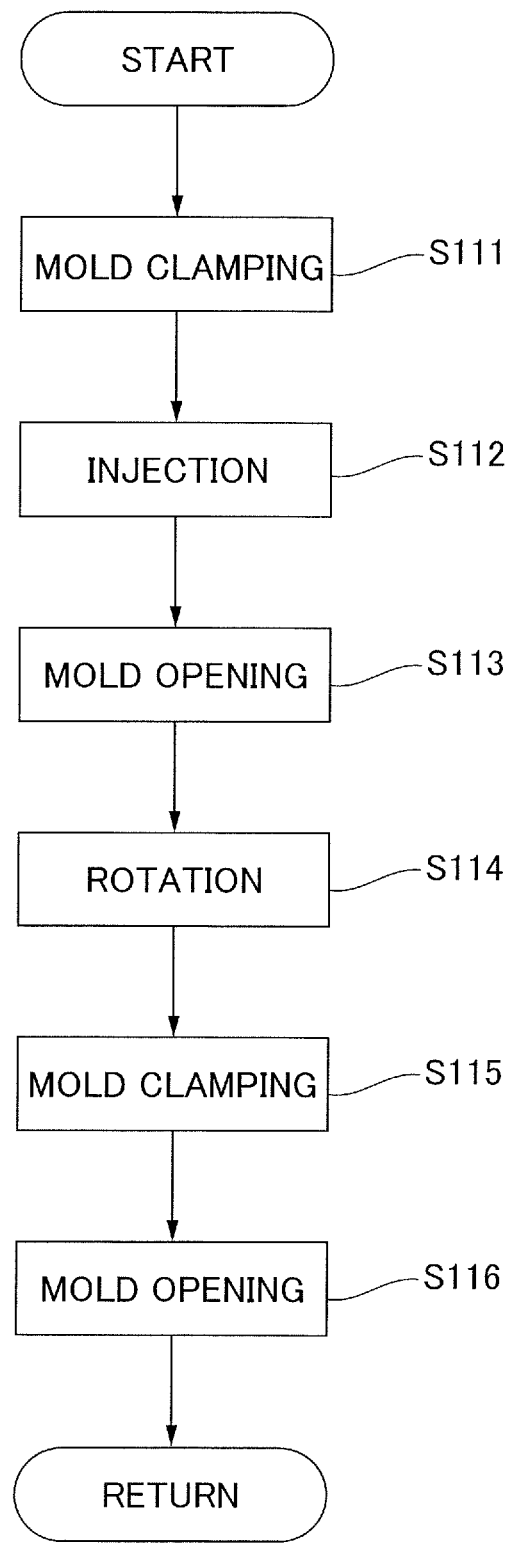
FIG. 31 is a flowchart illustrating a method of producing the assembled product according to the seventh exemplary embodiment.

A method of forming the parts 501 to 504 by using a mold and assembling the assembled product 505 from the parts 501 to 504, that is, a method of producing the assembled product 505 will be described. FIG. 31 is a flowchart illustrating a method of producing the assembled product 505 according to the seventh exemplary embodiment. The process of producing the assembled product 505 can be roughly divided into six steps, that is, steps S111 to S116. By repetitively performing a cycle of these six steps S111 to S116, assembly operation of the parts 501 to 504 is sequentially performed at the assembling portions 691 to 694, and thus the assembled product 505 is produced.

Here, since the same operation is repeated in the fourth and later cycles of steps S111 to S116, the fourth cycle will be described below. To be noted, it is assumed that the part 501 has been supplied to the assembling portion 691 in the first cycle, the parts 502 and 501 have been respectively supplied to the assembling portions 691 and 692 in the second cycle, and the parts 503, 502, and 501 have been respectively supplied to the assembling portions 691 to 693 in the third cycle. That is, at the start of the fourth cycle, the parts 501 to 503 are disposed in the assembling portion 691, the parts 501 and 502 are disposed in the assembling portion 692, the part 501 is disposed in the assembling portion 693, and no part is disposed in the assembling portion 694.

First, the molds 511 and 512A are clamped in step S111 serving as a first step. At this time, the rotatable board 611 is moved to the position P51 as illustrated in FIG. 30A. That is, the rotatable board 611 is rotated such that the forming portions 641 to 644 are respectively opposed to the forming portions 681 to 684, and the molds 511 and 512A are clamped. As a result of this, the cavities CA51 to CA54 illustrated in FIG. 24 are respectively defined by the forming portions 641 to 644 and the forming portions 681 to 684.

Next, molten resin is injected into the molds 511 and 512A by the injection portion 520 illustrated in FIG. 21 in step S112 serving as a second step. That is, molten resin is injected into each of the plurality of cavities CA51 to CA54 defined in the molds 511 and 512A clamped in step S111, the molten resin is cooled to solidify, and thus the plurality of parts 501 to 504 are formed.

Next, after the parts 501 to 504 are formed in step S112, the molds 511 and 512A are opened in step S113 serving as a third step in a state in which the parts 501 to 504 are respectively held by the forming portions 641 to 644 of the mold 511. That is, the parts 501 to 504 are separated from the mold 512A in step S113. More specifically, the parts 501 to 504 are separated from the forming portions 681 to 684 of the mold 512A in a state of being respectively held by the forming portions 641 to 644 of the mold 511.

Next, after the molds 511 and 512A are opened in step S113, the rotatable board 611 of the mold 511 is rotated such that the forming portion 641 to 644 are respectively opposed to the assembling portions 691 to 694 in step S114 serving as a fourth step. Since this is the fourth cycle, the rotatable board 611 is rotated such that the forming portion 641 is opposed to the assembling portion 694, the forming portion 642 is opposed to the assembling portion 693, the forming portion 643 is opposed to the assembling portion 692, and the forming portion 644 is opposed to the assembling portion 691. That is, the rotatable board 611 is moved to the position P64 illustrated in FIG. 23D. To be noted, the rotatable board 611 is moved to the position P61 illustrated in FIG. 23A in the first cycle, to the position P62 illustrated in FIG. 23B in the second cycle, and to the position P63 illustrated in FIG. 23C in the third cycle.

Figure 32:
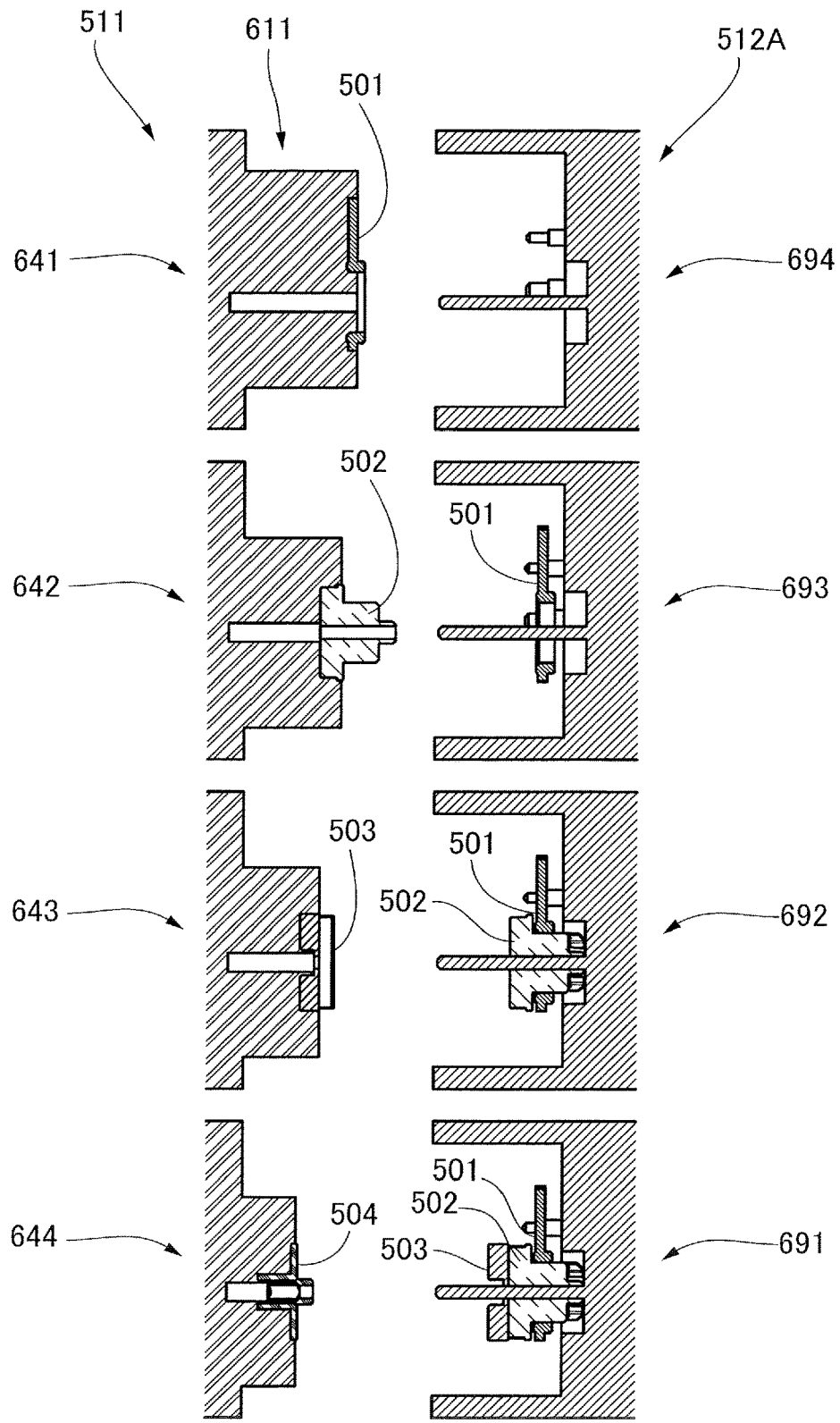
FIG. 32 is a schematic section view of the first unit and the second unit according to the seventh exemplary embodiment.

FIG. 32 is a schematic section view of the molds 511 and 512A illustrating a state in which the forming portions 641 to 644 are respectively opposed to the assembling portions 691 to 694 in step S114. By performing step S114, the forming portion 641 is opposed to the assembling portion 694, the forming portion 642 is opposed to the assembling portion 693, the forming portion 643 is opposed to the assembling portion 692, and the forming portion 644 is opposed to the assembling portion 691 as illustrated in FIG. 32. To be noted, although the rotatable board 611 may be rotated in either of the directions D51 and D52 in FIG. 30A when rotating the rotatable board 611 to the position P64 in step S114, it is preferable that a direction in which the amount of required rotation is smaller is selected for shortening the time.

Figure 33:
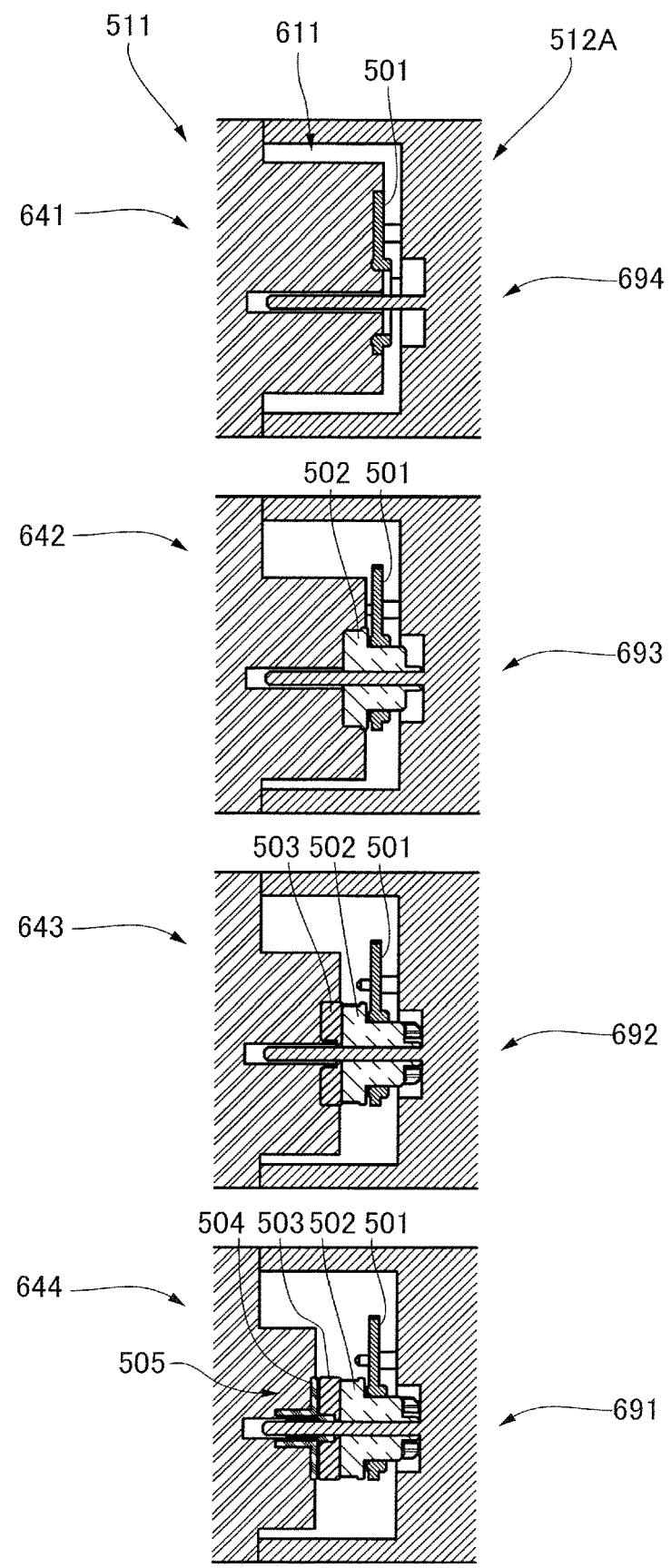
FIG. 33 is a schematic section view of the first unit and the second unit according to the seventh exemplary embodiment.

After step S114 is finished, the molds 511 and 512A are clamped in step S115 serving as a fifth step. FIG. 33 is a schematic section view of the molds 511 and 512A in a clamped state in step S115. As illustrated in FIG. 33, the part 501 held by the forming portion 641 is supplied to the assembling portion 694, and, simultaneously, the part 502 held by the forming portion 642 is supplied to the assembling portion 693. At the same time, the part 503 held by the forming portion 643 is supplied to the assembling portion 692, and the part 504 held by the forming portion 644 is supplied to the assembling portion 691.

Figure 34:
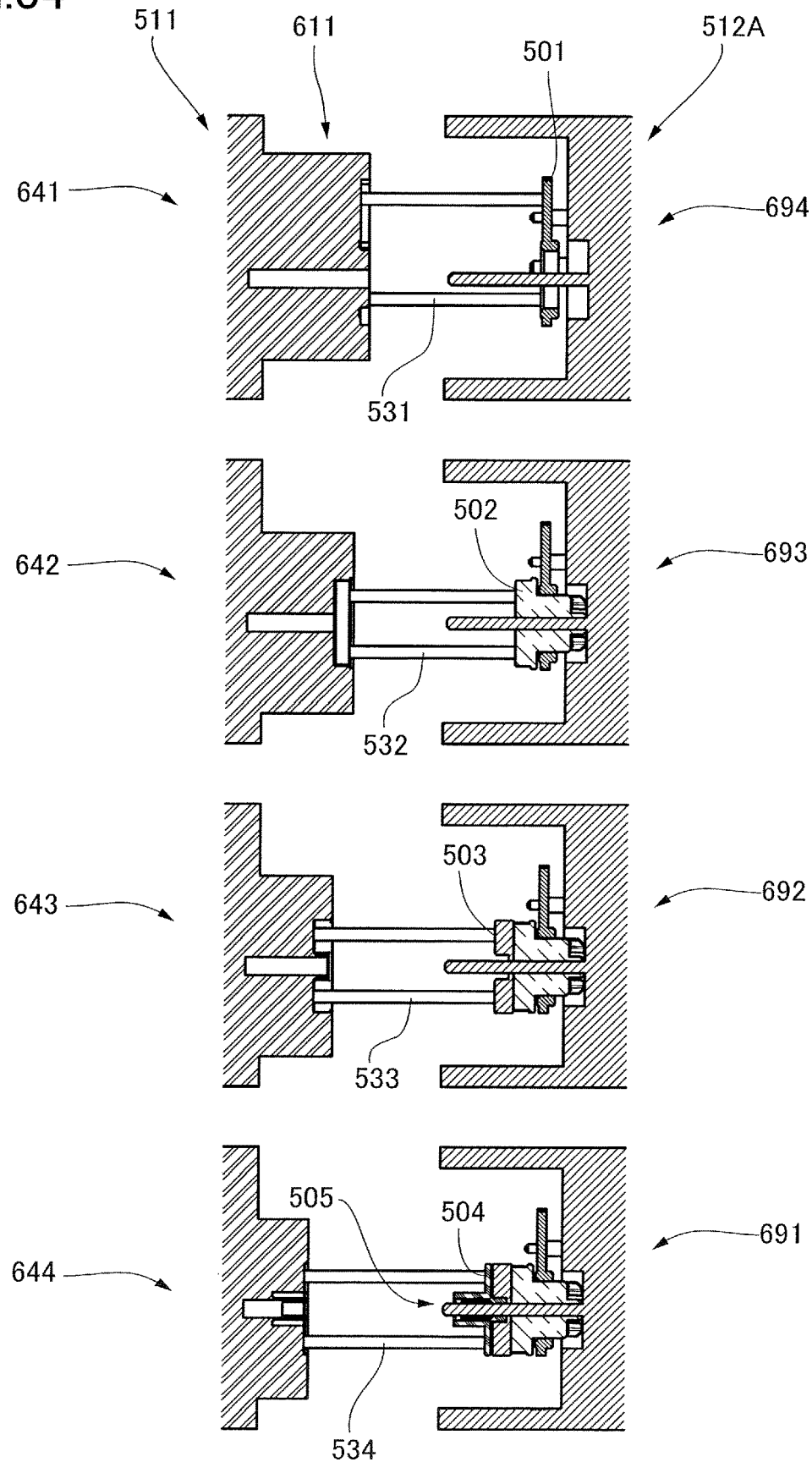
FIG. 34 is a schematic section view of the first unit and the second unit according to the seventh exemplary embodiment.

Next, the molds 511 and 512A are opened in step S116 serving as a sixth step. FIG. 34 is a schematic section view of the molds 511 and 512A illustrating a state in which the molds 511 and 512A are opened in step S116. Here, the forming portions 641 to 644 respectively have such shapes as to hold the parts 501 to 504. Therefore, when the molds 511 and 512A are opened in step S116, the parts 501 to 504 need to be separated from the forming portions 641, 642, 643, and 644 respectively opposing the assembling portions 694, 693, 692, and 691.

In step S116, the molds 511 and 512A are opened by sticking out pins 531, 532, 533, and 534 respectively toward the assembling portions 694, 693, 692, and 691 from the forming portions 641 to 644. The pins 531 to 534 are ejector pins. By sticking out the pins 531 to 534 respectively from the forming portions 641 to 644 as opening the molds 511 and 512A, the parts 501 to 504 respectively held by the forming portions 641 to 644 are separated from the mold 511. As a result of this, the parts falling off from the assembling portions 691 to 694 can be suppressed. After completing the mold opening, the pins 531 to 534 are drawn into the mold 511. As described above, the mold 511 is provided with the pins 531 to 534, and the pins 531 to 534 are disposed in the mold 511 so as to be capable of advancing and retracting respectively from the forming portions 641 to 644. Then, the assembled product 505 is taken out from the assembling portion 691 by the unillustrated robot.

By repeating steps S111 to S116 described above, the parts 501 to 504 are sequentially supplied to the assembling portions 691 to 694, the assembled product 505 is assembled in each of the assembling portions 691 to 694, and thus one assembled product 505 is produced in each cycle.

Figure 35A:
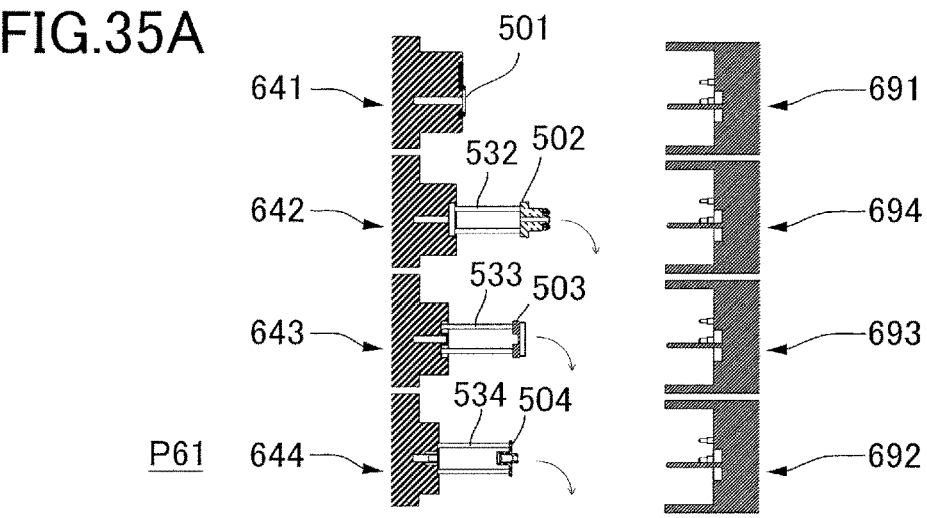
FIG. 35A is a diagram for describing an operation in an initial stage according to the seventh exemplary embodiment.
Figure 35B:
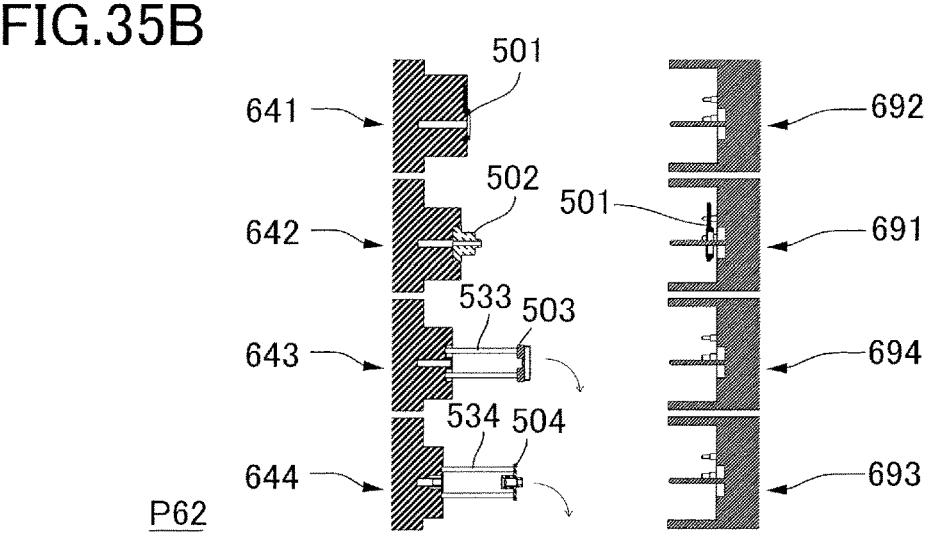
FIG. 35B is a diagram for describing the operation in the initial stage according to the seventh exemplary embodiment.
Figure 35C:
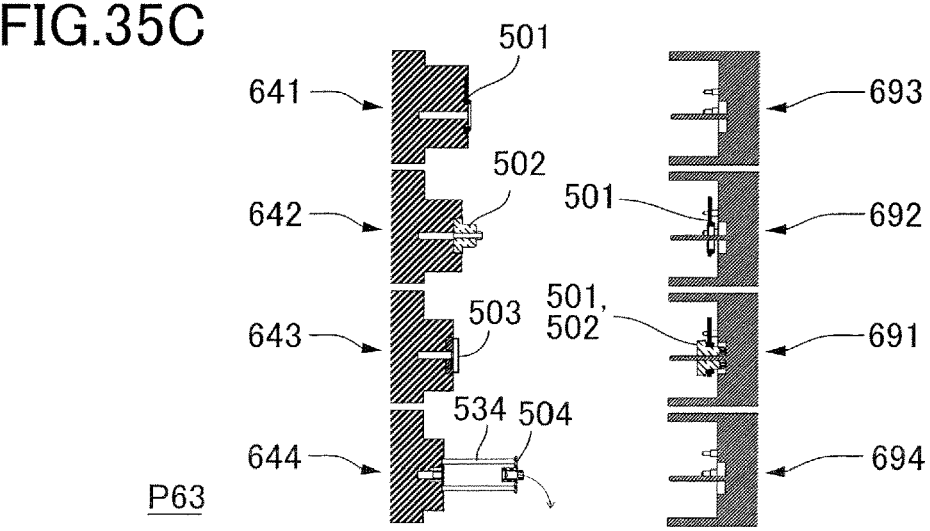
FIG. 35C is a diagram for describing the operation in the initial stage according to the seventh exemplary embodiment.

In the seventh exemplary embodiment, the assembled product 505 is constituted by the four parts 501 to 504, and these parts are sequentially assembled. Therefore, the first cycle, the second cycle, and the third cycle after start of production are different from the fourth and later cycles. Specific description will be given below. FIG. 35A is a diagram for describing the operation of step S114 in the first cycle. FIG. 35B is a diagram for describing the operation of step S114 in the second cycle. FIG. 35C is a diagram for describing the operation of step S114 in the third cycle.

First, in the first cycle, the rotatable board 611 is moved to the position P61 in step S114. That is, the parts 501 to 504 of the forming portions 641 to 644 are respectively opposed to the assembling portions 691, 694, 693, and 692 as illustrated in FIG. 35A. At this time, the part 501 is not disposed in the assembling portion 694, the parts 501 and 502 are not disposed in the assembling portion 693, and the parts 501 to 503 are not disposed in the assembling portion 692. Therefore, the assembled product 505 cannot be produced even if the parts 502 to 504 are respectively supplied to the assembling portions 694, 693, and 692, and thus the parts 502 to 504 are removed from the forming portions 642 to 644 by the pins 532 to 534 after opening the molds 511 and 512A. Then, the part 501 is disposed in the assembling portion 691 by clamping the molds 511 and 512A in step S115.

Next, in step S114 of the second cycle, the rotatable board 611 is moved to the position P62. That is, the parts 501 to 504 of the forming portions 641 to 644 are respectively opposed to the assembling portions 692, 691, 694, and 693 as illustrated in FIG. 35B. At this time, the parts 501 and 502 are not disposed in the assembling portion 694, and the parts 501 to 503 are not disposed in the assembling portion 693. Therefore, the assembled product 505 cannot be produced even if the parts 503 and 504 are respectively supplied to the assembling portions 694 and 693, and thus the parts 503 and 504 are removed from the forming portions 643 to 644 by the pins 533 and 534 after opening the molds 511 and 512A. Then, the parts 501 and 502 are respectively disposed in the assembling portions 692 and 691 by clamping the molds 511 and 512A in step S115.

Next, in step S114 of the third cycle, the rotatable board 611 is moved to the position P63. That is, the parts 501 to 504 of the forming portions 641 to 644 are respectively opposed to the assembling portions 693, 692, 691, and 694, as illustrated in FIG. 35C. At this time, the parts 501 to 503 are not disposed in the assembling portion 694. Therefore, the assembled product 505 cannot be produced even if the part 504 is supplied to the assembling portion 694, and thus the part 504 is removed from the forming portion 644 by the pin 534 after opening the molds 511 and 512A. Then, the parts 501 to 503 are respectively disposed in the assembling portions 693, 692, and 691 by clamping the molds 511 and 512A in step S115.

To be noted, although a part is removed in step S114 in the seventh exemplary embodiment, the part may be removed after disposing a part in an assembling portion.

As described above, according to the seventh exemplary embodiment, the assembled product 505 can be taken out from one of the plurality of assembling portions 691 to 694 in step S116 of each of the fourth and later cycles. In addition, in the seventh exemplary embodiment, the mold clamping of step S105 and the mold opening of step S106 described in the sixth exemplary embodiment do not need to be repeated as many times as the number of the parts in the assembly operation of parts, and only one mold clamping in step S115 and one mold opening in step S116 are performed. Therefore, time for each cycle can be shortened, and the production efficiency of the assembled product 505 can be improved.

Eighth Exemplary Embodiment

Figure 36A:
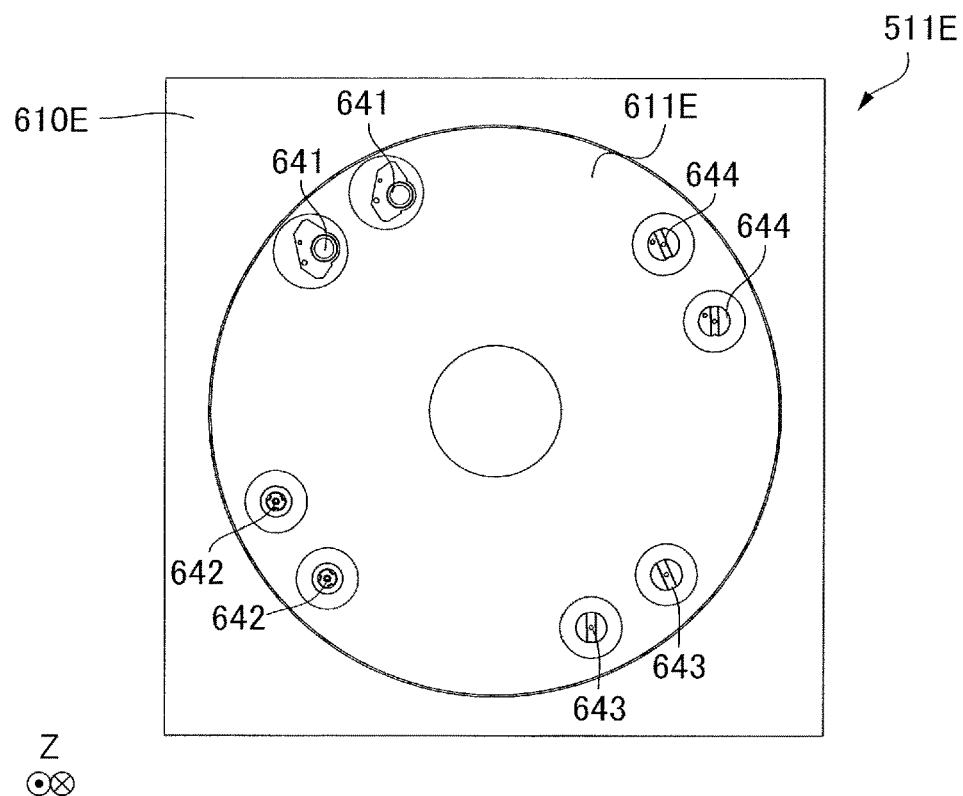
FIG. 36A is a plan view of a first unit of a mold according to an eighth exemplary embodiment.
Figure 36B:
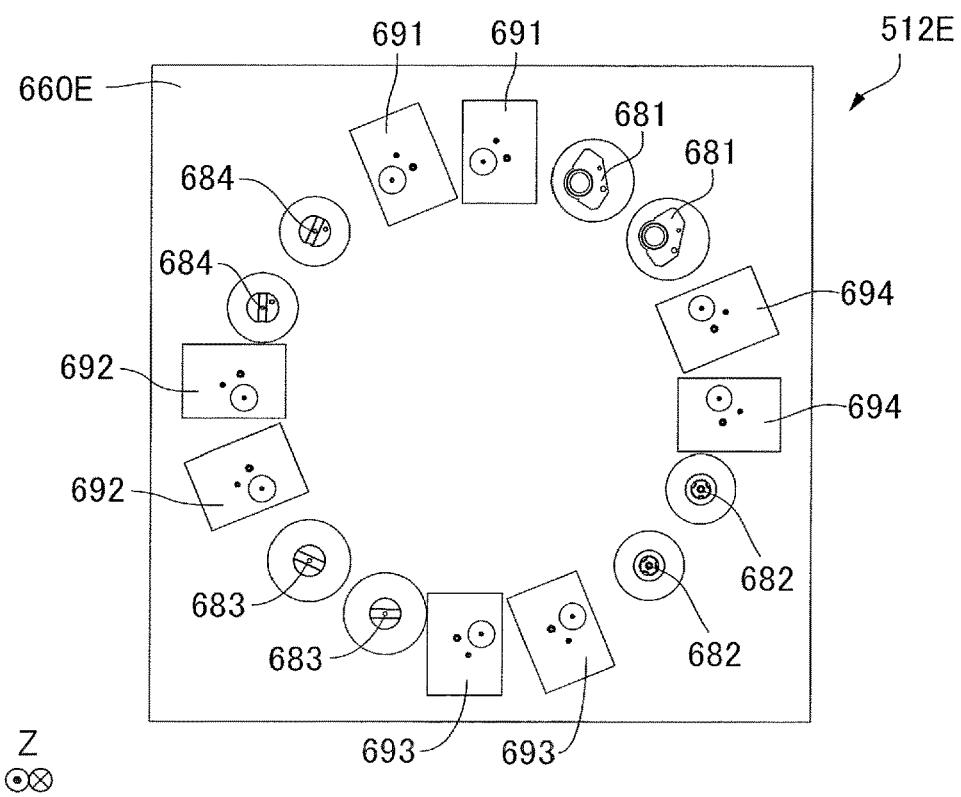
FIG. 36B is a plan view of a second unit of the mold according to the eighth exemplary embodiment.

Next, an assembling apparatus and a method of producing an assembled product using the assembling apparatus according to an eighth exemplary embodiment will be described. FIG. 36A is a plan view of a first unit of a mold according to the eighth exemplary embodiment, and FIG. 36B is a plan view of a second unit of the mold according to the eighth exemplary embodiment. To be noted, the configuration of the assembling apparatus, the configuration of the assembled product, and steps for producing the assembled product are substantially the same as in the sixth exemplary embodiment except for a mold 511E serving as a first unit and a mold 512E serving as a second unit, and description of the same elements will be omitted.

In the seventh exemplary embodiment, a case where one assembled product 505 is produced in one cycle by using one mold has been described. In the eighth exemplary embodiment, a plurality of assembled products 505, for example, two assembled products 505, are produced in one cycle by using a mold serving as an example of a forming mold and including the molds 511E and 512E.

Specific description will be given below. The mold 511E includes a mold body 610E and a ring-like rotatable board 611E serving as a first member rotatable about the axis C0 with respect to the mold body 610E. The rotatable board 611E includes a plurality of sets of the forming portions 641 to 644 serving as a plurality of first forming portions. That is, the rotatable board 611E includes two sets of the plurality of forming portions 641 to 644. In the rotatable board 611E, two forming portions 641 are disposed adjacent to each other, two forming portions 642 are disposed adjacent to each other, two forming portions 643 are disposed adjacent to each other, and two forming portions 644 are disposed adjacent to each other.

The mold 512E is a second member opposing the mold 511E, that is, opposing the rotatable board 611E, and includes a mold body 660E as illustrated in FIG. 36B. The mold body 660E is provided to be fixed so as to be unrotatable. The mold body 660E includes a plurality of sets of, that is, two sets of the plurality of forming portions 681 to 684 serving as a plurality of second forming portions, and, similarly, includes a plurality of sets of, that is, two sets of the plurality of assembling portions 691 to 694.

In the sixth exemplary embodiment, a case where units of one second forming portion and units of one assembling portion are alternately arranged in the circumferential direction in the mold body 660 has been described. In the eighth exemplary embodiment, units of two forming portions and units of two assembling portions are alternately arranged in the circumferential direction in the mold body 660E. In addition, in the mold 512E, two forming portions 681 are disposed adjacent to each other, two forming portions 682 are disposed adjacent to each other, two forming portions 683 are disposed adjacent to each other, and two forming portions 684 are disposed adjacent to each other. In the mold 512E, two assembling portions 691 are disposed adjacent to each other, two assembling portions 692 are disposed adjacent to each other, two assembling portions 693 are disposed adjacent to each other, and two assembling portions 694 are disposed adjacent to each other.

In the configuration of the molds 511E and 512E described above, two sets of the cavities CA51 to CA54 are defined in step S111 of FIG. 31. Then, in step S112 of FIG. 31, two sets of the plurality of parts 501 to 504 are formed. Then, in step S115 of FIG. 31, the two sets of the plurality of parts 501 to 504 are simultaneously assembled in the two sets of the plurality of assembling portions 691 to 694. Therefore, according to the eighth exemplary embodiment, a plurality of assembled products 505 are produced each cycle by using one mold, and thus the production efficiency of the assembled product 505 is further improved.

To be noted, although two second forming portions and two assembling portions are alternately arranged in the circumferential direction in the above description, one second forming portion and one assembling portion may be alternately arranged, and the production efficiency of the assembled product 505 is also improved in this case.

Ninth Exemplary Embodiment

Figure 37A:
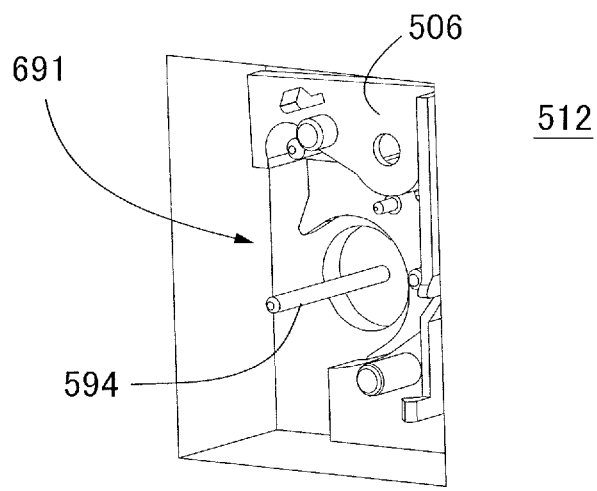
FIG. 37A is a diagram for describing an operation of covering an assembled product according to a ninth exemplary embodiment with cases.
Figure 37B:
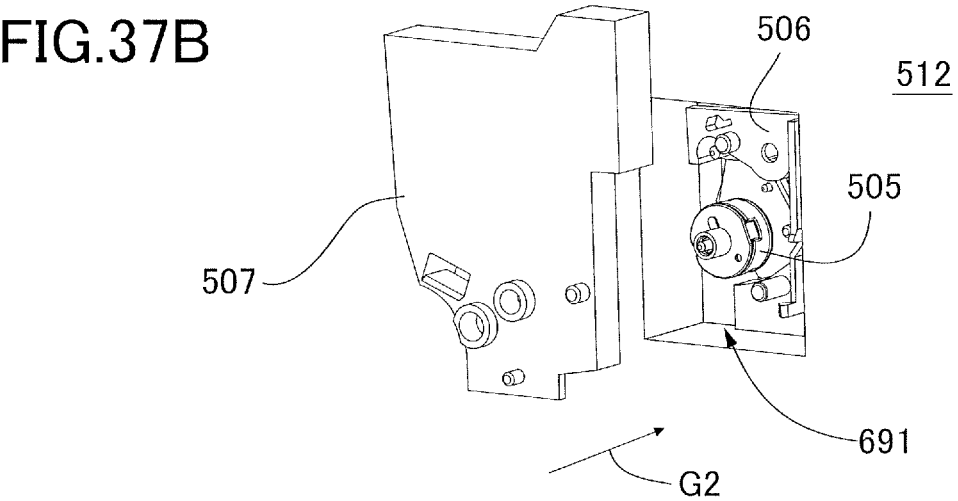
FIG. 37B is a diagram for describing the operation of covering the assembled product according to the ninth exemplary embodiment with the cases.
Figure 37C:
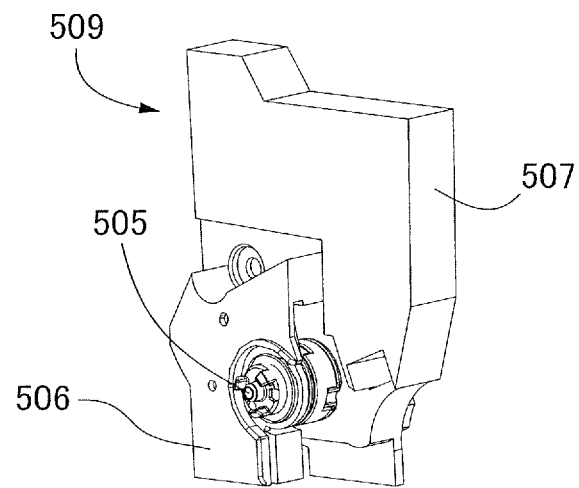
FIG. 37C is a diagram for describing the operation of covering the assembled product according to the ninth exemplary embodiment with the cases.

Next, an assembling apparatus and a method of producing an assembled product using the assembling apparatus according to a ninth exemplary embodiment will be described. FIGS. 37A to 37C are diagrams for describing an operation of covering an assembled product according to the ninth exemplary embodiment with cases. In the ninth exemplary embodiment, a drive transmission unit 509 is produced by covering the assembled product 505 described in the sixth exemplary embodiment with cases 506 and 507 as illustrated in FIG. 37C. To be noted, in the ninth exemplary embodiment, the drive transmission unit 509 is produced by using the assembling apparatus 600 described in the sixth exemplary embodiment.

In the ninth exemplary embodiment, after the mold 510 illustrated in FIG. 21 is opened in step S103 of FIG. 26, the case 506 is set in the assembling portion 691 that is empty as illustrated in FIG. 37A. Then, by repetitively performing the cycle of steps S104 to S106 as described in the sixth exemplary embodiment, the parts 501 to 504 illustrated in FIGS. 20A and 20B are sequentially mounted on the case 506 as illustrated in FIG. 37B, and thus the assembled product 505 is produced. Thereafter, the case 507 is attached to the case 506 in a direction of an arrow G2 by the unillustrated robot, and thus the drive transmission unit 509 illustrated in FIG. 37C is produced. The drive transmission unit 509 that has been produced is taken out from the assembling portion 691 by the unillustrated robot. To be noted, the same operation is also performed for the assembling portions 692 to 694. As described above, the assembling portions 691 to 694 can be used for an assembly operation other than the assembly of the assembled product 505 by the mold 510.

To be noted, the present invention is not limited to the exemplary embodiments described above, and can be modified in many ways within the technical concept of the present invention. The effects described in the exemplary embodiments are merely a list of the most preferable effects that can be achieved by the present invention, and the effect of the present invention is not limited to the effects described in the exemplary embodiments.

Although a case where the plurality of parts constituting the assembled product are parts of different kinds has been described in the first to ninth exemplary embodiments described above, some or all of the plurality of parts constituting the assembled product may be of the same kind.

Although a case where the first member is a rotatable board has been described in the sixth to ninth exemplary embodiment described above, the configuration is not limited to this, and it suffices as long as the first member and/or the second member are rotatable boards. That is, it suffices as long as the first forming portions are relatively rotated with respect to the second forming portions and assembling portions, and a configuration in which only the first member rotates, a configuration in which only the second member rotates, and a configuration in which both of the first member and the second member rotate may be employed. To be noted, a configuration in which only one of the first member and the second member rotates is more preferable because the number of driving portions can be reduced.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-087679, filed Apr. 26, 2017, and Japanese Patent Application No. 2017-087680, filed Apr. 26, 2017, which are hereby incorporated by reference wherein in their entirety.

What is claimed is:

1. An assembling apparatus configured to assemble an assembled product from a plurality of parts, the assembling apparatus comprising:
   a mold comprising a first unit and a second unit opposing the first unit,
   wherein the first unit comprises a first movable portion that is movable, a second movable portion, and a third movable portion, the first movable portion comprising a plurality of first forming portions, the second movable portion comprising a plurality of second forming portions, and the third movable portion comprising a plurality of third forming portions,
   wherein the second unit comprises a fourth forming portion, a fifth forming portion, a sixth forming portion, and a plurality of assembling portions,
   wherein the first movable portion is configured to have at least one first forming portion of the plurality of first forming portions oppose at least one assembling portion of the plurality of assembling portions, and to have at least one remaining first forming portion of the plurality of first forming portions oppose the fourth forming portion,
   wherein the second movable portion is configured to have at least one second forming portion of the plurality of second forming portions oppose at least one other assembling portion of the plurality of assembling portions, and to have at least one remaining second forming portion of the plurality of second forming portions oppose the fifth forming portion,
   wherein the third movable portion is configured to have at least one third forming portion of the plurality of third forming portions oppose at least one remaining assembling portion of the plurality of assembling portions, and to have at least one remaining third forming portion of the plurality of third forming portions oppose the sixth forming portion, and
   wherein the second unit further comprises a fourth movable portion, and the fourth movable portion is configured to move so as to switch the at least one assembling portion of the plurality of assembling portions opposed to the at least one first forming portion of the plurality of first forming portions, the at least one other assembling portion of the plurality of assembling portions opposed to the at least one second forming portion of the plurality of second forming portions, and the at least one remaining assembling portion of the plurality of assembling portions opposed to the at least one third forming portion of the plurality of third forming portions.

2. The assembling apparatus according to claim 1, wherein the first movable portion comprises a rotatable board.

3. The assembling apparatus according to claim 2, wherein the rotatable board is one of a plurality of rotatable boards, and
   wherein at least one of the plurality of rotatable boards comprises two or more first forming portions of the plurality of first forming portions.

4. The assembling apparatus according to claim 1, wherein the fourth movable portion comprises a rotatable board.

5. The assembling apparatus according to claim 1, wherein an assembling portion of the plurality of assembling portions not opposing any of the first forming portions, the second forming portions, and the third forming portions is exposed such that the assembled product can be taken out in a state in which the mold is clamped.

6. The assembling apparatus according to claim 1, wherein the at least one assembling portion of the plurality of assembling portions comprises a recess portion to which one part of the plurality of parts is to be accommodated and an engagement pin that is disposed in the recess portion and engages with the one part of the plurality of parts.

7. The assembling apparatus according to claim 2, wherein the second movable portion comprises a rotatable board.

8. The assembling apparatus according to claim 1, wherein, by clamping the mold, a part held by the at least one first forming portion of the plurality of first forming portions is supplied to the at least one assembling portion of the plurality of assembling portions, thus assembly of the assembled product is performed, and a cavity for forming one part of the plurality of parts is defined by the fourth forming portion and the at least one remaining first forming portion of the plurality of first forming portions.

9. The assembling apparatus according to claim 8, wherein the at least one first forming portion of the plurality of first forming portions comprises an ejector pin configured to stick out of the at least one first forming portion of the plurality of first forming portions to hold the part in the at least one assembling portion of the plurality of assembling portions as the mold goes from a closed state to an open state.

10. The assembling apparatus according to claim 2, wherein the third movable portion comprises a rotatable board.

11. An assembling apparatus configured to assemble an assembled product from a plurality of parts, the assembling apparatus comprising:
   a mold comprising a first unit and a second unit opposing the first unit,
   wherein the first unit comprises a first movable portion that is movable, a second movable portion, and a third movable portion, the first movable portion comprising a plurality of first forming portions, the second movable portion comprising a plurality of second forming portions, and the third movable portion comprising a plurality of third forming portions, the plurality of the first forming portions being configured to form a plurality of first parts, the plurality of the second forming portions being configured to form a plurality of second parts, and the plurality of the third forming portions being configured to form a plurality of third parts,
   wherein the second unit comprises a fourth forming portion, a fifth forming portion, and a fourth movable portion, the fourth movable portion being configured to move so as to switch a first assembling portion, a second assembling portion, and a third assembling portion,
   wherein the first movable portion is configured to have at least one first forming portion of the plurality of first forming portions oppose the first assembling portion, and the first assembling portion is configured to hold a first one of the first parts formed in the at least one first forming portion of the plurality of first forming portions,
   wherein the second movable portion is configured to have at least one second forming portion of the plurality of second forming portions oppose the second assembling portion in which a second one of the first parts is held, and the second assembling portion is configured to assemble a first one of the second parts formed in the at least one second forming portion of the plurality of second forming portions to the second one of the first parts held in the second assembling portion, and wherein the third movable portion is configured to have at least one third forming portion of the plurality of third forming portions oppose the third assembling portion in which a part formed by assembling a third one of the first parts to a second one of the second parts is held, and the third assembling portion is configured to assemble a part formed by assembling the third one of the first parts to the second one of the second parts to a third part formed in the at least one third forming portion of the plurality of third forming portions.

\* \* \* \* \*